US008295599B2

United States Patent
Katougi et al.

(10) Patent No.: US 8,295,599 B2
(45) Date of Patent: Oct. 23, 2012

(54) IMAGE OUTPUT APPARATUS, CAPTURED IMAGE PROCESSING SYSTEM, AND RECORDING MEDIUM

(75) Inventors: Terumitsu Katougi, Osaka (JP); Makoto Hayasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 307 days.

(21) Appl. No.: 12/847,563

(22) Filed: Jul. 30, 2010

(65) Prior Publication Data

US 2011/0025860 A1 Feb. 3, 2011

(30) Foreign Application Priority Data

Aug. 3, 2009 (JP) ................................. 2009-180497

(51) Int. Cl.
*G06K 9/34* (2006.01)
(52) U.S. Cl. ........ 382/173; 382/103; 382/141; 382/170; 382/190; 382/199
(58) Field of Classification Search .................. 382/103, 382/141, 181, 201, 170, 173, 190, 199; 348/207.2; 358/3.26; 345/418, 422, 420, 441, 619
See application file for complete search history.

(56) References Cited

U.S. PATENT DOCUMENTS

| | | | | |
|---|---|---|---|---|
| 6,993,184 | B2 * | 1/2006 | Matsugu | 382/173 |
| 7,391,906 | B2 * | 6/2008 | Blake et al. | 382/199 |
| 2003/0103682 | A1 * | 6/2003 | Blake et al. | 382/282 |
| 2007/0053586 | A1 | 3/2007 | Makino | |

FOREIGN PATENT DOCUMENTS

| | | |
|---|---|---|
| CN | 101151639 A | 3/2008 |
| JP | 2002-41502 A | 2/2002 |
| JP | 2006-237757 A | 9/2006 |
| JP | 2007-11762 A | 1/2007 |

OTHER PUBLICATIONS

Saito., "Super-Resolution Oversampling from a Single Image", The Institute of Image Information and Television, ITE Journal, vol. 62, No. 2, pp. 181-189, (2008).
Tanaka et al., Super-resolution: High-resolution Image Reconstruction from Multiple Low-resolution Images, ITE Journal, vol. 62, No. 3, pp. 337-342, (2008).
Tomasi et al. "Bilateral Filtering for Gray and Color Images", Proceddings of the 1998 IEEE International Conference on Computer Vision, Bombay, India.

\* cited by examiner

*Primary Examiner* — Ali Bayat
(74) *Attorney, Agent, or Firm* — Birch, Stewart, Kolasch & Birch, LLP

(57) ABSTRACT

An object extraction section of an image output apparatus determines as an extraction region either (a) a quadrangular region enclosed by a quadrangle in which all internal angles are less than 180° and sides are constituted by 4 edge pixel groups each in the form of a line segment, the 4 edge pixel groups being indicated by edge information, or (b) a polygonal region enclosed by a polygon in which all internal angles are less than 180° and sides are constituted by at least one edge pixel group in the form of a line segment, which edge pixel group is indicated by the edge information, and at least one line segment located on an end portion of the captured image, and then (ii) cuts out, as output target image data, image data of the extraction region from the captured image data. This makes it possible to accurately and easily extract, from a captured image, a region including a rectangular image capture object that a user desires.

9 Claims, 21 Drawing Sheets

F I G. 5
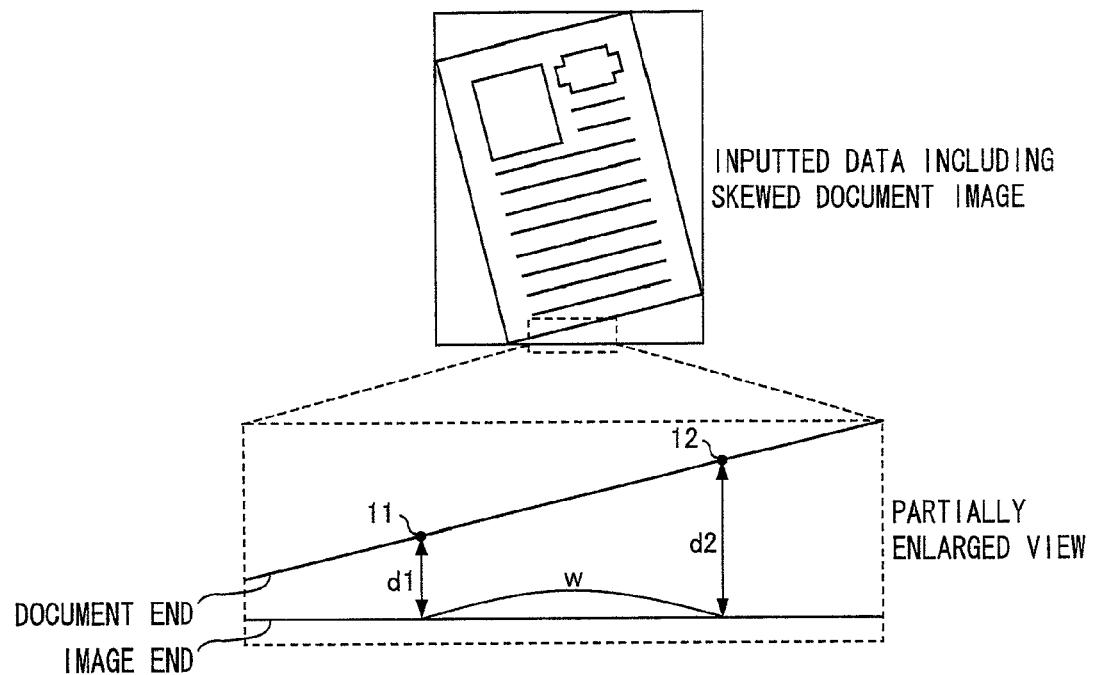

FIG. 6

| tan Θ | Θ |
|---|---|
| -0.17632698 | -10.0 |
| -0.17452794 | -9.9 |
| -0.17272999 | -9.8 |
| -0.17093313 | -9.7 |
| -0.16913734 | -9.6 |
| -0.16734261 | -9.5 |
| -0.16554893 | -9.4 |
| ⋮ | ⋮ |
| 0.16554893 | 9.4 |
| 0.16734261 | 9.5 |
| 0.16913734 | 9.6 |
| 0.17093313 | 9.7 |
| 0.17272999 | 9.8 |
| 0.17452794 | 9.9 |
| 0.17632698 | 10.0 |

F I G. 9
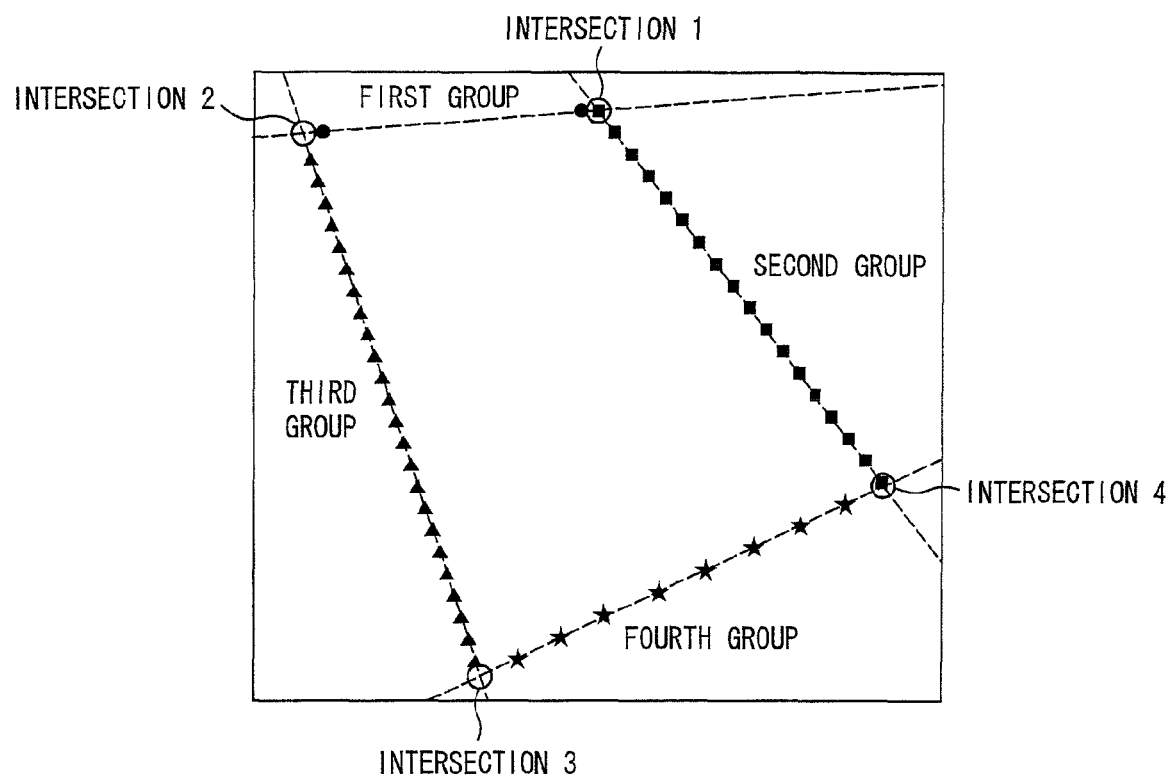
F I G. 1 0
| 0 | -1 | 0 |
|---|----|---|
| -1 | 4 | -1 |
| 0 | -1 | 0 |

POINT COORDINATES (x, y) SPECIFIED BY USER

POINT COORDINATES (x, y) SPECIFIED BY USER

F I G. 1 3
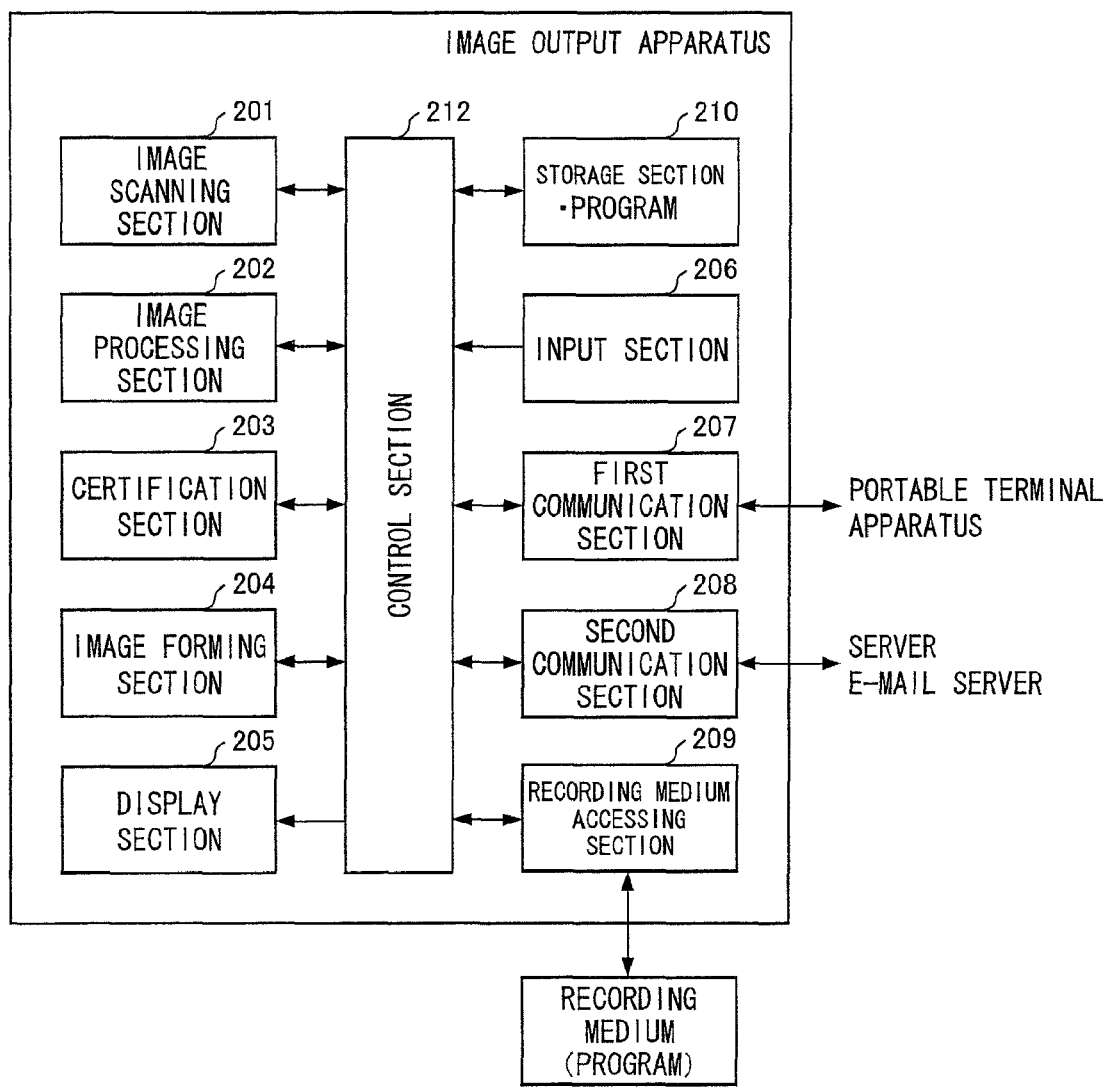

F I G. 1 4
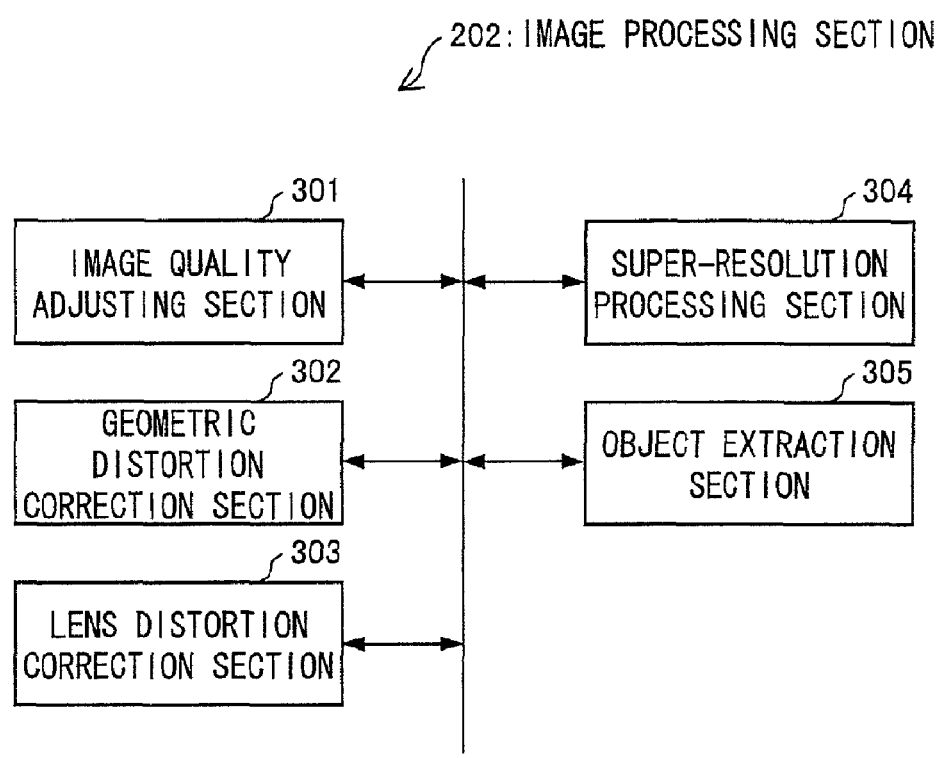

| MN | 0 |
|---|---|
| MN+△ | 1 |
| MN+△×2 | 2 |
| MN+△×3 | 3 |
| MN+△×4 | 4 |
| : | : |
| : | : |
| MN+△×255 | 255 |

△=(MX−MN)/255

F I G. 1 9
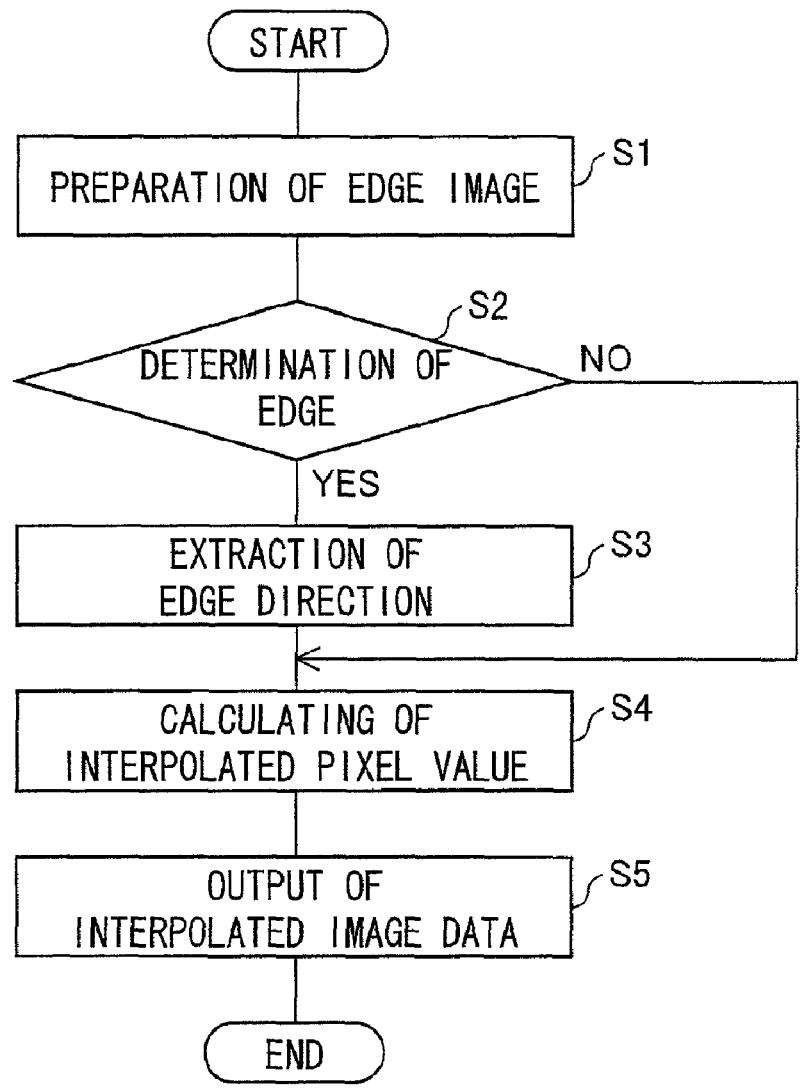

FIG. 20 (a)

$A = ((1)+(5))/2$
$B = (9 \times (2) + 4 \times (6))/13$
$C = (9 \times (4) + 4 \times (8))/13$

$A = ((1)+(2)+(4))/3$
$B = (9 \times (2) + 4 \times (4))/13$
$C = (4 \times (2) + 9 \times (4))/13$

IMAGE OUTPUT APPARATUS, CAPTURED IMAGE PROCESSING SYSTEM, AND RECORDING MEDIUM

This Nonprovisional application claims priority under 35 U.S.C. §119(a) on Patent Application No. 2009-180497 filed in Japan on Aug. 3, 2009, the entire contents of which are hereby incorporated by reference.

TECHNICAL FIELD

The present invention relates to a captured image processing system which causes an image output apparatus to output an image captured by a portable terminal apparatus.

BACKGROUND ART

A mobile phone and wire and wireless technologies have been developed and widespread in tandem with advancement in Internet technology. The technologies make it possible that an image is transmitted, in a place where a user is staying, from a portable terminal apparatus such as the mobile phone to an image output apparatus connected to the Internet so that the image is put into print.

For example, according to Patent Literature 1, digital image data, collected by a digital camera or a mobile information device, such as a camera-equipped PDA or a mobile personal computer, is transmitted to a server via a network. The server carries out image processing such as a brightness adjustment, a color adjustment, and/or a size adjustment with respect to the digital image data. Then, the server embeds the digital image data in an image area, in which a plurality of document combining templates are stored, so as to prepare a document.

Citation List

Patent Literature 1

Japanese Patent Application Publication, Tokukai, No. 2002-41502 A (Publication Date: Feb. 8, 2002)

SUMMARY OF INVENTION

Technical Problem

However, a document preparation system disclosed in Patent Literature 1 does not have a function of extracting an intended image capture object out of a captured image in a case where the captured image contains, besides the intended image capture object, portions unnecessary for the preparation of a document. The unnecessary portions may be, for example, people, products, and/or backgrounds around the intended image capture object.

The document preparation system therefore causes such a problem that in a case where a user wants to extract a partial region from the captured image, the user himself should extract the partial region from the captured image, edit the extracted partial region, and then paste an image of the partial region on the document.

The present invention is accomplished in view of the above problem. An object of the present invention is to provide an image output apparatus, a portable terminal apparatus, a captured image processing system, an image output method, and a recording medium, each of which can accurately and easily extract, from a captured image, a region including a rectangular image capture object that a user wants.

Solution to Problem

In order to achieve the above object, an image output apparatus of the present invention includes: a receiving section for receiving, from a portable terminal apparatus including an image capture section, captured image data that is captured by the image capture section; an edge information obtaining section for obtaining edge information indicative of where an edge pixel group, which is a group of edge pixels connected to each other in a form of a line segment and which is detected in a captured image of the captured image data, is positioned on the captured image; an edge extraction processing section (i) for determining as an extraction region either (a) a quadrangular region enclosed by a quadrangle in which all internal angles are less than 180° and sides are constituted by 4 edge pixel groups each in the form of a line segment, the 4 edge pixel groups being indicated by the edge information, or (b) a polygonal region enclosed by a polygon in which all internal angles are less than 180° and sides are constituted by at least one edge pixel group in the form of a line segment, which edge pixel group is indicated by the edge information, and at least one line segment located on an end portion of the captured image, and (ii) for cutting out, as output target image data, image data of the extraction region from the captured image data; and an output section for outputting the output target image data or an image of the output target image data.

An image output method of the present invention includes the steps of: receiving, from a portable terminal apparatus including an image capture section, captured image data captured by the image capture section; obtaining edge information indicative of where an edge pixel group, which is a group of edge pixels connected to each other in a form of a line segment and which is detected in a captured image of the captured image data, is positioned on the captured image; carrying out an edge extraction process of (i) determining as an extraction region either (a) a quadrangular region enclosed by a quadrangle in which all internal angles are less than 180° and sides are constituted by 4 edge pixel groups each in the form of a line segment, the 4 edge pixel groups being indicated by the edge information, or (b) a polygonal region enclosed by a polygon in which all internal angles are less than 180° and sides are constituted by at least one edge pixel group in the form of a line segment, which edge pixel group is indicated by the edge information, and at least one line segment located on an end portion of the captured image, and then (ii) cutting out, as output target image data, image data of the extraction region from the captured image data; and outputting the output target image data or an image of the output target image data.

Advantageous Effects of Invention

The present invention yields such an effect of realizing an image output apparatus that can accurately and easily extract, from a captured image, a region including a rectangular image capture object that a user desires.

BRIEF DESCRIPTION OF DRAWINGS

FIG. 5 illustrates an example of detection of a skew of an image which detection is carried out in the captured image processing method of the present invention.

FIG. 6 shows angles θ of a skew and their respective tangents which angles and tangents are obtained in the example of detection of the skew which example is illustrated in FIG. 6.

FIG. 9 illustrates an example of detection of an edge of an image in a raster direction.

FIG. 10 shows an example of a first order differential filter used in an example of detection of a degree of offset between images.

FIG. 13 is a block diagram illustrating an arrangement of the image output apparatus of the present invention.

FIG. 14 is a block diagram illustrating an arrangement of an image processing section of the present invention.

FIG. 19 is a flow chart illustrating a processing flow of a high resolution correction.

FIG. 20(a) is a drawing illustrating a method for calculating pixel values of the interpolated pixels in a case where an edge direction is an upper left-lower right direction.

FIG. 20(b) is a drawing illustrating the method for calculating the pixel values of the interpolated pixels in a case where the edge direction is a left-right direction.

FIG. 20(c) is a drawing illustrating the method for calculating the pixel values of the interpolated pixels in a case where the edge direction is an upper right-lower left direction.

FIG. 20(d) is a drawing illustrating the method for calculating the pixel values of the interpolated pixels in a case where the edge direction is an upper-lower direction.

DESCRIPTION OF EMBODIMENTS

An embodiment of the present invention is described below in detail with reference to drawings.

(1) Overall Arrangement of Captured Image Processing System

Figure 3:
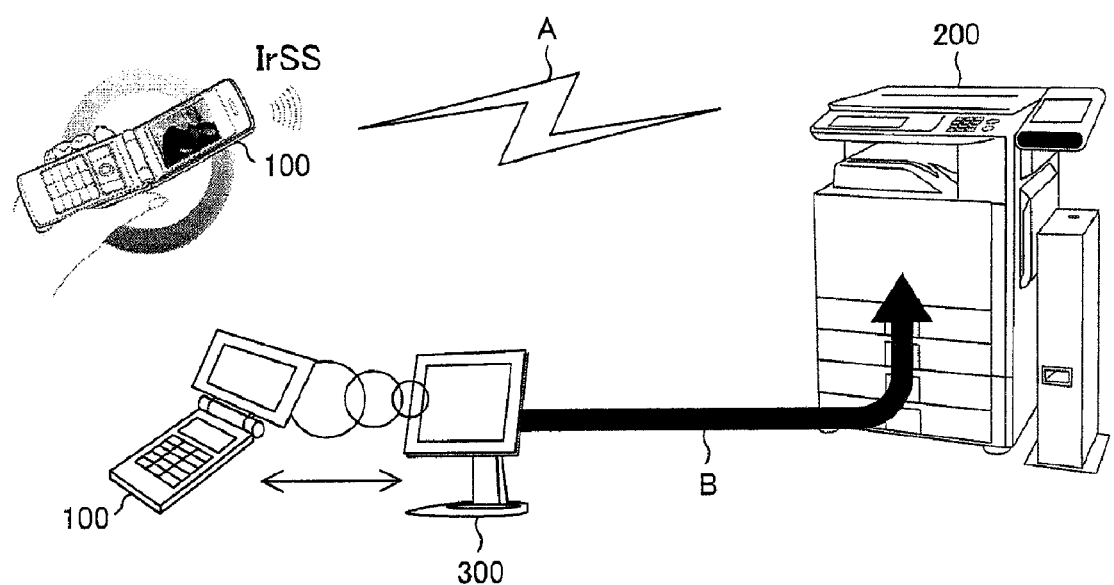
FIG. 3 is a drawing illustrating an arrangement of the captured image processing system of the present invention.

FIG. 3 is a drawing illustrating an overall arrangement of a captured image processing system of the present invention. The captured image processing system includes (i) a portable terminal apparatus 100 including image capture means, such as a camera-equipped mobile phone or a digital camera and (ii) an image output apparatus 200 such as a multifunction printer or a printer (image forming apparatus) (see FIG. 3).

The portable terminal apparatus 100, which can communicate with the image output apparatus 200, transmits data of a captured image (hereinafter referred to as captured image data) to the image output apparatus 200.

The portable terminal apparatus 100 is carried with a user. The user can cause the portable terminal apparatus 100 to carry out image capture with respect to an object in various scenes.

According to the present embodiment, the portable terminal apparatus 100 has a function of a text image capture mode for (i) carrying out image capture with respect to an image capture object (an object whose image is to be captured) which has a rectangular shape such as (a) paper or a poster on which a text image is printed or (b) a display screen on which the text image is displayed (e.g., a display screen and a screen projected by a projector), and (ii) outputting, from the image output apparatus 200, the captured image obtained by the image capture.

The captured image may contain, besides an intended image capture object, portions unnecessary for preparation of a document. The unnecessary portions may be, for example, people, products, and/or backgrounds around the intended image capture object. According to the present embodiment, it is possible to easily extract an intended image capture object out of a captured image even if the captured image contains such unnecessary portions.

According to the present embodiment, the portable terminal apparatus 100 has a function of an object extraction mode which enables a user to obtain, from the image output apparatus 200, an image of a partial region extracted from a captured image while the text image capture mode is being selected. That is, in the present embodiment, the user is assumed to select the object extraction mode as well as the text image capture mode, in a case where (i) the user carries out image capture with respect to an image capture object including a text image having a rectangular plane, and (ii) desires to output only an image of a partial region out of the captured image obtained by the image capture.

Note that as the object extraction mode, the present embodiment has the following three modes: (A) an automatic extraction mode in which a region to be extracted is automatically determined without the user specifying any point in the region to be extracted; (B) an edge extraction mode in which the region to be extracted is determined in accordance with (i) a specified point in the region to be extracted, the specified point being specified by the user, and (ii) a position of an edge pixel group detected in the captured image; and (C) a color extraction mode (density value extraction mode) in which the region to be extracted is determined in accordance with a color of a specified point in the region to be extracted, the specified point being specified by the user. In a case where the user selects the object extraction mode, the user can select, as the object extraction mode, any one of the automatic extraction mode, the edge extraction mode, and the color extraction mode, accordingly.

In the present embodiment, in a case where the object extraction mode is selected in the portable terminal apparatus 100, the image output apparatus 200 (i) extracts, from the captured image, an image of a partial region which is assumed to be a region of the image capture object, and (ii) outputs the extracted image.

Further, an image captured by the portable terminal apparatus 100 has a low resolution. Therefore, in a case where an image having such a low resolution is subjected to an image output process (e.g., printing) by the image output apparatus 200, it may be impossible to recognize details of the image. For example, in a case where image capture is carried out with respect to (a) paper or a poster on which a text image (e.g., a text) is printed or (b) a display screen on which the text image or the like is displayed, the text which has been subjected to the image output process may be illegible.

In view of the problem, the image output apparatus 200 of the present embodiment has a function (high resolution enhancement function) of carrying out a high resolution correction for resolution enhancement with respect to captured image data received from the portable terminal apparatus 100. It is possible to employ a method disclosed in the Journal of the Institute of Image Information and Television Engineers Vol. 62, No. 3, pp. 337 through 342 (published in 2008) as a method for carrying out the high resolution correction by use of a plurality of pieces of the captured image data. It is also possible to employ a method disclosed in the Journal of the Institute of Image Information and Television Engineers Vol. 62, No. 2, pp. 181 through 189 (published in 2008) as a method for carrying out the high resolution correction by use of a single piece of captured image data. In the present embodiment, the high resolution correction is carried out by use of output target image data obtained by consecutively carrying out image capture several times with respect to an identical image capture object. Note, however, that the present invention is not limited to the arrangement in which the image output apparatus 200 has the high resolution enhancement function.

Note also that it is not always possible for the user to carry out image capture from the front with respect to the image capture object which has a rectangular shape such as (a) paper or a poster on which a text image is printed or (b) a display screen on which the text image is displayed. Namely, the user may obliquely carry out image capture with respect to the image capture object, in a state where (i) a normal direction of a plane of the image capture object on which plane the text image is formed and (ii) a direction in which image capture means carries out the image capture do not coincide with each other. In this case, the image capture object undergoes a distortion (hereinafter referred to as a geometric distortion) in the captured image. The present embodiment is arranged to cause the image output apparatus 200 to output an image, in which such a geometric distortion has been corrected, in a case where the text image capture mode is selected. Note, however, that the present invention is not limited to the arrangement in which the image output apparatus 200 has the function of carrying out the geometric distortion correction.

Examples of the output process carried out by the image output apparatus 200 include (i) a printing process carried out with respect to an image in accordance with the captured image data or an image of a partial region of the image, (ii) a filing process for causing the captured image data or image data of the partial region to be stored in a storage device such as a server or a USB memory, and (iii) an e-mail transmission process for transmitting an e-mail to which the captured image data or the image data of the partial region is attached.

The portable terminal apparatus 100 can be communicated with the image output apparatus 200 as below. The captured image data is transferred from the portable terminal apparatus 100 to the image output apparatus 200 via a wireless communication system which is in conformity with any one of the infrared communication standards such as IrSimple (see a sign A illustrated in FIG. 3). Alternatively, the captured image data is transmitted from the portable terminal apparatus 100 temporarily to an intermediary apparatus 300 via a non-contact wireless communication system such as Felica (registered trademark) (see a sign B illustrated in FIG. 3) and then transferred from the intermediary apparatus 300 to the image output apparatus 200 via a wireless communication system such as Bluetooth (registered trademark). Note that not only the communication systems but also a system employing a publicly-known method is applicable to the communication between the portable terminal apparatus 100 and the image output apparatus 200. For example, it is possible to attach output target image data to an e-mail, and transmit the e-mail to the image output apparatus 200.

(2) Arrangement of Portable Terminal Apparatus

First, the portable terminal apparatus 100 of the present embodiment is described below with reference to FIGS. 4 through 12.

Figure 4:
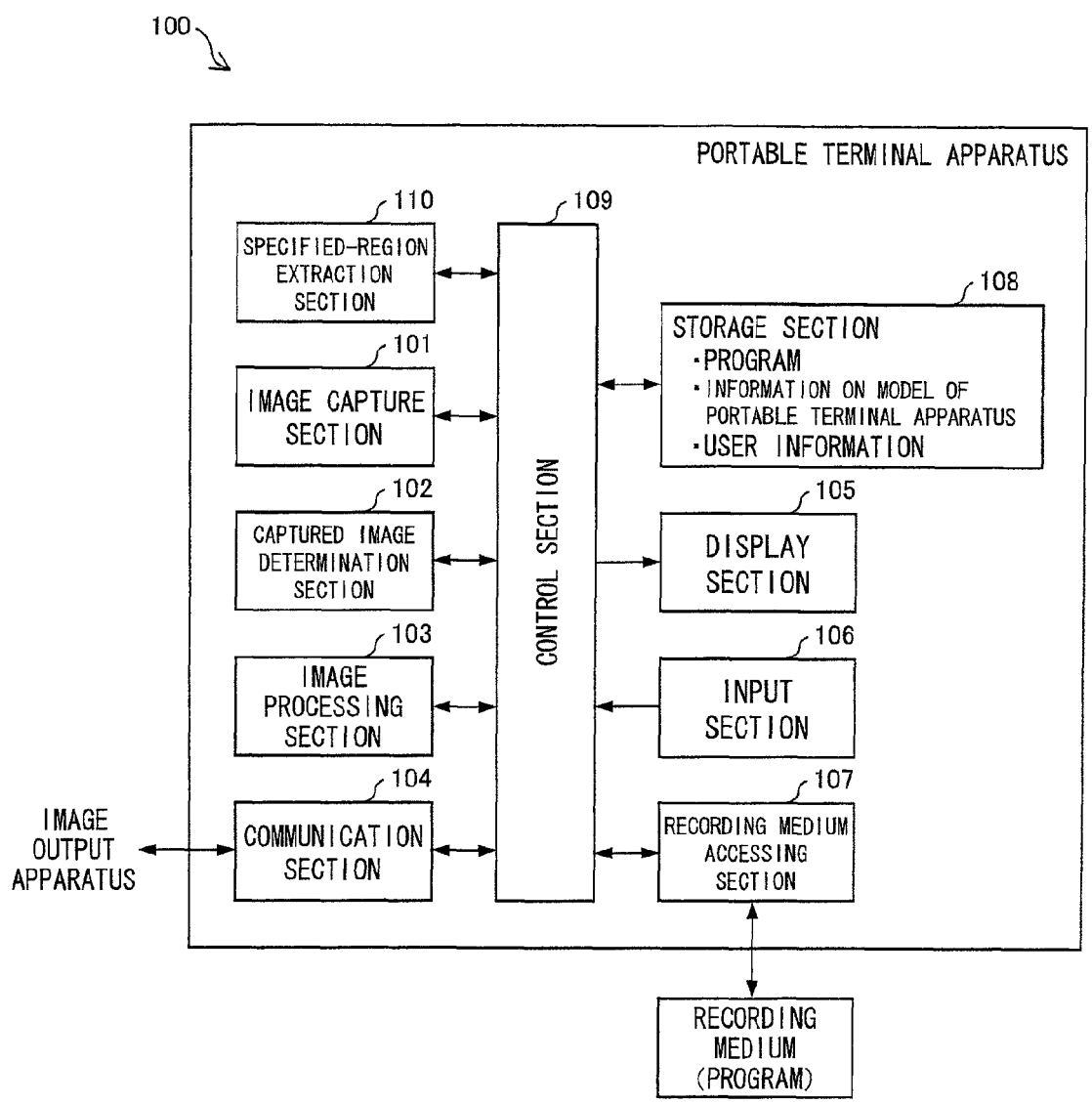
FIG. 4 is a block diagram illustrating an arrangement of the portable terminal apparatus of the present invention.
Figure 7:
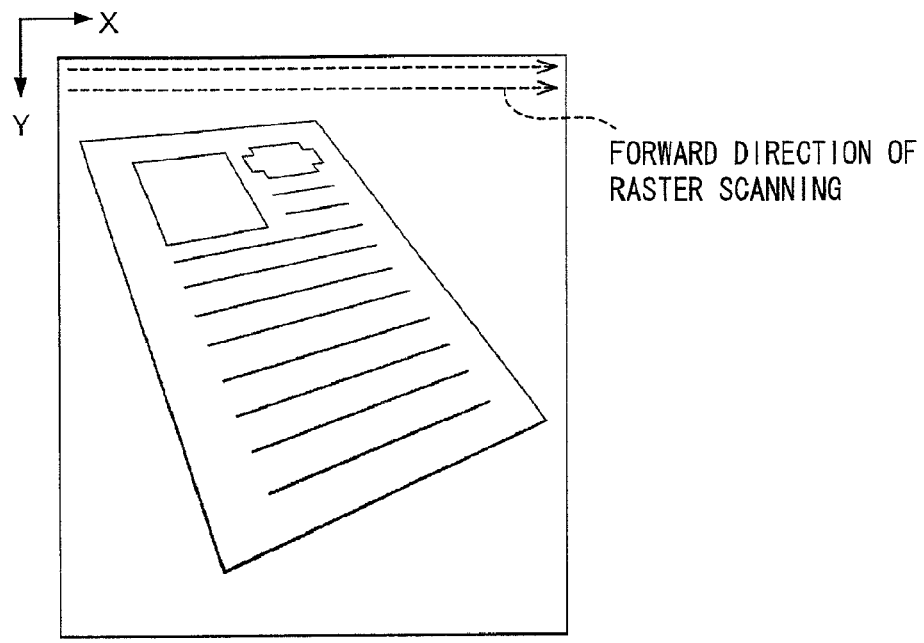
FIG. 7 illustrates an example of detection of a geometric distortion of an image.
Figure 8:
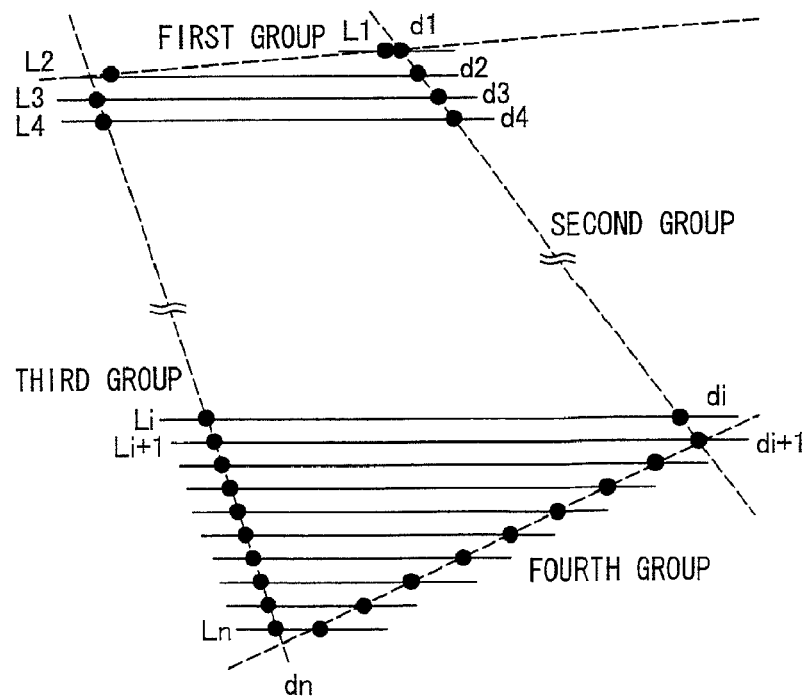
FIG. 8 illustrates an example of an edge detection process carried out with respect to an object in an image.

FIG. 4 is a block diagram illustrating an arrangement of the portable terminal apparatus 100. As illustrated in FIG. 4, the portable terminal apparatus 100 includes an image capture section 101, a captured image determination section 102, an image processing section 103, a communication section (transmission section) 104, a display section (notification section, selection section, specified-region extraction section) 105, an input section 106, a recording medium accessing section 107, a storage section 108, a control section (transmission section, notification section) 109, and a specified-region extraction section 110.

The image capture section 101 carries out image capture with respect to an image capture object by use of a CCD/CMOS sensor so that a captured image has a predetermined resolution. In a case where the text image capture mode is selected by the user, a single shutter click causes the image capture section 101 to consecutively carry out, more than once (e.g., 2 to 15 times), image capture with respect to the image capture object. Images consecutively captured are generally substantially identical, but will be offset by a minutely small amount due to a camera shake or the like.

The captured image determination section 102 includes a determination section which determines whether or not a plurality of captured images captured by the image capture section 101 meet process execution requirements including a requirement for causing the image output apparatus 200 to carry out the high resolution correction, while the text image capture mode is being selected. The captured image determination section 102 supplies a determined result to the control section 109.

Further, the captured image determination section 102 also has functions of: detecting an edge pixel group, which is a group of edge pixels connected to each other in a form of a line segment, in the captured image; and generating edge information indicating where the edge pixel group is located in the captured image. Note that in a case where a plurality of edge pixel groups are detected, the captured image determination section 102 generates a plurality of pieces of edge information, which correspond to the respective edge pixel groups. Processes carried out by the captured image determination section 102 are described later in detail.

The image processing section 103 carries out at least an A/D conversion process with respect to the data of the image captured by the image capture section 101 (captured image data).

The communication section 104 has functions of serial/parallel transfer and wireless data communication which are in conformity with USB (Universal serial Bus) 1.1 or USB 2.0 Standard. The communication section 104 transmits to the image output apparatus 200 a single piece or a plurality of pieces of the data of the images which are captured by the image capture section 101 and are then subjected to the A/D conversion process by the image processing section 103. Note, however, that the communication section 104 transmits only the captured image data that is determined, by the captured image determination section 102, to meet the process execution requirements.

The display section 105 is realized by a liquid crystal display device of a touch panel type, for example. The user can freely change a position of a captured image displayed on the liquid crystal display or zoom in/out the captured image, by touching the captured image. In addition, the user can specify a certain point and move the captured image with the specified point as a center along a direction in which the user moves his/her finger on the liquid crystal display.

The input section 106, which has a plurality of buttons, serves as a section from which the user enters data. The recording medium accessing section 107 reads out a program for carrying out the processes in the portable terminal apparatus 100 from a recording medium in which the program is recorded.

The storage section 108 serves as a section in which (i) the program for carrying out the processes in the portable terminal apparatus 100, (ii) information on a model of the portable terminal apparatus 100, (iii) user information, and (iv) data required for carrying out the processes are stored. Note that the user information refers to information, for identifying the user of the portable terminal apparatus 100, such as a user ID and a password.

The specified-region extraction section 110 extracts coordinate information of a point that is specified by the user with his/her finger or a touch pen on the captured image displayed on the display section 105. Note that the coordinate information is represented by an X coordinate and a Y coordinate where, on the captured image indicated by the captured image data, (i) an origin is a point at a predetermined position (e.g., a point at an upper left corner), (ii) an X axis extends from the origin in a transverse direction, and (iii) a Y axis extends from the origin in a vertical direction. Processes carried out by the specified-region extraction section 110 are described later in detail.

The control section 109 carries out control with respect to the sections of the portable terminal apparatus 100. Specifically, in a case where an instruction to select the text image capture mode is entered from the input section 106, the control section 109 causes the display section 105 to display a window which urges the user to enter, from the input section 106, a magnification of resolution conversion.

Subsequently, the control section 109 determines, in accordance with the magnification (e.g., ×2 or ×4) entered from the input section 106, (i) the number of consecutive times of image capture carried out by the image capture section 101 and (ii) a part of the process execution requirements which is used in the captured image determination section 102. Note that the control section 109 determines the above (i) and (ii) in accordance with information, preliminarily stored in the storage section 108, in which the magnification, the number of times of image capture, and the part of the process execution requirements are associated with each other.

Further, in the case where the instruction to select the text image capture mode is entered from the input section 106, the control section 109 causes the display section 105 to display a window which urges the user to enter, from the input section 106, (i) an instruction to select a kind of the output process (such as the printing process, the filing process, the e-mail transmission process, or the like) carried out in the image output apparatus 200 and (ii) a setting requirement for carrying out a selected output process (a printing requirement such as the number of sheets to be printed, an address of a server at which data is to be filed, an address of a destination at which an e-mail is transmitted, or the like). Subsequently, the control section 109 receives, from the input section 106, output process information indicative of the kind of the output process and the setting requirement for carrying out the output process.

Further, in a case where an instruction to transmit, to the image output apparatus 200, the captured image data obtained by the image capture carried out in the text image capture mode, is entered from the input section 106, the control section 109 causes the display section 105 to display a window which urges the user to enter, from the input section 106, an instruction on whether to select the object extraction mode. Furthermore, in a case where the object extraction mode is selected, the control section 109 causes the display section 105 to display a window which urges the user to enter, from the input section 106, an instruction to select one of the automatic extraction mode, the edge extraction mode, and the color extraction mode. Subsequently, the control section 109 determines which mode is to be carried out, in accordance with the instruction entered by the user and the number of pieces of edge information generated by the captured image determination section 102.

Thereafter, the control section 109 controls the communication section 104 to transmit, to the image output apparatus 200, the captured image data and related information in accordance with the selected mode.

The mode determination process and the related information specifying process, both of which are carried out by the control section 109, are described later in detail.

(3) Processes Carried Out by Captured Image Determination Section

The following description discusses how the captured image determination section 102 of the portable terminal apparatus 100 carries out the determination processes.

(3-1) Determination of Skew

As described earlier, the user selects the text image capture mode in a case where the user carries out image capture with respect to the image capture object, which has a rectangular shape, such as paper, a poster, or a display screen and desires to cause the image output apparatus 200 to output the captured image.

Therefore, the captured image determination section 102 assumes that the image capture object has a rectangular shape, and detects, in the captured image data, a skew of the image capture object by detecting an edge of the image capture object.

Specifically, the captured image determination section 102 detects a group of edge pixels connected to each other in the form of a line segment in the captured image data (straight line recognition). Note here that the edge pixels are pixels constituting a part of the captured image which part has a large fluctuation in density. In a case where the image capture is carried out with respect to an image capture object having a rectangular shape, a contour of the image capture object (i.e., boundary between the image capture object and its background) is constituted by parts, each having a large fluctuation in density, being connected to each other in the form of a line segment. In other words, in the captured image, the boundary between the image capture object and its background is shown by a group of edge pixels connected to each other in the form of a line segment. Therefore, as described earlier, it is possible to assume where the boundary between the image capture object and its background is located in the captured image by detecting, in the captured image data, a group of edge pixels connected to each other in the form of a line segment. As such, the captured image determination section 102 also functions as an edge detection section for detecting a group of edge pixels connected to each other in the form of a line segment.

Note that it is possible to employ a conventional well-known method (a method disclosed in Japanese Patent Application Publication, Tokukai, No. 2006-237757 A, for example), as a method for detecting, in the captured image data, a group of edge pixels connected to each other in the form of a line segment.

Further, in order to prevent a background edge from being erroneously determined to be the edge of the contour of the image capture object, it is alternatively possible to employ a method in which it is determined that an edge of the image capture object is detected only in a case where a group of edge pixels connected to each other in the form of a line segment having a length of not less than a given length is detected. In this case, the given length can be set, for example, to a length which is approximately 80% of a length of an end side of an image in the captured image data, as appropriate. Alternatively, it is also possible to cause the user to select the edge of the image capture object from the detected edges. In this case, it is possible to employ a technique disclosed in Japanese Patent Application Publication, Tokukai, No. 2006-237757 A, as the method for detecting an edge, for example.

The captured image determination section 102 selects two points located on the detected edge of the image capture object. For example, the captured image determination section 102 selects two points 11 and 12 which are away from a center of the captured image data by w/2 in a transverse direction to the right and left, respectively (see FIG. 5). Next, it is possible to determine a skew of the image capture object in the captured image by determining shortest distances $d_1$ and $d_2$ between an end side of the captured image data and the respective selected two points 11 and 12. In the case of FIG. 5, when an angle of the skew is indicated as $\theta$, $\tan \theta = (d_2 - d_1)/w$. Then, the captured image determination section 102 calculates a value of $(d_2 - d_1)/w$ and reads out a corresponding angle $\theta$, for example, from a table (refer to FIG. 6) which has been prepared in advance.

Subsequently, the captured image determination section 102 determines whether or not the detected angle $\theta$ falls within a given range (e.g., −30° to +30°) and supplies a determined result to the control section 109. Note here that it is one of the process execution requirements that the angle $\theta$ falls within the given range.

Further, the captured image determination section 102 generates edge information indicating where the group of edge pixels connected to each other in the form of a line segment is located in the captured image, which group has been detected in the process for determining the skew, and then supplies the edge information to the control section 109. In a case where n groups of edge pixels connected to each other in the form of a line segment are detected (4 groups are detected in FIG. 22, for example), the captured image determination section 102 supplies, to the control section 109, n pieces of edge information of the respective groups of edge pixels. Note that in the present embodiment, the edge information is information on two coordinates, in the captured image, of respective end edge pixels, which are positioned at respective ends of the group of edge pixels connected to each other in the form of a line segment. In the present invention, the edge information is not limited to this, provided that the edge information indicates where the group of edge pixels connected to each other in the form of a line segment is located in the captured image. For example, the edge information may be information on coordinates, in the captured image, of all the edge pixels included in the group. As such, the captured image determination section 102 also functions as an edge information generation section for generating edge information indicating where a group of edge pixels connected to each other in the form of a line segment is located in the captured image.

Subsequently, the captured image determination section 102 supplies all pieces of the generated edge information to the control section 109. Note that as to some captured images, no group of edge pixels connected to each other in the form of a line segment can be found. In such a case, the captured image determination section 102 supplies, to the control section 109, a notification that no edge information can be generated. Note that the captured image determination section 102 may generate edge information indicating where the detected group of edge pixels connected to each other in the form of a line segment is located, in a process for determining geometric distortion (described later), and supply the edge information to the control section 109.

(3-2) Determination of Geometric Distortion

As described earlier, the geometric distortion means that in a case where image capture is obliquely carried out with respect to the image capture object from a direction different from the normal direction of the plane of the image capture object on which plane the text image is formed, the image capture object has, in the captured image, a distorted shape instead of the rectangular shape. For example, in a case where image capture is carried out with respect to the image capture object obliquely, i.e., from a left below direction with respect to a normal direction of the paper, the image capture object has a distorted quadrangular shape (see FIG. 7).

As described later, according to the present embodiment, the image output apparatus 200 has a function of correcting such a geometric distortion. Note, however, that in a case where the geometric distortion occurs to a large degree, readability will not be so enhanced even if the geometric distortion is corrected. In view of this, the captured image determination section 102 of the present embodiment detects features indicative of a degree of the geometric distortion so as to determine whether or not the features fall within a given range.

Edges of respective sides of the image capture object do not necessarily exist in the vicinity of a center of the angle of view. In view of this, according to the present embodiment, edge pixels are extracted, at given regular intervals, from all sides, edges identified by the respective edge pixels are found, and intersections of these edges are found, thereby defining a region where the image capture object is located.

First, the captured image determination section 102 carries out a raster scanning with respect to the captured image data. Note here that (i) a forward direction and (ii) a direction which is perpendicular to the forward direction are an X direction and a Y direction, respectively (see FIG. 7). Note also that an upper left corner is an origin in the captured image.

In a case where no edge pixel is detected as a result of the scanning carried out with respect to one (1) line, the captured image determination section 102 carries out the scanning with respect to a subsequent line which is away from the one line by a predetermined distance in the Y direction. Note that an interval between the lines is not limited to a specific one, provided that it is a fixed one. Further, the line is not necessarily constituted by a single pixel.

Next, in the raster scanning, the captured image determination section 102 regards, as $L_1$ (a first line), a line on which an edge pixel is firstly detected. The captured image determination section 102 classifies, into a first group, coordinates of a pixel determined to be the first edge pixel in the forward direction, and then classifies, into a second group, coordinates of a pixel determined to be the second edge pixel on the first line (see FIG. 8). The scanning is consecutively carried out with respect to a subsequent line so that an edge is detected. Then, with respect to each line $L_i$, a difference in X-coordinate value between (a) a point firstly determined to be an edge pixel of the image capture object in the forward direction and (b) a point secondly determined to be an edge pixel of the image capture object in the forward direction (a distance $d_i$ between X-coordinates of the two points) is found, and then an edge determination is carried out as below.

It is assumed that the X-coordinate of the first edge pixel on the line $L_i$ is $X_{i1}$ (the X-coordinate belonging to the first group) and the X-coordinate of the second edge pixel on the line $L_i$ is $X_{i2}$ (the X-coordinate belonging to the second group). The features detection method is carried out as below.

(a) Coordinates $X_{11}$ and $X_{12}$ on the first line ($L_1$) are invariable.

b) As for an ith line (i is an integer of not less than 2), an intercoordinate distance $d_{i1}(=X_{i1}-X_{(i-1)1})$ and $d_{i2}(=X_{i2}-X_{(i-1)2})$ are found. Note that the following description discusses $d_{i1}$, and so omits a suffix 1. Same applies to d$i$e.

(c) As for an ith line (i is an integer of not less than 3), $dd_i=abs\{(d_i)-d_{i-1}\}$ is found. In a case where $dd_i \leq th_1$ ($\approx$ a small value close to 0 (zero)), a coordinate $X_i$ is classified into an identical group (the first group or the second group). Otherwise (in a case where $dd_i>th_1$), the coordinate $X_1$ is classified into a different group (a third group or a fourth group).

(d) Only in a case where i=4, a process for deciding a group of $X_2$ is carried out as an initial process. The process is carried out as below.

i) $dd_3 \leq th_1$ and $dd_4 \leq th_1 \rightarrow X_2$: identical group
ii) $dd_3 > th_1$ and $dd_4 \leq th_1 \rightarrow X_2$: different group
iii) $dd_3 \leq th_1$ and $dd_4 > th_1 \rightarrow X_2$: identical group
iv) $dd_3 > th_1$ and $dd_4 > th_1 \rightarrow X_2$: identical group Once a transition of $X_2$ to the different group (the third group or the fourth group) occurs, it is unnecessary to check increase and decrease in $dd_i$.

Such a process is carried out with respect to an entire image so that edge pixels are extracted for each of the groups. Then, coordinates of the edge pixels which belong to each of the groups are subjected to linearization by use of a method such as a method of least squares or the like. This allows a straight line, which is approximate to the edge pixels which belong to each of the groups, to be found. Note here that in a case where a given threshold value is equal to or larger than an average of a square sum of a distance between (a) the approximate straight line found for each of the groups and (b) a respective of the edge pixels belonging to the group, the captured image determination section 102 can determine that the edge pixels belonging to the group are arranged in the form of a line segment, and then consecutively carry out the following processes. With the above processes, the captured image determination section 102 can detect the group of edge pixels connected to each other in the form of a line segment, which is assumed to be a boundary between the image capture object and its background. Note that in a case where the given threshold value is smaller than the average of the square sum of the distance between (a) the approximate straight line found for each of the groups and (b) a respective of the edge pixels belonging to the group, the captured image determination section 102 can determine that it is highly possible that the edge pixels belonging to the group are not arranged in the form of a line segment, and then instruct the user to select, from the detected edges, the edge of the captured image object.

FIG. 9 is a drawing illustrating a case where edge pixels are extracted by the raster scanning in accordance with a process as mentioned above and classified into the four groups. Note, in FIG. 9, that a circle indicates an edge pixel which belongs to the first group, a quadrangle indicates an edge pixel which belongs to the second group, a triangle indicates an edge pixel which belongs to the third group, and a star indicates an edge pixel which belongs to the fourth group. Note also in FIG. 9 that straight lines, which have been subjected to the linearization by use of the method of least squares so as to be approximate to the edge pixels for each of the groups, are illustrated by respective dotted lines.

Then, intersections (intersections 1 through 4 illustrated in FIG. 9) of the straight lines for the respective four groups are found. This makes it possible to define a region surrounded by the four straight lines as a region where the image capture object is located.

Further, a classifying process as mentioned above can be carried out with respect to an image which has been subjected to a 90-degree rotation. This also allows an extraction of edges of a document which is ideally provided so as to be parallel to a horizontal direction and a vertical direction of the image. Namely, the raster scanning allows a detection of an edge in the vertical direction in the image which has not been rotated. In contrast, the raster scanning allows a detection of an edge which was in the horizontal direction before the image was rotated (which is in the vertical direction after the image is rotated) in the image which has been rotated. This also allows an extraction of edges which are parallel to the vertical direction and the horizontal direction. As long as a sufficient amount of information is obtained (for example, not less than three intersections are obtained in each of the groups) before the rotation of the image, only this information can be used. In contrast, in a case where the number of intersections obtained is less than one in any one of the groups, it is obviously impossible to formulate a straight line. In such a case, intersections obtained after the rotation of the image can be used.

Alternatively, it is also possible to formulate a straight line by (i) carrying out again a coordinate conversion with respect only to found coordinates of an intersection, (ii) finding a corresponding group from regions in which the respective groups are distributed, and (iii) integrating information on the intersections. Namely, the straight line can be formulated by integrating coordinates of intersections, which belong to an identical group, out of (i) coordinates of intersections which coordinates are found by the image which has not been rotated and (ii) coordinates of intersections which coordinates are obtained by carrying out a coordinate conversion with respect to intersections found by the image which has been rotated.

Note that it is possible to extract an edge pixel in accordance with the following method. Pixel values, obtained in a small window which has a width of at least one pixel, are compared as they are (sums or averages of pixel values are compared in a case where the width is not less than two pixels). In a case where pixel values of adjacent windows have a difference of not less than a given value, an edge pixel can be determined. Note here that a pixel value is a density value of each color component (R, G, or B, for example) in a pixel. In order to prevent a background edge or an edge of a text included in the image capture object from being erroneously determined to be the edge of the image capture object, it is alternatively possible to employ a method in which it is determined that an edge of the image capture object is detected only in a case where a length between both ends of a group of edge pixels connected to each other in the form of a line segment, which length is not less than a given length, is detected. In this case, the given length can be set, for example, to a length which is approximately 80% of a length of an end side of an image in the captured image data. Alternatively, it is also possible to cause the user to select the edge of the image capture object from the detected edges. It is possible to employ, as such an edge detection method, a technique disclosed in Japanese Patent Application Publication, Tokukai, No. 2006-237757 A. Alternatively, it is also possible to prevent such an erroneous detection by carrying out an evaluation of each of the coordinate groups or a process for detecting an edge (e.g., a Hough transformation). Further, it is possible to prevent an edge of a text or a fine texture from being erroneously detected by carrying out a process employing a reduced image as preprocessing.

After finding (a) the four groups of edge pixels connected to each other in the form of a line segment, (b) the four approximate straight lines found from the four groups, and (c) their intersections, the captured image determination section 102 calculates each ratio between lengths of opposite sides of the quadrangle defined by the four approximate straight lines. The each ratio between the lengths can be easily calculated by use of the coordinates of the intersections. Note that the quadrangle has two pairs of the opposite sides and therefore the captured image determination section 102 calculates a ratio between lengths for each of the two pairs.

Note here that the ratio between the lengths of the opposite sides is equal to 1 (one to one) in a case where image capture is carried out, from the front, with respect to the image capture object which has a rectangular shape. This is because the image capture object included in the captured image also has a rectangular shape. In contrast, in a case where image capture is obliquely carried out with respect to the image capture object which has a rectangular shape, the ratio becomes a value different from 1. This is because the image capture object included in the captured image has a distorted quadrangular shape. As a direction in which image capture is carried out is at a greater angle to the normal direction of the plane of the image capture object on which plane the text image is formed, a difference between a value of the ratio and 1 increases. It follows that the ratio between the lengths of the opposite sides is one of the features indicative of a degree of the geometric distortion.

Then, the captured image determination section 102 determines whether or not each of the two ratios that has been calculated falls within a given range (e.g., 0.5 to 2) and supplies a determined result to the control section 109. Note here that the given range is set in advance so that a geometric distortion correction can be made by the image output apparatus 200, and is stored in the storage section 108. Note also that it is one of the process execution requirements that each of the two ratios falls within the given range (e.g., 0.5 to 2). Note that the captured image determination section 102 can use, as alternative features indicative of the degree of the geometric distortion, an angle formed by two straight lines which are defined by two and the remaining two, respectively, of the four intersections which have been detected as above.

Note that the captured image determination section 102 cannot calculate the features indicative of the degree of the geometric distortion in a case where the number of the detected groups of edge pixels connected to each other in the form of a line segment is three or less. In this case, the captured image determination section 102 supplies, to the control section 109, a determined result indicating that the features indicative of the degree of the geometric distortion fall within the given range.

(3-3) Determination of Offset Amount of a Plurality of Images

As described earlier, the image output apparatus 200 can also carry out the high resolution correction in accordance with the plurality of pieces of captured image data of the identical image capture object. In order to carry out the high resolution correction, it is necessary that a given number of pieces of image data which varies depending on the magnification of resolution conversion be offset by a given amount.

In view of this, the captured image determination section 102 of the present embodiment determines whether or not the plurality of pieces of captured image data (data of the images obtained by carrying out consecutive image capture by the image capture section 101) include a given number of pieces of the captured image data which are required to carry out the high resolution correction and which are offset by a given amount.

Note that an offset, required for the high resolution correction which allows enhancement of text readability, intends an offset of less than one pixel (a decimal point) of target image data. Namely, an offset, which is below the decimal point (less than one pixel) such as that falls in a range of 0.3 to 0.7, is important. An offset corresponding to an integer part is not considered during the high resolution correction. For example, in the case of an offset corresponding to 1.3 pixel, 2.3 pixels, or the like each including an offset of less than one pixel, it is possible to carry out the high resolution correction in accordance with a plurality of images. In contrast, in the case of an offset of one pixel, two pixels, or the like each including no offset of less than one pixel, it is impossible to carry out the high resolution correction.

For example, in the case of a conversion magnification of ×2, the number of pieces of image data which is required for the high resolution correction is two (2). An offset amount of the decimal point of the two pieces of image data preferably falls in a range of 0.3 to 0.7, each of which is a result obtained when the offset is represented by a pixel. Therefore, information in which (i) a magnification of the resolution conversion "×2", (ii) the number of times of image capture "2", and (iii) a process execution requirement "required number of pieces of image data: 2, offset amount: 0.3 to 0.7" are associated with each other is beforehand stored in the storage section 108. In accordance with the information, the control section 109 controls (i) the image capture section 101 to carry out image capture two consecutive times and (ii) the captured image determination section 102 to carry out a determination in accordance with the process execution requirement "required number of pieces of image data: 2, offset amount: 0.3 to 0.7".

In the case of a conversion magnification of ×4, the number of pieces of image data which is required for the high resolution correction is 4. In a case where one of the four pieces of data is assumed to be reference image data, amounts of offset of the decimal point of the other three pieces of image data with respect to the reference image data preferably fall in ranges of 0.2 to 0.3, 0.4 to 0.6, and 0.7 to 0.8, respectively, each of which is a result obtained when the offset is represented by a pixel. Therefore, information in which (i) a magnification of the resolution conversion "×4", (ii) the number of times of image capture "4", and (iii) a process execution requirement "required number of pieces of image data: 4, offset amount: 0.2 to 0.3, 0.4 to 0.6, and 0.7 to 0.8" are associated with each other is beforehand stored in the storage section 108.

Note that the following description discusses, for simplicity, a case in which the magnification of the resolution conversion "×2" is selected.

First, the captured image determination section 102 selects any one of the captured images. As for the selected captured image (hereinafter referred to as a first captured image), the captured image determination section 102 selects an offset detecting partial region from the region which is defined during the determination of the geometric distortion and in which the image capture object is located. Note here that the offset detecting partial region is used so that offset amounts of the remaining captured images (hereinafter referred to as a second captured image) with respect to the first captured image are obtained. Therefore, it is preferable to select the offset detecting partial region in which there occurs a great change in pixel value (there exists a clear pattern). As such, the captured image determination section 102 extracts the offset detecting partial region in accordance with the following method.

The captured image determination section 102 specifies a pixel, serving as a target pixel, existing in a centroid of the region where the image capture object is located. Subsequently, the captured image determination section 102 selects a region where n×n pixels including the target pixel are provided. The captured image determination section 102 judges whether or not the selected region satisfies the following selection requirement. In a case where the selected region satisfies the selection requirement, the region becomes the offset detecting partial region. In contrast, in a case where the selected region satisfies no selection requirement, the captured image determination section 102 selects another region in accordance with a given offset and carries out an identical determination with respect to the another region. This is how the offset detecting partial region is extracted.

Note here that examples of the selection requirement include the following two requirements.

According to the first example of the selection requirement, a value which is based on a variance obtained in the region is used. A variance (x) obtained in the offset detecting partial region is expressed as the following expression (1), where P (i) is a pixel value of a region, in the vicinity of the target pixel, in which region n×n pixels are provided. The selection requirement is met when the variance (x) is not less than a given threshold. For simplicity, only a numerator of the expression (1) can be considered.

$$\text{Varience } (x) = \frac{n \times \sum_{i=0}^{n-1} [P(i)]^2 - \left[\sum_{i=0}^{n-1} P(i)\right]^2}{n \times n} \quad (1)$$

According to the second example of the selection requirement, binarization is carried out, by an edge extraction filter such as a first order differential filter, with respect to the region, in the vicinity of the target pixel, in which region n×n pixels are provided, and a sum total of binarized values is used. FIG. 10 shows an example of the first order differential filter. Similar to the first example of the selection requirement, the second selection requirement is met when the sum total is not less than a given threshold (e.g., not less than 5% of the number of pixels in the offset detecting partial region).

Next, in contrast to an offset detecting partial image A (n×n) of the first captured image, an offset detecting partial image B (m×m) (m>n) is cut out from the second captured image, the offset detecting partial image B having a center substantially identical to that of the offset detecting partial image A. The offset detecting partial image B is cut out so that coordinates of a central pixel of the offset detecting partial image A in the first captured image coincide with coordinates of a central pixel of the offset detecting partial image B in the second captured image.

Then, a region of the clipped offset detecting partial image B which region best matches the offset detecting partial image A is found with sub-pixel-level accuracy. This can be realized by employing a normalized correlation pattern matching in which the offset detecting partial image A serves as a template.

As an example of the normalized correlation pattern matching, a correlation is obtained by use of a well-known normalized correlation equation. A correlation equation of two patterns of Input (I) and Target (T) which include N pixels can be generally expressed as the following expression (2). Note here that $\alpha$, $\beta$, and $\gamma$ can be expressed as below.

$$S = \{\alpha / \sqrt{\beta \times \gamma}\} \quad (2)$$

$$\alpha = N\Sigma(I \times T) - (\Sigma I) \times (\Sigma T)$$

$$\beta = N\Sigma(I \times I) - (\Sigma I) \times (\Sigma I)$$

$$\gamma = N\Sigma(T \times T) - (\Sigma T) \times (\Sigma T)$$

A correlation value map of 3×3 is obtained, in a case where, for example under the requirement of n=5 and m=7, the above correlation equation is calculated for each region (n×n) of the offset detecting partial image B (m×m), which each region has an identical size to the offset detecting partial image A. A fitting quadric surface is found by use of the correlation value map. The quadric surface is found based on an equation S (x, y)=a×x×x+b×x×y+c×y×y+d×x+e×y+f, for example. Specifically, six points each of which has a higher correlation value are selected from nine points, and simultaneous equations are solved so that each coefficient is obtained. It is determined that the process execution requirement "required number of pieces of image data: 2, offset amount: 0.3 to 0.7" is met, in a case where values below the decimal point of coordinate values (both x and y) of an extreme value (=a maximum value) of the function S (x, y) fall within the given range (here, 0.3 to 0.7).

Note that an extreme value can be obtained by (i) carrying out partial differentiation with respect to the quadratic equation S (x, y), and then (ii) calculating coordinates of a point where a corresponding partial differential coefficient is 0 (zero). In this case, it is more efficient to directly use correlation values ($S_1$ to $S_6$) because it is actually unnecessary to obtain each of the coefficients (a to f). Expressions (3) to be solved are as follows. Note here that an origin serves as a target window standard.

$$x = \frac{2 \times S_3 \times S_4 - S_5 \times S_2}{S_2^2 - 4 \times S_1 \times S_3} \quad (3)$$

$$y = \frac{2 \times S_1 \times S_5 - S_2 \times S_4}{S_2^2 - 4 \times S_1 \times S_3}$$

Note that such determination of positional offset by use of the sub-pixel-level accuracy is carried out in at least one region, desirably in several regions. Then, the captured image determination section 102 supplies, to the control section 109, a determined result as to whether or not the process execution requirements are met.

(3-4) Determination of Brightness, Contrast, Color Balance, and Blur

The captured image determination section 102 also determines each of items as follows: a brightness; a contrast; a color balance; and a blur (an intense camera shake).

As for a brightness, for example, in a case where overexposure occurs (the captured image is too bright) or underexposure occurs (the captured image is too dark), image capture may be required to be carried out again. In view of this, the captured image determination section 102 finds, for example, maximum and minimum ones of pixel values obtained in the captured image data. In a case where the maximum value is not more than a given threshold (e.g., 100 in case of 8 bits), the captured image determination section 102 determines that underexposure occurs, and then supplies, to the control section 109, a determined result. In contrast, in a case where the minimum value is not less than a given threshold (e.g., 150 in case of 8 bits), the captured image determination section 102 determines that overexposure occurs, and then supplies, to the control section 109, a determined result.

Then, in response to the determined result that underexposure or overexposure occurs, the control section 109 controls the display section 105 to display the determined result and an instruction urging image capture to be carried out again. Alternatively, the control section 109 changes the setting of the image capture section 101 so that the image capture section 101 has longer exposure time in the case of underexposure. In contrast, the control section 109 changes the setting of the image capture section 101 so that the image capture section 101 has shorter exposure time in the case of overexposure. Thereafter, the control section 109 can notify the user of the instruction urging image capture to be carried out again.

As for a contrast, in a case where a difference between the maximum and minimum values of the pixel values obtained in the captured image data is not more than a given threshold, the captured image determination section 102 determines that the captured image has a poor contrast. Then, in response to a determined result that the captured image has a poor contrast, the control section 109 controls the display section 105 to display the determined result and an instruction urging image capture to be carried out again.

Note that the captured image determination section 102 can carry out the determination of a brightness and a contrast with respect to each of color channels or can use an average value (R+G+B/3) or a brightness value (0.299×R+0.587×G+0.114×B: conforming to NTSC).

As for a color balance, it is possible to detect an occurrence of an excessive imbalance in a given color channel by comparing average values of or maximum/minimum values of the respective color channels (R, G, and B). In view of this, the captured image determination section 102 determines that the captured image has a poor color balance, for example, in a case where (i) average values (Ra, Ga, and Ba) of the pixel values of the respective color channels which pixel values are obtained in the captured image data and have values in the vicinity of a maximum brightness value (in a range of maximum brightness to (maximum brightness−5)) are calculated, and (ii) a difference between the maximum value and the minimum value of average values (Ra, Ga, and Ba) of the respective color channels is not less than a corresponding given value [Max (Ra, Ga, and Ba)−Min (Ra, Ga, and Ba)>0.1×Max (Ra, Ga, and Ba)]. Then, in response to the determined result that the captured image has a poor color balance, the control section 109 causes the display section 105 to display the determined result and an instruction urging image capture to be carried out again.

As for a blur (an intense camera shake: a so-called motion blur), an edge of the captured image is less acute when the blur occurs. In view of this, the captured image determination section 102 prepares an edge intensity image by use of the edge extraction filter (see FIG. 10), and prepares a histogram so as to calculate a standard deviation of the histogram (a square root of the variance). In a case where the standard deviation is not more than a given threshold (e.g., 5), the captured image determination section 102 determines that a blur occurs in the captured image. Then, in response to a determined result of the determination that a blur occurs in the captured image, the control section 109 causes the display section 105 to display the determined result and an instruction urging image capture to be carried out again.

(4) Notification to User

In response to the determined result received from the captured image determination section 102, the control section 109 controls the display section 105 to display a message urging image capture to be carried out again.

For example, when receiving, from the captured image determination section 102, a determined result that an angle of the skew θ falls outside the given range, the control section 109 controls the display section 105 to display a message which urges image capture to be carried out again so that the image capture object is not skewed.

In response to a determined result that features indicative of a degree of the geometric distortion (here, a ratio between the lengths of the opposite sides of the image capture object in the captured image) falls outside the given range, the control section 109 controls the display section 105 to display a message which urges image capture to be carried out again from the normal direction of the plane of the image capture object on which plane the text image is formed.

Further, in response to a determined result that no pair of edges of the image capture object desired by the user is detected in the skew determination or in the geometric distortion determination carried out by the captured image determination section 102, the control section 109 controls the display section 105 to display a message which urges image capture to be carried out again so that the entire image capture object desired by the user is included within a captured image.

Further, in response to a determined result that the number of captured images which are offset by a given amount falls below a given number, the control section 109 controls the display section 105 to display a message, urging image capture to be carried out again, such as "This image may not be well processed. Please carry out image capture again." so that a new image is obtained. Then, the captured image determination section 102 carries out the determination processes with respect to a plurality of newly captured images again. When it is determined that all the process execution requirements are met, the plurality of newly captured images are used in processes carried out at subsequent processes. Alternatively, it is possible to use, in the subsequent processes, a captured image which meets all the process execution requirements, by causing the captured image determination section 102 to carry out the determination processes with respect to a combination of the image which previously captured and an image captured again.

(5) Processes Carried Out by Specified-Region Extraction Section 110

The following description deals with processes carried out by the specified-region extraction section 110.

Figure 11:
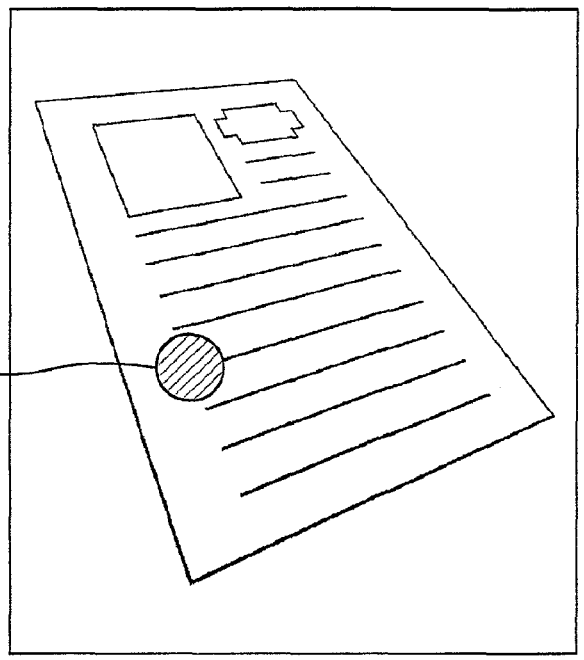
FIG. 11 illustrates an example of a case where a user specifies a point on an image.

In a case where the user specifies, by touching with his/her finger or a touch pen, a certain point in a region in the captured image displayed on the display screen of the display section 105, which region is desired to be outputted by the user (a region of the image capture object in FIG. 11), the specified-region extraction section 110 extracts coordinates (coordinates of the specified-region) of the point touched by the user (see FIG. 11).

The point touched and pressed by the user has an area to a certain degree. In view of this, the specified-region extraction section 110 extracts ranges of x coordinates and y coordinates of the specified-region or coordinates of a center of the specified-region.

Figure 12:
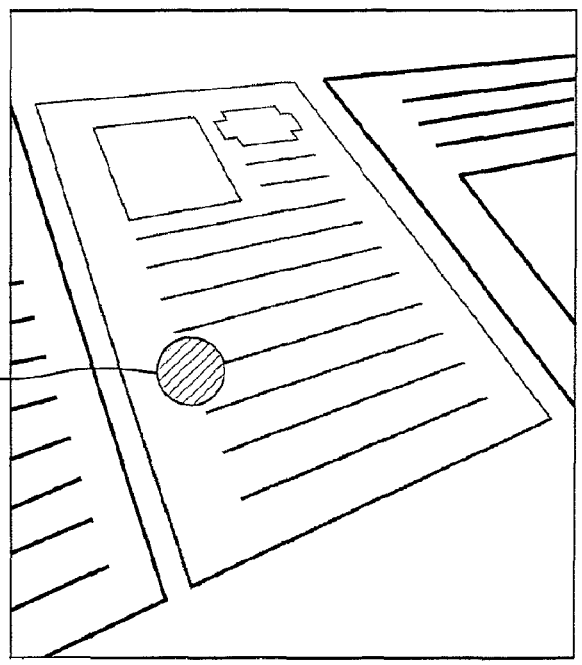
FIG. 12 illustrates an example of a case where a user selects an object on an image.

In a case where the captured image includes the image capture object and a neighboring poster(s) or bulletin board(s), it is possible for the user to select only the image capture object that the user wants by specifying a certain point in the target image capture object on the display section 105 on which the captured image is displayed (see FIG. 12). The coordinates extracted by the specified-region extraction section 110 are supplied to the control section 109 as specified coordinates specified by the user.

As such, the specified-region extraction section 110 serves as a position information generation section for generating coordinate information which indicates a position specified by the user on the captured image.

(6) Mode Determination Process and Related Information Specifying Process Carried Out by Control Section 109

Next, the following description discusses how the control section 109 carries out the mode determination process and the related information specifying process of specifying related information to be transmitted to the image output apparatus 200.

As described earlier, in a case where the instruction to transmit the captured image data to the image output apparatus 200 is entered from the input section 106, the control section 109 controls the display section 105 to display a window which urges the user to enter an instruction indicating whether to select the object extraction mode. Note that in a case where a plurality of pieces of captured image data are stored in the storage section 108, the control section 109 controls the display section 105 to display captured images of the respective pieces of the captured image data individually, and to urge the user to enter, for each of the captured images, an instruction indicating whether to select the object extraction mode. The display section 105 displays, for each of the captured images, a button for selecting the object extraction mode and a button for proceeding to the next process, for example. Then, in a case where the button for selecting the object extraction mode is pressed, the control section 109 determines that the instruction to select the object extraction mode is entered with respect to the captured image corresponding to the pressed button. In contrast, in a case where not the button for selecting the object extraction mode but the button for proceeding to the next process is pressed, the control section 109 determines that the object extraction mode is not selected with respect to the captured image corresponding to the pressed button.

In a case where the instruction not to select the object extraction mode is entered with respect to the captured image, the control section 109 determines that the non-extraction mode for outputting an entire captured image is selected with respect to the captured image.

In contrast, in a case where the instruction to select the object extraction mode is entered with respect to the captured image, the control section 109 controls the display section 105 to display a window which urges the user to enter an instruction indicating whether to select the color extraction mode. Specifically, the display section 105 displays, for each of the captured images, an option button and a button for proceeding to the next process. When pressing the option button, the user can select whether to carry out the color extraction mode. For example, the display section 105 displays a button of "Color Selection" when the option button is pressed.

In a case where the button of "Color Selection" is pressed, the control section 109 determines that the color extraction mode is to be carried out. Then, the control section 109 controls the display section 105 to display the captured image corresponding to the pressed button and a notification which urges the user to specify a certain point in the region to be extracted. Thereafter, the control section 109 causes the specified-region extraction section 110 to extract coordinate information of the specified point.

Further, in a case where not the button of "Color Selection" but the button for proceeding to the next process is pressed, the control section 109 determines whether or not there are one or more pieces of edge information generated by the captured image determination section 102. In a case where no edge information is generated by the captured image determination section 102, the control section 109 notifies the user that it is impossible to carry out the object extraction mode, and determines that the non-extraction mode for outputting an entire captured image is selected with respect to the captured image.

In contrast, in a case where one or more pieces of edge information are generated by the captured image determination section 102, the control section 109 controls the display section 105 to display a window which urges the user to enter an instruction indicating whether to specify any single point in the region to be extracted. In a case where an instruction indicating that the user is to specify any single point is entered, the control section 109 determines that the edge extraction mode is to be carried out, and then controls the display section 105 to display the captured image and a notification which urges the user to specify a certain point in the region to be extracted. Then, the control section 109 causes the specified-region extraction section 110 to extract coordinate information of the specified point.

On the other hand, in a case where an instruction not to specify any point is entered, the control section 109 determines that the automatic extraction mode is to be carried out.

Then, the control section 109 specifies information (transmission information) to be transmitted to the image output apparatus 200 in accordance with the mode to be carried out, as below.

In the case of the non-extraction mode, the control section 109 determines, as the transmission information: the captured image data; output process information; an edge detection signal (described later); a color extraction selection signal (described later); information on the model of the portable terminal apparatus 100 (stored in the storage section 108); and the user information (stored in the storage section 108).

In the case of the automatic extraction mode, the control section 109 determines, as the transmission information: the captured image data; the output process information; the edge detection signal; the color extraction selection signal; the edge information generated by the captured image determination section 102; the information on the model of the portable terminal apparatus 100 (stored in the storage section 108); and the user information (stored in the storage section 108).

In the case of the edge extraction mode, the control section 109 determines, as the transmission information: the captured image data; the output process information; the edge detection signal; the color extraction selection signal; the edge information generated by the captured image determination section 102; the coordinate information generated by the specified-region extraction section 110; the information on the model of the portable terminal apparatus 100 (stored in the storage section 108); and the user information (stored in the storage section 108).

In the case of the color extraction mode, the control section 109 determines, as the transmission information: the captured image data; the output process information; the edge detection signal; the color extraction selection signal; the coordinate information generated by the specified-region extraction section 110; the information on the model of the portable terminal apparatus 100 (stored in the storage section 108); and the user information (stored in the storage section 108).

Note here that the edge detection signal is a signal indicative of whether any edge is detected or not, and is generated by the control section 109 in accordance with the number of pieces of edge information generated by the captured image determination section 102. For example, the control section 109 generates an edge detection signal represented by "0" in a case where no group of edge pixels connected to each other in the form of a line segment is detected by the captured image determination section 102, i.e. in a case where no edge information is generated by the captured image determination section 102. In contrast, the control section 109 generates an edge detection signal represented by "1" in a case where any group of edge pixels connected to each other in the form of a line segment is detected by the captured image determination section 102, i.e. in a case where the edge information is generated by the captured image determination section 102. Alternatively, it is possible to use an edge detection signal that is generated in accordance with the number of pieces of edge information generated by the captured image determination section 102. In this case, the edge detection signal is represented by "000" in a case where "no edge information is detected", "001" in a case where "one piece of edge information is detected", "010" in a case where "two pieces of edge information are detected", "011" in a case where "three pieces of edge information are detected", and "100" in a case where "four pieces of edge information are detected", for example. The following description deals with an example in which the edge detection signal is represented by "0" or "1".

Note, however, that in a case where the non-extraction mode or the color extraction mode is to be carried out, the control section 109 generates the edge detection signal represented by "0" regardless of how many pieces of edge information are generated by the captured image determination section 102. This is because neither the non-extraction mode nor the color extraction mode carries out extraction by use of edges. As such, the edge detection signal also serves as a signal for indicating whether to carry out the extraction by use of edges.

The color extraction selection signal is a signal indicating whether to carry out the color extraction mode, and is generated by the control section 109. Specifically, in a case where the color extraction mode is to be carried out, the control section 109 generates a color extraction selection signal represented by "1". In contrast, in other cases, the control section 109 generates a color extraction selection signal represented by "0".

(7) Arrangement of Image Output Apparatus

An arrangement of the image output apparatus 200 of the present embodiment is described below with reference to FIGS. 13 through 24. In the present embodiment, the image output apparatus 200 is a multifunction printer which has functions of a scanner, a printer, a copying machine, and the like.

FIG. 13 is a block diagram illustrating the arrangement of the image output apparatus 200. The image output apparatus 200 includes an image scanning section 201, an image processing section 202, a certifying section 203, an image forming section (output section) 204, a display section 205, an input section 206, a first communication section (receiving section, edge information obtaining section, specification information obtaining section) 207, a second communication section (output section) 208, a recording medium accessing section 209, a storage section 210, and a control section (output section, selecting section) 212.

The image scanning section 201 scans a document and has a scanner section including a CCD (Charge Coupled Device) which converts light reflected from the document to an electric signal (an analogue image signal) which has been subjected to R, G, and B color separations. Then, the image scanning section 201 supplies this electric signal.

The image processing section 202 carries out given image processing with respect to captured image data. According to the present embodiment, the image processing section 202 includes an object extraction section (edge extraction processing section, density value extraction processing section) 305 for extracting the captured image object out of the captured image data received from the portable terminal apparatus 100. The image processing section 202 further includes: an image quality adjusting section 301; a geometric distortion correction section 302; a lens distortion correction section 303; and a super-resolution processing section 304, each of which carries out a corresponding correction process with respect to the captured image data. The processing carried out by the image processing section 202 with respect to the captured image data will be described later in detail.

The certifying section 203 carries out user certification when the output process is carried out with respect to the captured image data received from the portable terminal apparatus 100. In detail, the certifying section 203 carries out the user certification by comparing (a) the user information received from the portable terminal apparatus 100 with (b) the user information entered from the input section 206 (a user ID and a password). The certifying section 203 transmits a certified result to the control section 212.

The image forming section 204 forms an image on recording paper such as paper by use of an electrophotographic printing method, an ink-jet method, or the like. Namely, the image forming section 204 carries out the printing process as one of the output processes, on the basis of the captured image data which has been subjected to the given processing by the image processing section 202.

The display section 205 is realized by a liquid crystal display device, for example. The input section 206 is provided for entering data by, for example, touching a touch panel or a button included in the liquid crystal display device.

The first communication section 207 has functions of the serial/parallel transfer and the wireless data communication which are carried out in conformity with the USB 1.1 or USB 2.0 Standard. The first communication section 207 receives, from the portable terminal apparatus 100, the captured image data to which the related information is added, such as the file name, the information on the model of the portable terminal apparatus 100, the user information, and the output process information. That is, the first communication section 207 also serves as (a) an edge information obtaining section for receiving (obtaining) the edge information, and (b) a specification information obtaining section for receiving (obtaining) the coordinate information (specified-position information).

The second communication section 208 has the following functions (a) through (c): (a) data communication employing a wireless technology which is in conformity with any one of LAN standards IEEE 802.11a, IEEE 802.11b, and IEEE 802.11g, (b) data communication with a network, via a LAN cable, having a communications interface function employing Ethernet (registered trademark), and (c) data communication employing a wireless technology which is in conformity with any one of communication systems such as IEEE 802.15.1 (so-called Bluetooth (registered trademark) which is the wireless communication standard, the infrared communication standard such as IrSimple, and Felica (registered trademark).

The second communication section 208 carries out, as the output process, (i) the filing process for causing the captured image data which has been subjected to the given processing by the image processing section 202 to be stored in the server or (ii) the e-mail transmission process for transmitting the e-mail to which the captured image data which has been subjected to the given processing by the image processing section 202 is attached.

The recording medium accessing section 209 reads out a program from a recording medium in which the program is recorded. The storage section 210 serves as a section in which a program for causing the sections of the image output apparatus 200 to carry out their respective processes is stored.

The control section 212 carries out control with respect to the sections included in the image output apparatus 200. In detail, when the first communication section 207 receives the captured image data from the portable terminal apparatus 100, the control section 212 supplies the captured image data to each of the image correction processing sections 301 through 304 of the image processing section 202 so as to control the image processing section 202 to carry out the image processing.

Next, in a case where the first communication section 207 receives the captured image data to which no coordinate information but the edge detection signal represented by "1" is attached, the control section 212 controls the object extraction section 305 of the image processing section 202 to carry out an object extraction process (described later in "(8-4-1)").

In a case where the first communication section 207 receives the captured image data to which the coordinate information and the edge detection signal represented by "1" are attached, the control section 212 controls the object extraction section 305 of the image processing section 202 to carry out another object extraction process (described later in "(8-4-2)").

In a case where the first communication section 207 receives the captured image data to which the color extraction selection signal represented by "1" is attached, the control section 212 controls the object extraction section 305 of the image processing section 202 to carry out still another object extraction process (described later in "(8-4-3)").

As such, the control section 212 also serves as a selecting section for selecting the extraction process to be carried out between the extraction processes of "(8-4-1)", "(8-4-2)", and "(8-4-3)".

Note that in a case where the first communication section 207 receives the captured image data to which the edge detection signal represented by "0" and the color extraction selection signal represented by "0" are attached, the control section 212 does not supply, to the object extraction section 305, any instruction to carry out an extraction process.

In addition, the control section 212 supplies, to the certifying section 203, the user information added to the captured image data so as to control the certifying section 203 to carry out a certification process. When receiving, from the certifying section 203, a certified result that the certification has been successfully carried out, the control section 212 controls the corresponding process to be carried out in accordance with the output process information added to the captured image data.

Namely, in a case where the output process information is indicative of the printing process, the control section 212 controls the image forming section 204 to carry out the printing in accordance with the captured image data which has been subjected to the image processing by the image processing section 202. Alternatively, in a case where the output process information is indicative of the filing process or the e-mail transmission process, the control section 212 controls the second communication section 208 to carry out the filing process or the e-mail transmission process in accordance with the captured image data which has been subjected to the image processing by the image processing section 202.

(8) Image Processing in Image Processing Section

The following describes the image processing carried out by the image processing section 202, more specifically. The image processing section 202 carries out image processing on image data scanned by the image scanning section 201. However, the following deals with image processing to be carried out on the captured image data received from the portable terminal apparatus 100.

In the present embodiment, the image processing section 202 carries out, on the captured image data received from the portable terminal apparatus 100, various image processing as follows: a color balance correction and a contrast correction carried out by the image quality adjusting section 301; a geometric distortion correction carried out by the geometric correction section 302; a lens distortion correction carried out by the lens distortion correction section 303; a high resolution correction carried out by the super-resolution processing section 304; and an object extraction process carried out by the object extraction section 305. These corrections and extraction process are described below more specifically.

(8-1) Color Balance Correction and Contrast Correction

Figures 15, 16:
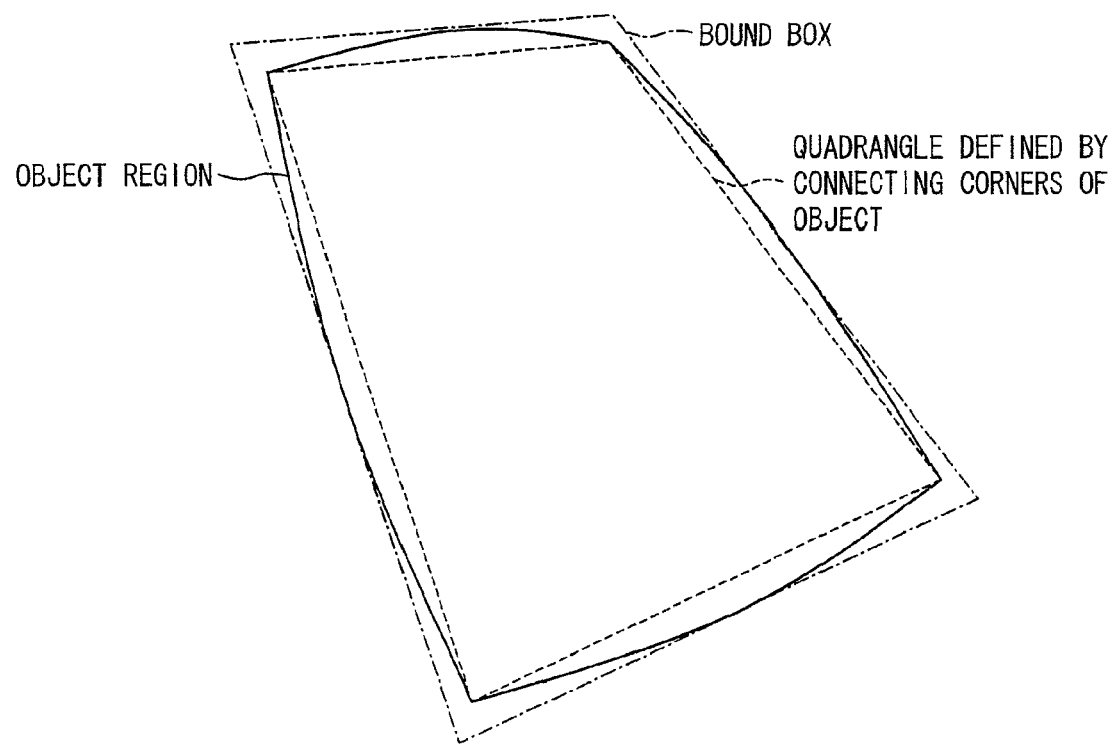
FIG. 15 illustrates an example of a look-up table used during detection of a color balance of an image.
FIG. 16 illustrates an example of a correction for a lens distortion of an image.
Figure 17:
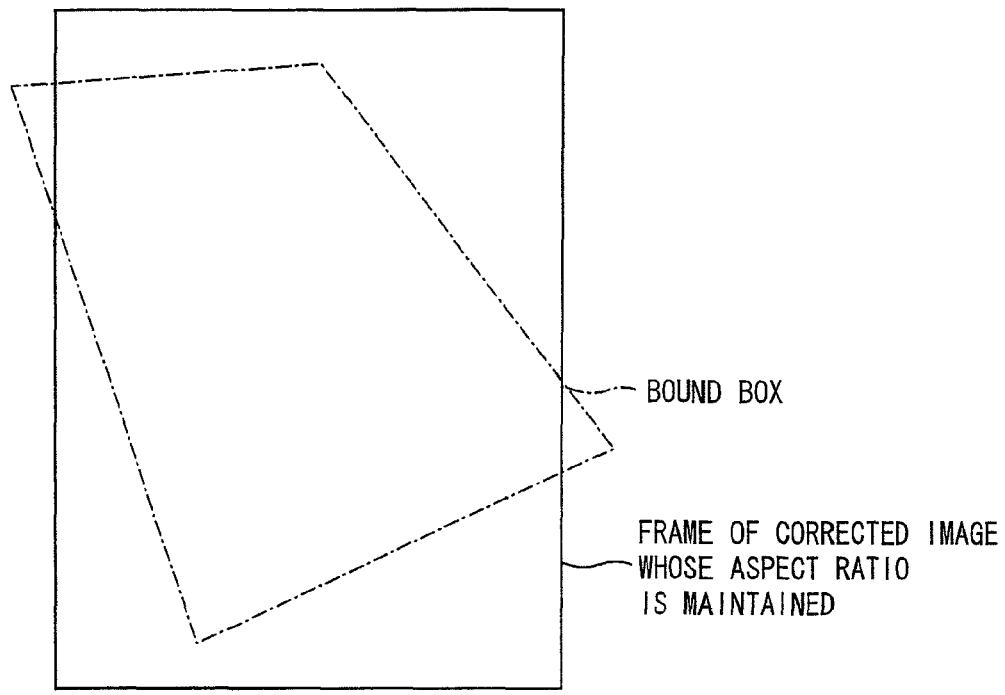
FIG. 17 illustrates an example of a correction for the geometric distortion of an image.
Figure 18:
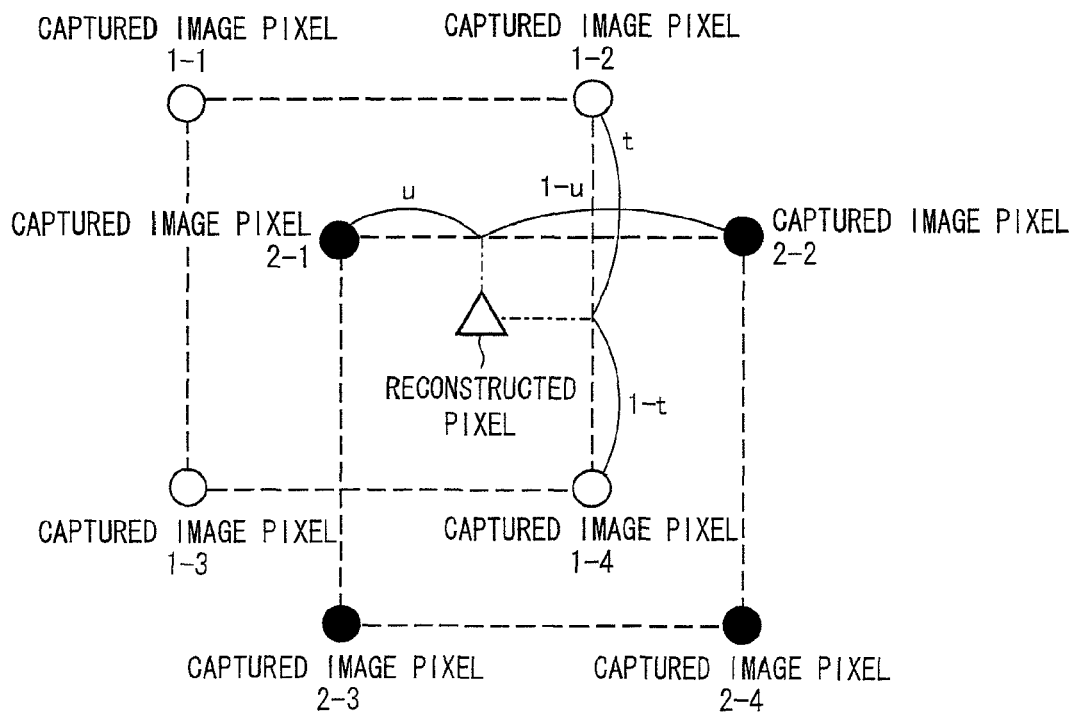
FIG. 18 illustrates an example of determination of a reconstructed pixel value of an image.

A color balance can be corrected in accordance with a method in which the image quality adjusting section 301 calculates maximum and minimum values of the received captured image data for each of the color channels, prepares look-up tables which cause the color channels to have uniform maximum and minimum values, and apply the look-up tables to the respective color channels. FIG. 15 shows an example of the look-up tables. As shown in FIG. 15, in a case where (i) a given channel has a maximum value of MX and a minimum value of MN and (ii) the data has 8 bits, a look-up table can be prepared that causes an increase from MN in increments of (MX−MN)/255.

The image quality adjusting section 301 carries out the contrast correction in a similar manner to the color balance correction. Note that the look-up tables applied to the respective color channels can be identical in a case where it is unnecessary to change a color balance to a specific one.

Note that an alternative publicly-known technique can be applied to the color balance and contrast corrections.

(8-2) Geometric Distortion Correction and Lens Distortion Correction

Like the captured image determination section 102, the geometric correction section 302 sequentially detects, by the raster scanning, points on an edge of the image capture object in the captured image. Then, the image processing section 202 carries out a curve fitting with respect to the points detected on the edge, and carries out the lens distortion correction based on a curvilineal expression.

In detail, the lens distortion correction section 303 detects the edge points of the detected image capture object and classifies, like the captured image determination section 102, the edge points into four groups which correspond to four sides of the image capture object (see solid lines in FIG. 16). Subsequently, the lens distortion correction section 303 carries out a quadratic curve approximation with respect to the edge points which belong to each of the four groups. Four quadratic curves thus determined with respect to the respective four groups correspond to the respective four sides of the image capture object.

In addition, the lens distortion correction section 303 finds four intersections of the four quadratic curves which intersections correspond to corner sections of a region defined by the four quadratic curves. Next, the lens distortion correction section 303 finds a bound box (see one-dot chain lines in FIG. 16) in which the four quadratic curves determined for the respective four sides are circumscribed, and which is similar to a quadrangle (see dotted lines in FIG. 16) defined by connecting the four intersections.

Then, the lens distortion correction section 303 carries out a transformation with respect to the location of pixels in a region where the image capture object is located in the captured image so that the edge pixels of the image capture object which has been corrected are located on the sides of the bound box. Such a transformation can be carried out by carrying out calculations in accordance with vectors from a reference point (e.g., the centroid of the region where the image capture object is located). This allows the lens distortion, due to the image capture section 101 of the portable terminal apparatus 100, to be corrected.

Further, the geometric correction section 302 carries out the geometric distortion correction as below. The geometric correction section 302 can carry out a similar mapping transformation with respect to the bound box, which has been found as described above, in accordance with an aspect ratio (e.g., 7:10 in the case of A-/B-size used when outputting a business document) of the image capture object (see FIG. 17). A publicly-known technique can be used as the mapping transformation. Note that the geometric correction section 302 can carry out the mapping transformation in accordance with an aspect ratio stored in the storage section 210 or an aspect ratio entered from the input section 206.

Note that methods for correcting the geometric distortion and the lens distortion are not limited to the above methods and that publicly-known techniques can be employed for the correction.

(8-3) High Resolution Correction by Use of a Plurality of Pieces of Image Data

As described earlier, the image processing section 202 receives, from the portable terminal apparatus 100, the plurality of pieces of the data of the images captured with respect to the identical image capture object. Then, the super-resolution processing section 304 carries out the high resolution correction in accordance with the plurality of pieces of the captured image data.

As for a method for forming a high resolution image in accordance with a plurality of pieces of image data, several methods are disclosed in the Journal of the Institute of Image Information and Television Engineers Vol. 62, No. 3, pp. 337 through 342 (published in 2008). Generally, the high resolution correction process includes a positioning process for a plurality of images and a reconstructing process. In the present embodiment, the normalized correlation pattern matching (see the description of (3-3)) is used as an example of a positioning process. Namely, it is possible to carry out the positioning for a plurality of images by displacing the plurality of images by an offset amount corresponding to an extreme value of the foregoing S (x, y).

Next, the super-resolution processing section 304 carries out the reconstructing process. Namely, the super-resolution processing section 304 prepares reconstructed image data whose number of pixels corresponds to a magnification obtained after the resolution conversion. Note, however, that a reconstructed image is assumed to have a size identical to that of the captured image. Then, the super-resolution processing section 304 determines pixel values of respective pixels in the reconstructed image data. Namely, the super-resolution processing section 304 selects, from the plurality of captured images, a plurality of pixels of the captured image (captured image pixels) located in the vicinity of each of the pixels (reconstructed pixels) in the reconstructed image data, and then carries out an interpolation with respect to the reconstructed pixel in accordance with a general interpolation method (e.g., a linear interpolation method and a bi-cubic interpolation method).

In detail, two captured image pixels located in the vicinity of a target reconstructed pixel are selected in each of transverse and longitudinal directions. For example, two captured image pixels, whose line segment (see the dotted lines in FIG. 18) is the closest to the target reconstructed pixel, are selected. Assume here that the two captured image pixels selected in the transverse direction are a captured image pixel 1-2 (pixel value: $V_{i1-2}$: pixel values of the following captured image pixels will be similarly indicated) of a first captured image and a captured image pixel 1-4 of the first captured image, whereas the two captured image pixels selected in the longitudinal direction are a captured image pixel 2-1 of a second captured image and a captured image pixel 2-2 of the second captured image. Note that it is assumed that the captured image pixels located in the vicinity of the reconstructed pixel are selected from the plurality of pieces of captured image data which have been subjected to the geometric distortion correction and the lens distortion correction. This makes it possible to carry out the high resolution correction in a state where the geometric distortion and the lens distortion have already been corrected. Alternatively, a coordinate value obtained after the correction can be calculated by taking into consideration the geometric distortion correction and the lens distortion correction for the uncorrected plurality of pieces of captured image data. Namely, it is possible to (i) carry out the reconstruction process after only calculating correction values of the geometric distortion and the lens distortion, and then (ii) carry out the coordinate transformation by use of the correction values.

Subsequently, two intersections of (i) edges each of which is defined by the two points selected in the transverse and longitudinal directions and (ii) straight lines on each of which the target reconstructed pixel is located and each of which is perpendicular to a corresponding one of the edges are found. In a case where the two intersections are internally dividing points of t:1−t and u:1−u on the respective two edges (see FIG. 18), the super-resolution processing section 304 can calculate a pixel value $V_S$ of the target reconstructed pixel in accordance with the following expression (4). It follows that the linear interpolation is carried out. Then, pixel values of all the reconstructed pixels are similarly calculated, so that it is possible to prepare reconstructed image data which has been subjected to the high resolution correction.

$$V_S = \{(1-t)V_{i1-2} + tV_{i1-4} + (1-u)V_{i2-1} + uV_{i2-2}\}/2 \qquad (4)$$

Note that an alternative interpolation method can be employed. Note also that a further method disclosed in the Journal of the Institute of Image Information and Television Engineers Vol. 62, No. 3, pp. 337 through 342 (published in 2008) can be employed. For example, it is possible to employ an interpolation method such as a MAP (Maximum A Posteriori) method in which an assessment function which corresponds to an assumptive posterior probability is first minimized so that the pixel values of all the reconstructed pixels are obtained.

(8-4) Object Extraction Process

The object extraction section 305 carries out a process of extracting a partial region out of the captured image data based on the captured image data, the edge information, the coordinate information, the color extraction selection signal, and the like, which are received by the first communication section 207. The object extraction section 305 carries out, in accordance with information entered from the control section 212, an extraction process in an automatic extraction mode (see the following (8-4-1)), an extraction process in an edge extraction mode (see the following (8-4-2)), or an extraction process in a color extraction mode (a pixel extraction process) (see the following (8-4-3)).

As described above, the object extraction section 305 carries out the respective extraction processes as follows: (A) in a case where the edge detection signal is "1" and no coordinate information has been received from the portable terminal apparatus, the object extraction section 305 carries out, on the captured image data, the extraction process in the automatic extraction mode; (B) in a case where the edge detection signal is "1" and the coordinate information has been received from the portable terminal apparatus, the object extraction section 305 carries out, on the captured image data, the extraction process in the edge extraction mode; and (C) in a case where the color extraction selection signal is "1", the object extraction section 305 carries out, on the captured image data, the extraction process in the color extraction mode. That is, the object extraction section 305 functions either as the edge extraction processing section that carries out an extraction process based on the edge information (see the following (8-4-1) and (8-4-2)), or as the density value extraction processing section that carries out an extraction process based on colors (pixel values (density values)) (see the following (8-4-3)).

(8-4-1) Extraction Process in Automatic Extraction Mode (Extraction Process Based on Only Edge Information)

The object extraction section 305 carries out a process of extracting a partial region out of a captured image based on edge information. The following describes the process more specifically.

Initially, the object extraction section 305 specifies, in each captured image, positions of line segments indicated by all pieces of received edge information. Then, the object extraction section 305 determines whether or not a position of each end of each of the line segments coincides with that of an end of another line segment. More specifically, if line segments have one ends having identical coordinates, the object extraction section 305 can determine that the respective one ends of the line segments are located at the same position. In a case where a quadrangle in which (i) sides thereof are constituted by line segments each having ends each of which coincides with an end of another line segment and (ii) all internal angles are less than 180° is detected, the object extraction section 305 determines that a region enclosed by the quadrangle is an extraction region.

In a case where several quadrangles in each of which (i) sides are constituted by line segments each having ends each of which coincides with an end of another line segment and (ii) all internal angles are less than 180° are detected, the object extraction section 305 may determine, as the extraction region, a region enclosed by a quadrangle having the largest area among them. Alternatively, all the detected quadrangles may be displayed on the display section so that the user selects one from among the quadrangles. Accordingly, the object extraction section 305 may determine, as the extraction region, a region enclosed by the quadrangle selected by the user.

Figure 21:
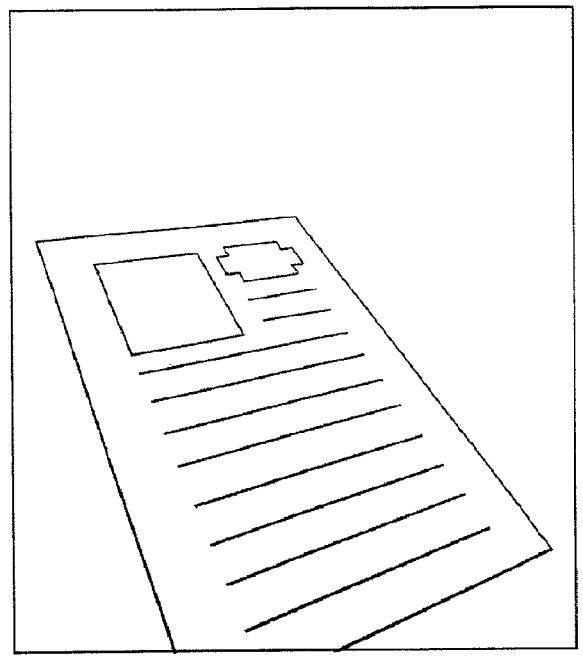
FIG. 21 illustrates an image in which a part of an object is not captured.

On the other hand, in a case where no such quadrangle in which (i) sides are constituted by line segments each having ends each of which coincides with an end of another line segment and (ii) all internal angles are less than 180° is detected (for example, in a case of an image in which an image capture object is only partially captured as shown in FIG. 21), the object extraction section 305 finds a line segment having an end that does not coincide with an end of any other line segment, and specifies the end as a non-connected end. Subsequently, the object extraction section 305 determines whether or not the non-connected end is located on any side of the captured image. Here, a side of the captured image indicates an upper side, a lower side, a left side, or a right side of the captured image having a rectangular shape, i.e., an end portion of the captured image having a rectangular shape. In other words, a side of the captured image indicates a line segment that constitutes an outer peripheral edge (frame) of the captured image having a rectangular shape.

Then, the object extraction section 305 extracts, as candidate line segments, line segments each satisfying any one of the following conditions: (a) either end thereof coincides with an end of another line segment; (b) one end thereof coincides with an end of another line segment, and the other end thereof is a non-connected end located on a side of the captured image; and (c) each end thereof is located on a side of the captured image. The object extraction section 305 then detects a polygon in which (i) sides are constituted by the candidate line segments and a line segment(s) located on a side of the captured image and (ii) all internal angles are less than 180°. In a case where such a polygon is detected, the object extraction section 305 determines, as the extraction region, a region enclosed by the polygon. In a case where several polygons like above are detected, the object extraction section 305 may determine, as the extraction region, a region enclosed by a polygon having the largest area among them. Alternatively, the detected polygons may be displayed on the display section 205 so that the user can select one from among the polygons. Accordingly, the object extraction section 305 may determine, as the extraction region, a region enclosed by the polygon selected by the user.

In a case where no such polygon is detected, the object extraction section 305 determines it difficult to extract a partial region based on only the edge information, and then determines the whole captured image as an output target region.

Subsequently, the object extraction section 305 cuts out the determined extraction region from the captured image, and prepares output target image data. In a case where the whole captured image is determined as the output target region, the object extraction section 305 may determine the whole captured image data as the output target image data.

Figure 22:
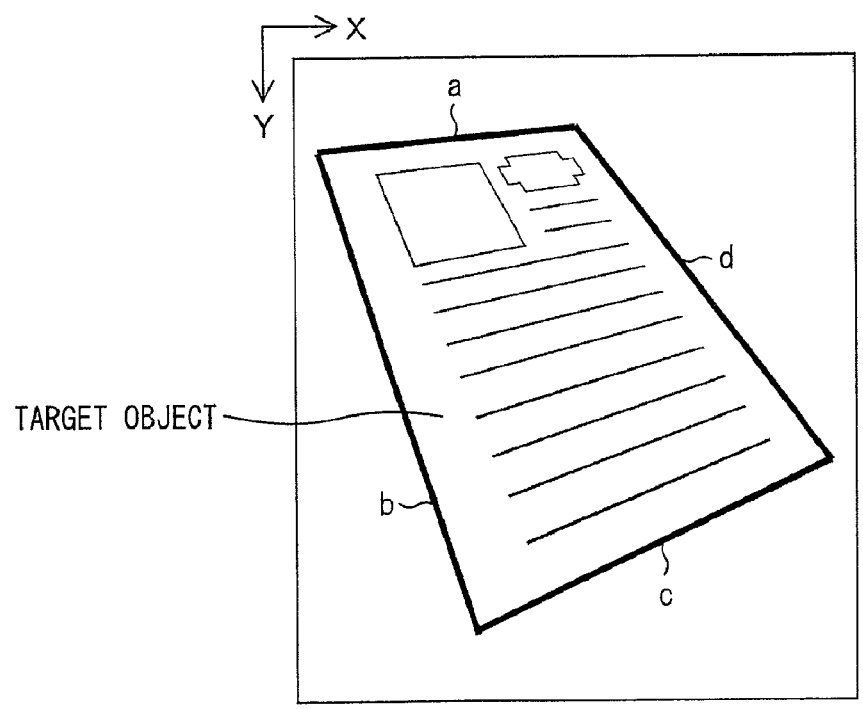
FIG. 22 illustrates a state where an object is extracted from an image.

For example, in the captured image shown in FIG. 22, a region surrounded by line segments a, b, c, and d, which are indicated by respective pieces of edge information, is determined as the extraction region.

(8-4-2) Extraction Process in Edge Extraction Mode (Extraction Process Based on Edge Information and Coordinate Information)

The object extraction section 305 carries out a process of extracting a partial region from a captured image base on edge information and coordinate information. The following describes the process more specifically.

Initially, the object extraction section 305 specifies, in each captured image, positions of line segments indicated by all pieces of received edge information. Then, the object extraction section 305 determines whether or not a position of each end of each of the line segments coincides with that of an end of another line segment. More specifically, if line segments have one ends having identical coordinates, the object extraction section 305 can determine that the respective one ends of the line segments are located at the same position. In a case where a quadrangle in which (i) sides thereof are constituted by line segments each having ends each of which coincides with an end of another line segment and (ii) all internal angles are less than 180° is detected, the object extraction section 305 determines, as an extraction region candidate, a region enclosed by the quadrangle.

Further, the object extraction section 305 finds a line segment having an end that does not coincide with an end of any other line segment, and specifies the end as a non-connected end. Then, the object extraction section 305 determines whether or not the non-connected end is located on any side of the captured image.

After that, the object extraction section 305 extracts, as candidate line segments, line segments each satisfying any one of the following conditions: (a) either end thereof coincides with an end of another line segment; (b) one end thereof coincides with an end of another line segment, and the other end thereof is a non-connected end located on a side of the captured image; and (c) either end thereof is located on a side of the captured image. The object extraction section 305 then detects a polygon in which (i) sides are constituted by the candidate line segments and a line segment(s) located on a side of the captured image and (ii) all internal angles are less than 180°. In a case where such a polygon is detected, the object extraction section 305 determines, as the extraction region candidate, a region enclosed by the polygon.

From among the extraction region candidates found as such, the object extraction section 305 selects one extraction region candidate that encompasses coordinates indicated by the coordinate information, and then determines, as an extraction region, the selected extraction region candidate.

In a case where there are several extraction region candidates each encompassing the coordinates indicated by the coordinate information, the object extraction section 305 may determine, as the extraction region, an extraction region candidate having the largest area among them. Alternatively, all the extraction region candidates each encompassing the coordinates indicated by the coordinate information may be displayed on the display section so that the user can select one of the extraction region candidates. Accordingly, the object extraction section 305 may determine, as the extraction region, the extraction region candidate selected by the user.

In a case where there is no such extraction region candidate, or in a case where there is no extraction region candidate encompassing the coordinates indicated by the coordinate information, the object extraction section 305 determines it difficult to extract a partial region, and then determines the whole captured image as an output target region.

Subsequently, the object extraction section 305 cuts out the determined extraction region from the captured image, and prepares output target image data. In a case where the whole captured image is determined as the output target region, the object extraction section 305 may determine the whole captured image data as the output target image data.

(8-4-3) Extraction Process in Color Extraction Mode (Process Based on Pixel Value of Pixel at Position Indicated by Coordinate Information)

The object extraction section 305 finds a typical color within a given range (for example, a 5-mm square) including a position indicated by coordinate information. For example, the object extraction section 305 may find, as the typical color, a color (pixel value) distributed most frequently in a plurality of pixels within the given range. As another example, the object extraction section 305 may find, as the typical color, a color (pixel value) distributed with a frequency of not less than a given threshold, among the plurality of pixels within the given range. Alternatively, the object extraction section 305 may calculate, as the typical color, an average of pixel values of the plurality of pixels within the given range.

Subsequently, the object extraction section 305 extracts, from the whole captured image, pixels each having a pixel value within a range of, for example, −5 to +5 with respect to the pixel value of the typical color. Then, the object extraction section 305 forms respective histograms of (a) X-coordinates of the extracted pixels, along a horizontal (X) axis, and (b) Y-coordinates of the extracted pixels, along a vertical (Y) axis. Subsequently, the object extraction section 305 extracts, from each of the histograms, segment groups each including continuous segments each having a frequency of not less than a given threshold. The given threshold is set by use of many image samples so that a target image region can be extracted as appropriate.

After that, the object extraction section 305 specifies, as a candidate segment group, a segment group including a segment encompassing coordinates indicated by the coordinate information. Further, the object extraction section 305 calculates a distance between the candidate segment group and a segment group adjacent to the candidate segment group. In a case where the distance is, for example, 50 pixels or more, the object extraction section 305 determines that the adjacent segment group is not included in the candidate segment group. In this case, the object extraction section 305 determines only the candidate segment group as an extraction target segment group that is to be extracted. On the other hand, in a case where the distance between the candidate segment group and the segment group adjacent to the candidate segment group is less than 50 pixels, the object extraction section 305 determines that the adjacent segment group is included in the candidate segment group. In this case, the object extraction section 305 determines, as a new candidate segment group, a segment group from a segment having the smallest coordinate among these two segment groups to a segment having the largest coordinate among the two segment groups.

The object extraction section 305 then calculates a distance between the new candidate segment group and a segment group adjacent to the new candidate segment group, and carries out the same process described as above. By repeating the process as such, the object extraction section 305 determines an extraction target segment group in each of the histograms. The distance used for determination of the target segment group to be extracted depends on a resolution of reading image data. On this account, reference values for the distance may be set in accordance with various resolutions for reading by use of various image samples.

Subsequently, the object extraction section 305 finds a minimum coordinate and a maximum coordinate in the determined target segment group to be extracted, for each of the X-axis and the Y-axis from the corresponding histogram. Accordingly, the object extraction section 305 determines, as an extraction region, a rectangular region having 4 vertices of (Xmin, Ymin), (Xmin, Ymax), (Xmax, Ymin), and (Xmax, Ymax), where Xmin and Xmax are respectively the minimum coordinate and the maximum coordinate in the determined extraction target segment group in the X-axis, and Ymin and Ymax are respectively the minimum coordinate and the maximum coordinate in the determined extraction target segment group in the Y-axis.

Figure 23:
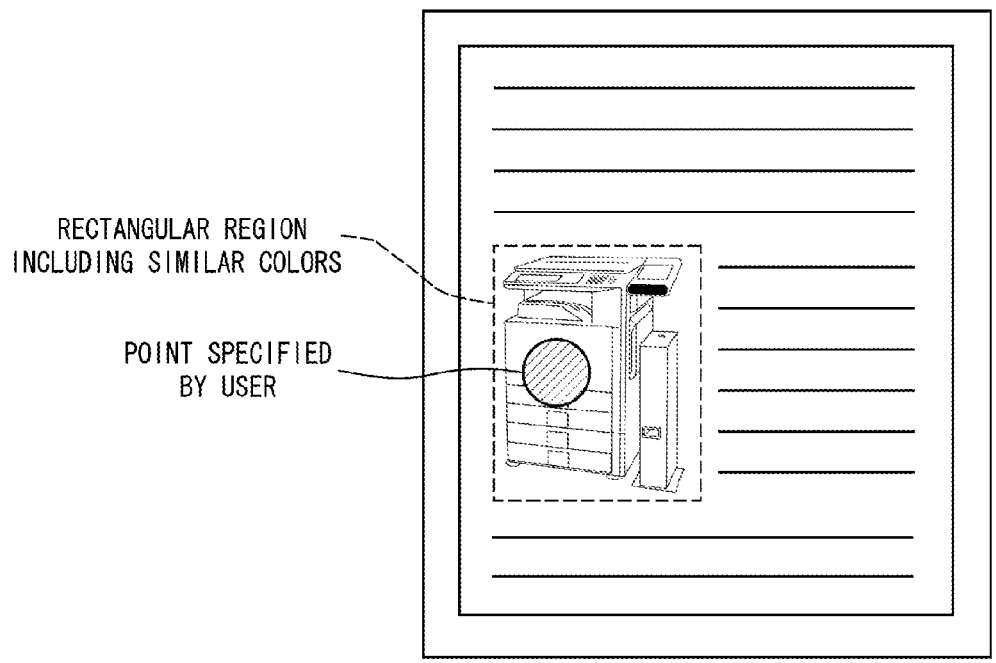
FIG. 23 illustrates an exemplary process of color extraction of an image.

The process may be also explained in other words as follows: As illustrated in FIG. 23, the object extraction section 305 determines, as the extraction region, such a circumscribed rectangular region (i) which includes a point indicated by the coordinate information and (ii) which is a region of a connected component of pixels having colors similar to the typical color of the point (that is, pixels having pixel values that fall within a given range including the pixel value of the typical color).

Lastly, the object extraction section 305 cuts out the determined extraction region from the captured image, and prepares output target image data. The object extraction section 305 may determine, as the extraction region, a region (i) which includes the rectangular region found as above and (ii) which has an area about 10% larger than that of the rectangular region.

(9) Image Processing Method Carried Out in Captured Image Processing System

Figure 1:
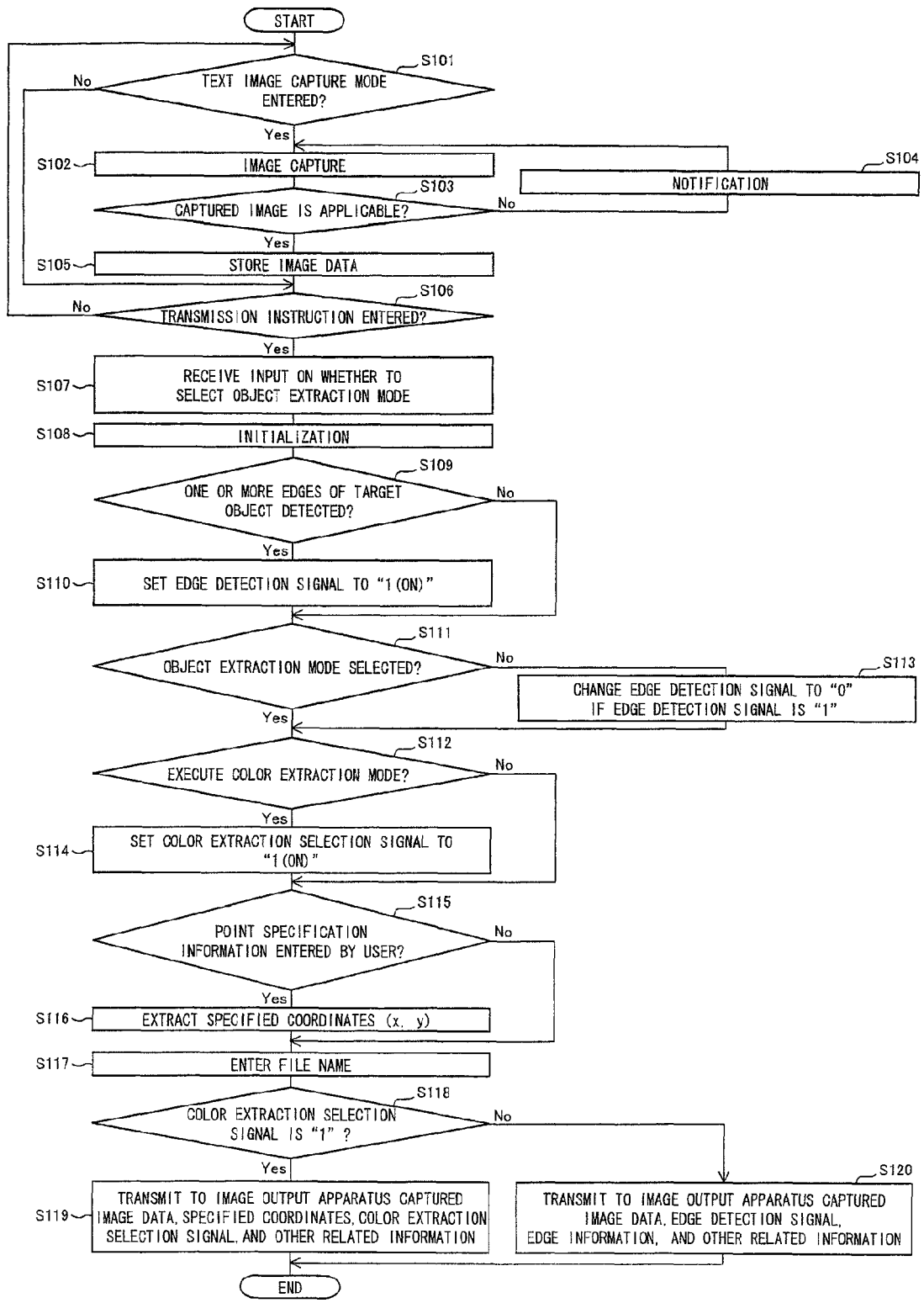
FIG. 1 is a flow chart illustrating a captured image processing method carried out in a captured image processing system of the present invention, and illustrates a flow in a portable terminal apparatus.
Figure 2:
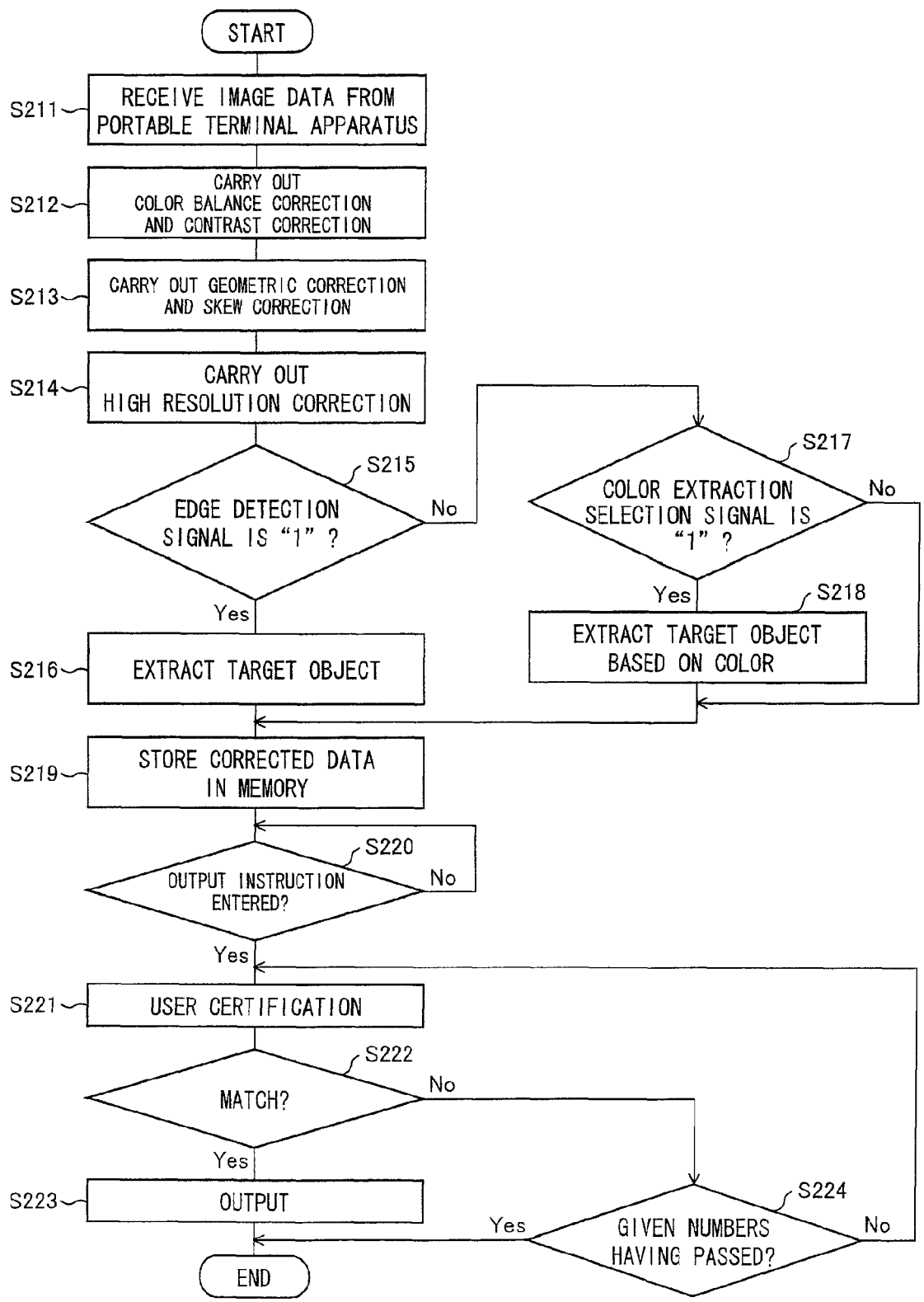
FIG. 2 is a flow chart illustrating a captured image processing method carried out in a captured image processing system of the present invention, and illustrates a flow in an image output apparatus.

A flow of processes carried out in the captured image processing system is described below with reference to FIG. 1 and FIG. 2. Note that FIG. 1 illustrates a processing flow in the portable terminal apparatus 100, and FIG. 2 illustrates a processing flow in the image output apparatus 200.

First, the portable terminal apparatus 100 receives a selection of an image capture mode. That is, the control section 109 of the portable terminal apparatus 100 determines whether or not a text image capture mode is inputted or not (S 101). Here, the user selects the text image capture mode in a case where the user (i) carries out image capture with respect to a rectangular image capture object such as paper on which a text image is printed or a display screen on which the text image is displayed and (ii) wishes the image output apparatus 200 to output a captured image.

In the case where the user selects the text image capture mode (YES in S101), the control section 109 controls the display section 105 to display a window which urges the user to enter, from the input section 106, a magnification of resolution conversion required for the high resolution correction. This allows the control section 109 to obtain the magnification which the user entered from the input section 106. The control section 109 determines, in accordance with the magnification, (i) the number of times of image capture carried out by the image capture section 101 and (ii) a part of the process execution requirements which is used in the captured image determination section 102. Further, the control section 109 controls the display section 105 to display a window which urges the user to enter, from the input section 106, (i) a kind of an output process and (ii) a setting requirement for carrying out the output process. This allows the control section 109 to obtain output process information entered from the input section 106.

Then, the image capture section 101 consecutively carries out image capture as many times as the control section 109 sets (S102).

After the image capture, the image processing section 103 carries out at least the A/D conversion process with respect to a plurality of pieces of captured image data (multiple captured image data). Then, the control section 109 controls the captured image determination section 102 to determine whether or not the plurality of pieces of captured image data which have been subjected to the A/D conversion process meet the process execution requirements (S103). Note that details of how to determine and items to be determined are as described earlier, for example, in (3-1) through (3-3).

In a case where the captured image determination section 102 determines that the process execution requirements are met (YES in S103), the control section 109 controls the storage section 108 to store pieces of captured image data that are determined to meet the process execution requirements (S105). Then, the process proceeds to S106.

On the other hand, in a case where the captured image determination section 102 determines that no process execution requirements are met (NO in S103), the control section 109 controls the display section 105 to display a message urging image capture to be carried out again, so that the user is notified of the message (S104). In a case where even an image which has been captured again meets no determination items as mentioned above, the portable terminal apparatus 100 repeatedly carries out the processes of S102 through S104.

Subsequently, in S106, the control section 109 determines whether or not the user enters a transmission instruction to transmit the pieces of captured image data to the image output apparatus. In a case where no transmission instruction is entered (NO in S106), the process of the control section 109 returns to S101.

On the other hand, in a case where the transmission instruction is entered (YES in S106), the control section 109 receives an input indicative of whether the user selects an object extraction mode or not (S107).

Even in a case where the user does not select the text image capture mode at the time of selecting the image capture mode (NO in S101), the control section 109 determines whether or not the user enters the transmission instruction to transmit the pieces of captured image data (S106). Even in the case where the text image capture mode is not selected, if the user enters the transmission instruction to transmit the pieces of captured image data (YES in S106), the control section 109 receives a user input indicative of whether the user selects an object extraction mode or not (S107).

In a case where the user wants to extract a partial region from a captured image and output an image of the partial region, the user can enter an instruction to select the object extraction mode, into the portable terminal apparatus 100. Meanwhile, in a case where the user wants to output the whole captured image, the user can enter an instruction not to select the object extraction mode.

Subsequently, the control section 109 sets the edge detection signal and the color extraction selection signal to zero (0), so as to initialize the edge detection signal and the color extraction selection signal (S108).

The control section 109 then determines whether or not the captured image determination section 102 generates at least one piece of edge information with respect to the captured image data that is a transmission target of the transmission instruction. That is, the control section 109 determines whether or not at least one group of edge pixels connected with each other in the form of a line segment is detected in the captured image data (S109).

In a case where at least one piece of edge information is generated (YES in S109), the control section 109 sets the edge detection signal to "1" (S110). Then, the control section 109 determines whether or not the user selects the object extraction mode (S111).

On the other hand, in a case where the control section 109 determines that no edge of the image capture object is detected (NO in S109), the control section 109 determines, without changing the edge detection signal, whether or not the user selects the object extraction mode (S111).

In a case where the user select the object extraction mode (YES in S111), the process of the control section 109 proceeds to S112. Meanwhile, in a case where the user does not select the object extraction mode (NO in S111), the control section 109 determines that a non-extraction mode for outputting a whole captured image is to be executed. In this case, if the edge detection signal is "1", the control section 109 changes the edge detection signal to "0" (S113). Then, the process of the control section 109 proceeds to S112.

Then, the control section 109 determines whether or not the color extraction mode is to be executed or not, based on whether or not the user selects the color extraction mode (S112).

More specifically, in a case of YES in S109, YES in S111, and the color extraction mode being selected, the control section 109 prioritizes an object extraction mode based on edges, and determines that the color extraction mode is not to be executed. At this point, the control section 109 controls the display section 105 to display a notification that the object extraction mode based on edges is prioritized so that the color extraction mode is not to be executed.

In the case of YES in S109, YES in S111, and the color extraction mode being selected, the control section 109 may control the display section 105 to display a window which urges the user to enter an instruction on whether the object extraction mode based on edges should be prioritized or the color extraction mode should be executed, so that the user can select which mode is to be prioritized. In this case, when the user enters an instruction to select the color extraction mode, the control section 109 can determine that the color extraction mode is to be executed.

In a case of YES in S109, YES in S111, and no color extraction mode being selected, the control section 109 determines that the color extraction mode is not to be executed.

Further, in a case of NO in S109, YES in S111, and the color extraction mode being selected, the control section 9 determines that the color extraction mode is to be executed.

In this manner, the control section 109 determines whether the color extraction mode is to be executed or not. In a case where the control section 109 determines that the color extraction mode is to be executed (YES in S112), the control section 109 sets the color extraction selection signal to "1" (S114). Then, the process of the control section 109 proceeds to S115. On the other hand, in a case where the control section 109 determines that the color extraction mode is not to be executed (NO in S112), the control section 109 keeps the color extraction selection signal to be "0". Then, the process of the control section 109 proceeds to S115.

In a case of NO in S109, YES in S111, and no color extraction mode being selected, the control section 109 determines that no extraction process can be carried out even though the object extraction mode is selected. In this case, the control section 109 determines that the non-extraction mode for outputting a whole captured image is to be executed. At this time, the control section 109 may control the display section 105 to display a message that the object extraction mode based on edges is inexecutable.

Then, the control section 109 controls the display section 105 to display the captured image together with a notification urging the user to enter an instruction to specify any one point in a region to be extracted (S115). The control section 109 then determines whether or not the user enters an instruction to specify a certain point in the region to be extracted.

Note that in a case where the control section 109 determines, in S114, that the color extraction mode is to be executed, the control section 109 waits for the user to enter the instruction to specify a certain point in the region to be extracted. This is because the execution of the color extraction mode requires the specification of a certain point in the region to be extracted. That is, in the case where the control section 109 determines, in S114, that the color extraction mode is to be executed, the control section 109 waits until YES in S115. During the waiting, the control section 109 does not receive any process instruction except for the instruction to specify a certain point in the region to be extracted. Accordingly, in the case where the control section 109 determines, in S114, that the color extraction mode is to be executed, the process of the control section 109 definitely proceeds from S115 to S116. On the other hand, in a case of NO in S112, the control section 109 controls the display section 105 to display a window which urges the user to enter an instruction on whether to specify a certain point in the region to be extracted. When receiving an instruction that the user will perform point specification, the control section 109 controls the display section 105 to display a notification for urging the user to specify any one point in the region to be extracted. Therefore, in the case of NO in S112, either of YES and NO may be likely to happen in S115.

In a case where the instruction to specify a certain point in the region to be extracted is entered (YES in S115), the control section 109 controls the specified-region extraction section 110 to generate coordinate information indicative of coordinates (x, y) of the specified point (S116). In a case of NO in S112 and YES in S115, the control section 109 determines that the edge extraction mode is to be executed. After that, the control section 109 assigns file names to a respective plurality of pieces of captured image data that meet the process execution requirements (S117).

On the other hand, in a case where no instruction to specify a certain point in the region to be extracted is entered (NO in S115), the control section 109 assigns file names to the respective plurality of pieces of captured image data that meet the process execution requirements (S117). In a case of NO in S112 and NO in S115, the control section 109 determines that the automatic extraction mode is to be executed.

In S117, the control section 109 can automatically assign, to the respective plurality of pieces of captured image data, (a) different file names (e.g., serial numbers which vary in accordance with image capture date and time) or (b) file names entered from the input section 106.

Thereafter, the control section 109 determines whether or not the color extraction selection signal is "1" (S118). In a case where the control section 109 determines that the color extraction selection signal is "1" (YES in S118), the control section 109 transfers to the communication section 104 the pieces of captured image data, to which the file names are assigned, together with (i) the output process information, the edge detection signal, the color extraction selection signal, and the coordinate information, and (ii) information on the model of the portable terminal apparatus 100 and user information which are stored in the storage section 108. Then, the communication section 104 transmits these pieces of information to the image output apparatus 200 (S119).

On the other hand, in a case where the control section 109 determines that the color extraction selection signal is "0" (NO in S118), the control section 109 transfers to the communication section 104 the pieces of captured image data, to which the file names are assigned, together with (i) the output process information, the edge information, the edge detection signal, the color extraction selection signal, and the coordinate information, and (ii) the information on the model of the portable terminal apparatus 100 and the user information which are stored in the storage section 108. Note that in a case where the control section 109 determines that the automatic extraction mode is to be executed (in a case of NO in S112 and NO in S115), no coordinate information is generated. Therefore, the control section 109 transfers to the communication section 104 the pieces of information except for the coordinate information. Then, the communication section 104 transmits these pieces of information to the image output apparatus 200 (S120).

Here, assume that a captured image data set is a group of a plurality of pieces of captured image data that are obtained by consecutive image capture by a single shutter click. In a case where there are a plurality of captured image data sets (i) which are stored in the storage section 108 and (ii) which have not been transmitted to the image output apparatus 200, the control section 109 carries out the processes of S106 through S120 with respect to each of the plurality of captured image data sets.

The following describes a process carried out by the image output apparatus 200, with reference to FIG. 2. Initially, the first communication section 207 of the image output apparatus 200 receives, from the portable terminal apparatus 100, the plurality of pieces of captured image data, the information of the model of the portable terminal apparatus 100, the user information, the output process information, and the like information (S211). The first communication section 207 receives these pieces of information per captured image data set. Processes of S212 and its subsequent steps are carried out per captured image data set.

After the first communication section 207 receives the captured image data set and its related information, the image quality adjusting section 301 of the image processing section 202 carries out the color balance correction and the contrast correction, as described in (8-1), for example (S212). Further, the geometric correction section 302 and the lens distortion correction section 303 of the image processing section 202 carry out the geometric distortion correction and the lens distortion correction, respectively, as described in (8-2), for example (S213). In a case where no quadrangle having sides constituted by line segments located at positions indicated by four pieces of edge information is detected, the process of S213 is omitted. Further, the super-resolution processing section 304 of the image processing section 202 carries out the high resolution correction based on the plurality of pieces of captured image data, as describe in (8-3), for example (S214).

After that, the control section 212 determines whether or not the edge detection signal received from the portable terminal apparatus 100 is "1" (S215). In a case where the edge detection signal is "1" (YES in S215), the control section 212 instructs the object extraction section 305 to carry out its process. More specifically, in a case where the first communication section 207 receives no coordinate information, the control section 212 controls the first communication section 207 to output the received captured image data and the received edge information to the object extraction section 305 so that the object extraction section 305 carries out the extraction process described in (8-4-1) and prepares output target image data of the extraction region (S216). Further, in a case where the first communication section 207 receives the coordinate information, the control section 212 controls the first communication section 207 to output the captured image data, the coordinate information, and the edge information to the object extraction section 305 so that the object extraction section 305 carries out the extraction process described in (8-4-2) and prepares output target image data of the extraction region (S216). In a case where the captured image data is subjected to the mapping transformation in S213, a position indicated by the edge information and coordinates indicated by the coordinate information are also subjected to the mapping transformation. Then, the object extraction section 305 may carry out the process of S216 by use of the transformed position and coordinates. After that, the control section 212 controls the storage section 210 to store the output target image data, which is prepared by the object extraction section 305, in association with the user information, the output process information, and the like information (S219).

Meanwhile, in a case where the control section 212 determines that the edge detection signal received from the portable terminal apparatus 100 is "0" (NO in S215), the control section 212 determines whether or not the color extraction selection signal "1" (S217). In a case where the color extraction selection signal is "1" (YES in S217), the control section 212 controls the first communication section 207 to output the captured image data and the coordinate information to the object extraction section 305 so that the object extraction section 305 carries out the extraction process described in (8-4-3) and prepares output target image data of the extraction region (S218). Then, the control section 212 controls the storage section 210 to store the output target image data, which is prepared by the object extraction section 305, in association with the user information, the output process information, and the like information. (S219).

In contrast, in a case where the color extraction selection signal is "0" (NO in S217), the control section 212 does not cause the captured image data to be outputted to the object extraction section 305. Instead, the control section 212 controls the storage section 210 to store the captured image data that has been only subjected to the correction processes of S212 through S214, as output target image data (S219).

Subsequently, the control section 212 determines whether or not an output instruction to output the output target image data is entered from the input section 206 (S220). In a case where no output instruction is entered (NO in S220), the control section 212 waits for the output instruction to be entered.

In contrast, in a case where the output instruction is entered (YES in S220), the certifying section 203 controls the display section 205 to display a window urging user information (such as a user ID or a password) to be entered from the input section 206. This allows the user information to be entered from the input section 206. Then, the certifying section 203 carries out user certification (S221). Note that the certifying section 203 can alternatively obtain the user information from a non-contact IC card possessed by the user with the use of a non-contact IC card reader/writer included in the image output apparatus 200.

During the user certification, the certifying section 203 (i) compares the user information entered from the input section 206 with the user information received from the portable terminal apparatus 100 and (ii) determines whether or not these pieces of information match each other (S222). In a case where the image output apparatus 200 receives, from the portable terminal apparatus 100, the user information which matches the user information entered from the input section 206 (YES in S222), the control section 212 controls the output process to be carried out in accordance with the output process information received from the portable terminal apparatus 100 (S223). For example, in a case where the output process information is indicative of the printing process, the control section 212 supplies, to the image forming section 204, an instruction to carry out the printing process. Thereafter, the processing flow is ended.

In contrast, the user information entered from the input section 206 does not match the user information received from the portable terminal apparatus 100 (NO in S222), the certifying section 203 determines whether or not the certification is carried out not less than a given times (S224). In a case where the certification is carried out less than the given times (NO in S224), S221 and S222 processes are repeated. In a case where the certification is carried out not less than the given times (YES in S224), the processing flow is ended with no output.

As described above, according to the present embodiment, the image output apparatus 200 includes the first communication section (a receiving section) for receiving, from the portable terminal apparatus 100, captured image data captured by the image capture section 101. The first communication section (an edge information obtaining section) of the image output apparatus 200 obtains edge information indicative of where an edge pixel group is positioned on a captured image of the captured image data. Here, the edge pixel group is a group of edge pixels connected to each other in the form of a line segment and is detected in the captured image of the captured image data. Subsequently, the object extraction section (the edge extraction processing section) 305 of the image output apparatus 200 determines, as an extraction region, either (a) a quadrangular region enclosed by a quadrangle in which (i) sides thereof are constituted by 4 edge pixel groups each in the form of a line segment, the 4 edge pixel groups being indicated by the edge information, and (ii) all internal angles are less than 180°, or (b) a polygonal region enclosed by a polygon in which (i) sides thereof are constituted by at least one edge pixel group in the form of a line segment, indicated by the edge information, and at least one line segment located on an end portion (side) of the captured image and (ii) in which all internal angles are less than 180°. The object extraction section 305 then cuts out image data of the extraction region from the captured image data, as output target image data. Then, the image forming section (an output section) 204 or the second communication section (an output section) 208 outputs the output target image data or an image of the output target image data.

The control section 109 of the portable terminal apparatus 100 sets the edge detection signal so as to indicate how many edges are extracted from the received edge information, and then controls the communication section 104 to carry out the transmission process of transmitting, to the image output apparatus 200, the captured image data from which edges are detected, the edge information, and the edge detection signal.

On the other hand, the control section 212 of the image output apparatus 200 determines whether or not edges are detected, based on the edge detection signal received by the communication section 207. The control section 212 then causes the captured image data, from which edges are detected, and the edge information to be outputted to the object extraction section 305 of the image processing section 202. Subsequently, the object extraction section 305 extracts, as a selected region, an image capture object from the captured image data based on the captured image data from which edges are detected and the edge information.

Then, the object extraction section 305 outputs, to the control section 212, captured image data of the extracted selected region. The control section 212 controls the storage section 210 to store the captured image data of the extracted selected region in association with the output process information and the like information. After that, in a case where the user enters an output instruction, the control section 212 outputs a process execution instruction to the image forming section 204.

This allows the user to extract an intended image capture object from an image captured by the portable terminal apparatus 100 and to easily obtain an image of the extracted image captured object from the image output apparatus 200.

(10) Modifications

The captured image processing system of the present invention is not limited to the description of the embodiment above, but can be variously modified. An example of a modified embodiment is described below.

(10-1) Extraction Mode

In the above description, the captured image processing system includes 3 modes as the object extraction mode: the automatic extraction mode; the edge extraction mode; and the color extraction mode.

However, the present invention is not limited to the captured image processing system that includes these 3 modes. For example, the captured image processing system may be capable of executing an extraction process only in at least one mode selected from among the automatic extraction mode, the edge extraction mode, and the color extraction mode.

(10-1-1) Modified Embodiment Including Only Automatic Extraction Mode

Figure 25:
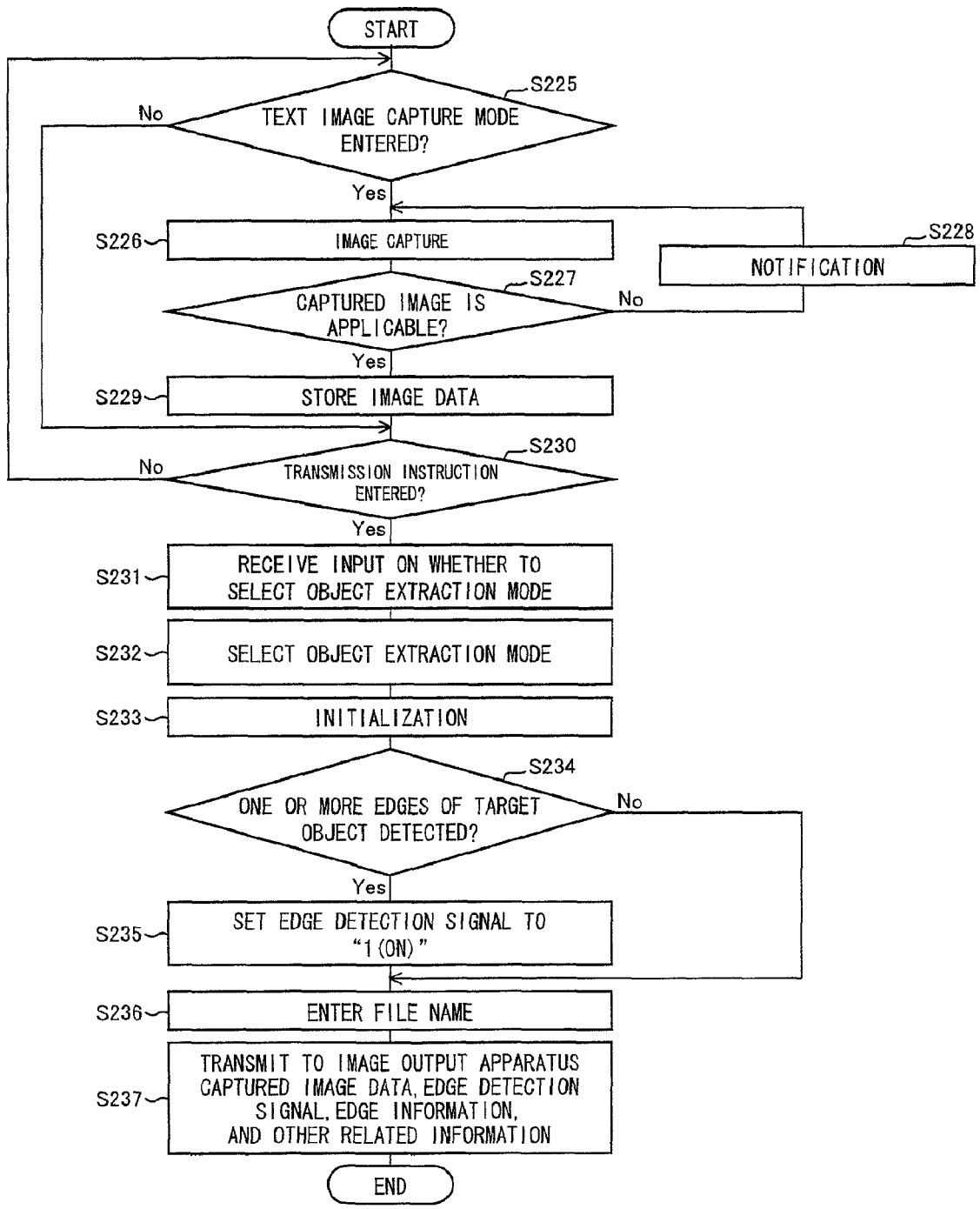
FIG. 25 is a flow chart illustrating a captured image processing method in a captured image processing system according to a modified example of the present invention, and illustrates a flow of a portable terminal apparatus.

For example, the captured image processing system may include only the automatic extraction mode as the object extraction mode. FIG. 25 is a flow chart illustrating a process flow of the portable terminal apparatus 100 in the captured image processing system including only the automatic extraction mode as the object extraction mode. In FIG. 25, processes from S225 to S230 are the same as the processes from S101 to S106 in FIG. 1, and therefore are not described here. As illustrated in FIG. 25, when a transmission instruction is entered from the input section 106, the control section 109 of the portable terminal apparatus 100 receives a user input indicative of whether to select the object extraction mode (S231). FIG. 25 illustrates a process in a case where the user enters a selection instruction to select the object extraction mode (S232). Subsequently, the control section 109 sets the edge detection signal and the color extraction selection signal to "0" so as to initialize the edge detection signal and the color extraction selection signal (S233).

After that, the control section 109 determines whether or not the captured image determination section 102 generates at least one piece of edge information with respect to captured image data that is a transmission target to be transmitted according to the transmission instruction (S234). In a case where at least one piece of edge information is generated (YES in S234), the control section 109 determines execution of the automatic extraction mode, and sets the edge detection signal to "1" (S235).

In contrast, in a case where no edge of the image capture object is detected (NO in S234), the control section 109 determines that the extraction process is inexecutable even though the object extraction mode is selected. Accordingly, the control section 109 determines that the non-extraction mode for outputting a whole captured image is to be executed. Then, the process of the control section 109 proceeds to S236, without changing the edge detection signal.

Subsequently, similarly in S117 in FIG. 1, the control section 109 assigns a file name to the captured image data (S236), and transmits to the image output apparatus 200 the captured image data, to which the file name is assigned, and its related information (S237). The related information to be transmitted is the pieces of information described in (6) except for the color extraction selection signal.

FIG. 25 illustrates the case where the object extraction mode is selected as shown in S232. However, in a case where no selection instruction to select the object extraction mode is entered in S231, the processes of S234 and S235 may be omitted.

Figure 27:
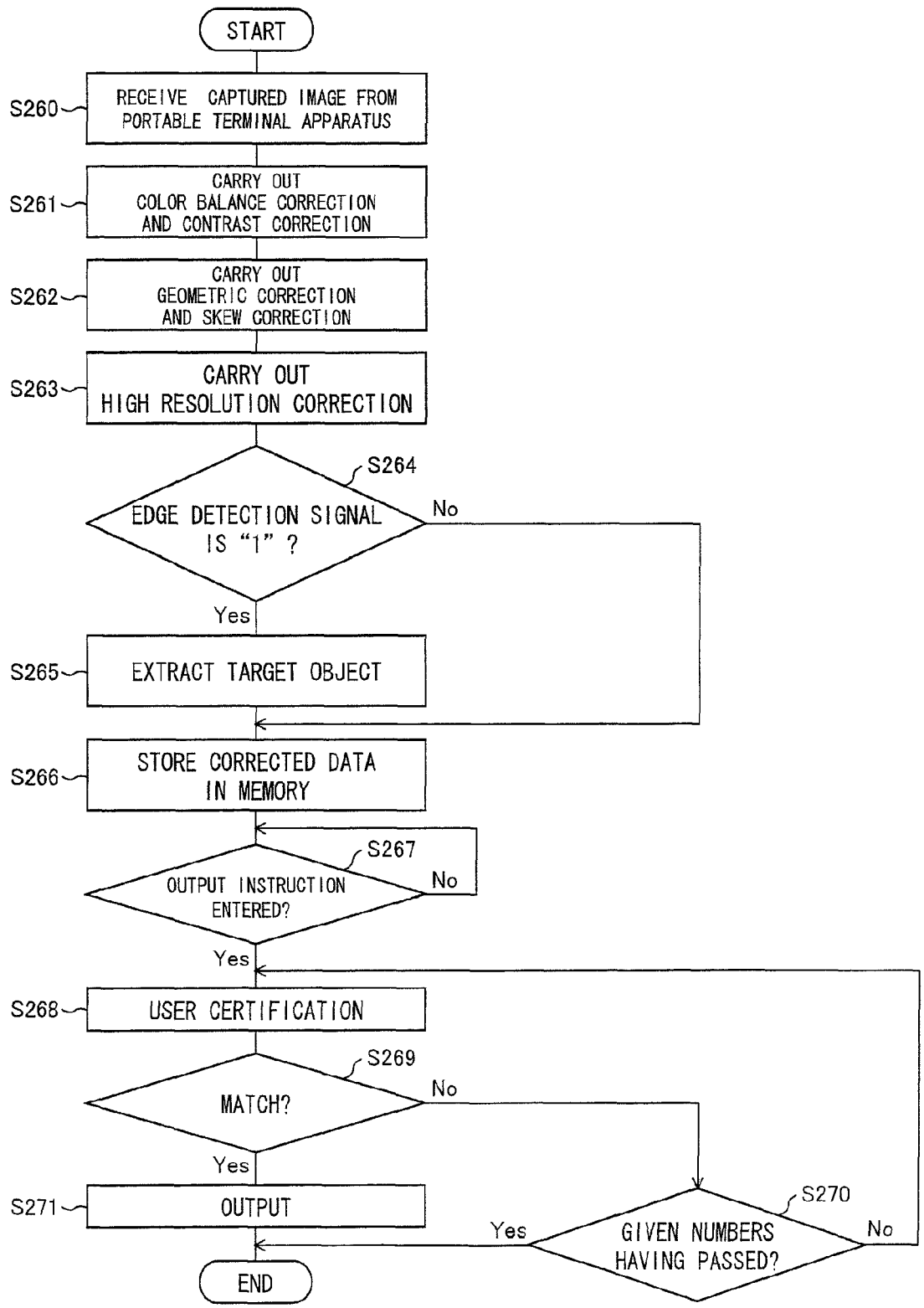
FIG. 27 is a flow chart illustrating a captured image processing method in a captured image processing system according to a modified example of the present invention, and illustrates a flow of an image output apparatus.

FIG. 27 is a flow chart illustrating a process flow of the image output apparatus 200 in the present captured image processing system. As illustrated in FIG. 27, the image output apparatus 200 carries out the processes in FIG. 2 except for the processes of S217 and S218. That is, processes from S260 to S265 in FIG. 27 are the same as the processes from S211 to S216. Further, the processes from S219 to S224 are the same as processes from S266 to S271 in FIG. 27.

In the present system, the image output apparatus 200 determines whether or not the edge detection signal is "1" (S264). In a case where the edge detection signal is "1" (YES in S264), the image output apparatus 200 carries out, as the extraction process, only a process (S265) of extracting a partial region of the captured image based on the edge information. In the present system, only the automatic extraction mode is carried out. Therefore, in S265, only the process described in (8-4-1) is carried out. Furthermore, in a case of NO in S264, the captured image data is not supplied to the object extraction section 305, but may be subjected to only correction processes of S260 to S263 and then stored in the storage section 210 as output target image data (S266).

Figure 28:
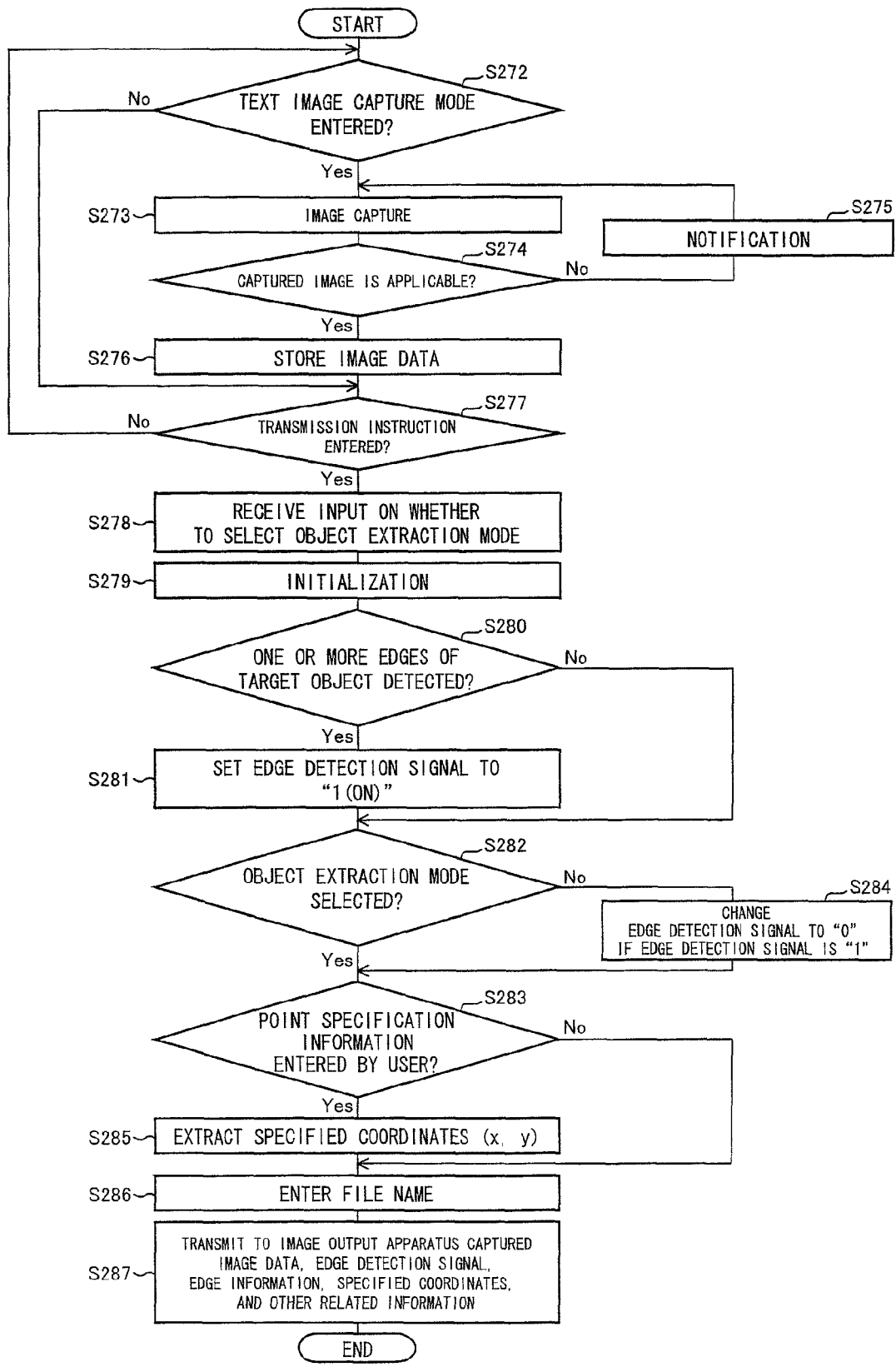
FIG. 28 is a flow chart illustrating a captured image processing method in a captured image processing system according to a modified example of the present invention, and illustrates a flow of a portable terminal apparatus.

(10-1-2) Modified Embodiment Including Only Automatic Extraction Mode and Edge Extraction Mode As another example, the captured image processing system may include only the automatic extraction mode and the edge extraction mode as the object extraction mode. FIG. 28 is a flow chart illustrating a process flow of the portable terminal apparatus 100 in the captured image processing system including only the automatic extraction mode and the edge extraction mode as the object extraction mode. As illustrated in FIG. 28, the portable terminal apparatus 100 of the present system carries out the processes shown in FIG. 1 except for the processes of S112 and S114. That is, processes of S272 to S282 and S284 in FIG. 28 are the same as the processes of S101 to S111 and S113 in FIG. 1. Further, processes of S283 and S285 to S287 in FIG. 28 are the same as the processes of S115 to S120 in FIG. 1.

As illustrated in FIG. 28, in the present system, the control section 109 of the portable terminal apparatus 100 determines whether or not at least one edge group of an image capture object is detected (S280), and then changes the edge detection signal to "1" (S281). Subsequently, the control section 109 determines whether or not the object extraction mode is selected (S282), and then causes a process (S285) of extracting specified coordinates that are specified by the user. After that, the control section 109 causes the captured image data, the edge information, the specified coordinates, and the like information to be transmitted to the image output apparatus 200 (S287). Finally, the image output apparatus 200 carries out a process of extracting the image capture object based on the edge information and the coordinate information. Related information to be transmitted is the pieces of information described in (6) except for the color extraction selection signal.

The process flow of the image output apparatus 200 in the present system may be such that the processes in FIG. 2 except for the processes of S217 and S218 are carried out.

(10-1-3) Modified Embodiment Including Only Color Extraction Mode

As further another example, the captured image processing system may include only the color extraction mode as the object extraction mode. In this case, the portable terminal apparatus 100 may generate coordinate information without generating edge information, and then transmit the coordinate information and the captured image data to the image output apparatus 200. Then, in the image output apparatus 200, the object extraction section 305 may carry out the process described in (8-4-3) based on the coordinate information.

(10-2) Process Execution Requirements

In the above description, upon receiving the transmission instruction of the captured image data after image capture, the portable terminal apparatus 100 receives a user input indicative of whether to select the object extraction mode. However, the timing when the portable terminal apparatus 100 receives the input indicative of whether to select the object extraction mode is not limited to the above timing.

For example, the portable terminal apparatus 100 may receive the input indicative of whether to select the object extraction mode, right after the selection of the text image capture mode is entered. With the arrangement, in a case where an extraction process in accordance with a selected object extraction mode is inexecutable with respect to the captured image data, it is possible to notify the user of need to carry out image capture again.

Such a modified embodiment can be applied to any embodiments shown in FIG. 1, FIG. 25, and FIG. 28. The following deals with an example in which this modified example is applied to the modified embodiment of FIG. 25.

Figure 26:
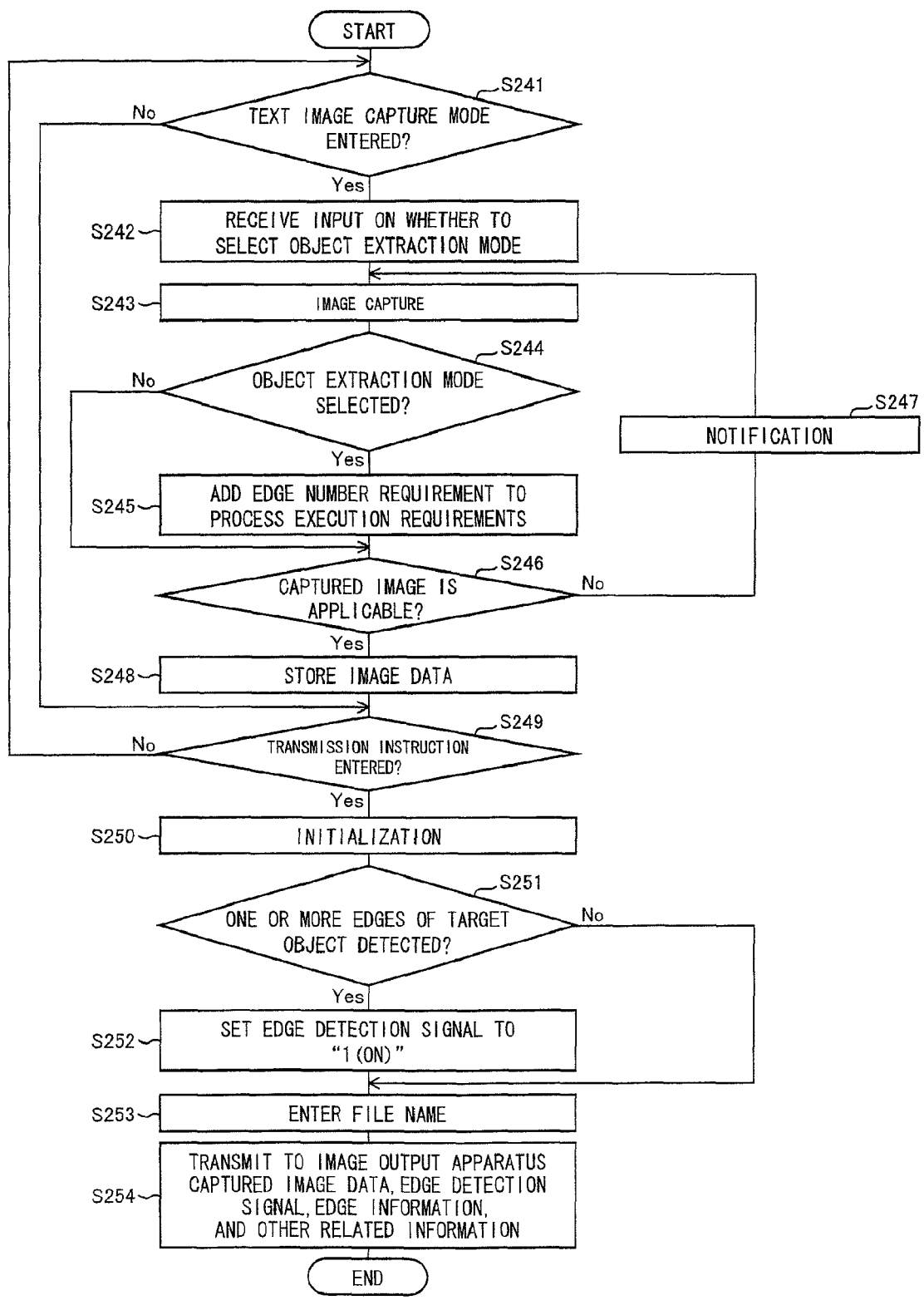
FIG. 26 is a flow chart illustrating a captured image processing method in a captured image processing system according to a modified example of the present invention, and illustrates a flow of a portable terminal apparatus.

FIG. 26 is a flow chart illustrating a process flow of the portable terminal apparatus 100 in a case where the portable terminal apparatus 100 receives the input indicative of whether to select the object extraction mode, right after the selection of the text image capture mode is entered.

As illustrated in FIG. 26, in a case where the user selects the text image capture mode (YES in S241), the control section 109 receives a user input indicative of whether to select the object extraction mode (S242). After that, the image capture section 101 consecutively carries out image capture several times in response to a shutter click (S243).

Subsequently, the control section 109 determines whether or not the object extraction mode is selected (S244). In a case where the object extraction mode is selected by the user (YES in S244), the control section 109 adds a process execution requirement for the object extraction based on edges, to the process execution requirements that the captured image determination section 102 judges (S245).

Here, examples of the process execution requirement for the object extraction based on edges may be the following requirements A, B, and C.

Requirement A: The captured image includes at least one group of edge pixels connected to each other in the form of a line segment.

Requirement B: The captured image includes at least one group of edge pixels connected to each other in the form of a line segment having at least a given length.

Requirement C: The captured image includes at least one group of edge pixels connected to each other in the form of a line segment. Further, the captured image includes either (a) at least one quadrangle in which (i) sides are constituted by line segments each indicated by a corresponding group of edge pixels and (ii) all internal angles are less than 180°, or (b) at least one polygon in which (i) sides are constituted by line segments each indicated by a corresponding group of edge pixels and a line segment located on a side of the captured image and (ii) all internal angles are less than 180°.

The requirement A can be judged by the number of pieces of edge information that the captured image determination section 102 generates. Further, the requirement B can be judged by the number of pieces of edge information that the captured image determination section 102 generates and the lengths of line segments indicated by the pieces of edge information. Moreover, the requirement C can be judged by carrying out a process similar to the process carried out by the object extraction section 305 of the image output apparatus 200.

Then, the captured image determination section 102 determines whether or not the captured image data meets the process execution requirements (S246). In a case where the process execution requirements are not met (NO in S246), the control section 109 controls the display section 105 to display a notification of need to carry out image capture again (S247). For example, in a case where the process execution requirement related to the object extraction based on edges is not met, the control section 109 controls the display section 105 to display a message urging image capture to be carried out again to make a contour of the image capture object clearly shown in a captured image.

This makes it possible to restrain an occurrence of errors at the time when the image output apparatus 200 carries out the extraction process based on edges.

The processes of S248 to S254 in FIG. 26 are the same as the processes of S229, S230, and S233 to S237 in FIG. 25.

In a case where the present modified embodiment is applied to the embodiment shown in FIG. 1, the process of S242 may be such that the portable terminal apparatus 100 receives the input indicative of whether to select the color extraction mode, when the object extraction mode is selected. In a case where the color extraction mode is selected, the process of S245 may be omitted. This is because the color extraction mode does not use edges.

(10-3) Modified Example of Process in Color Extraction Mode

Figure 24:
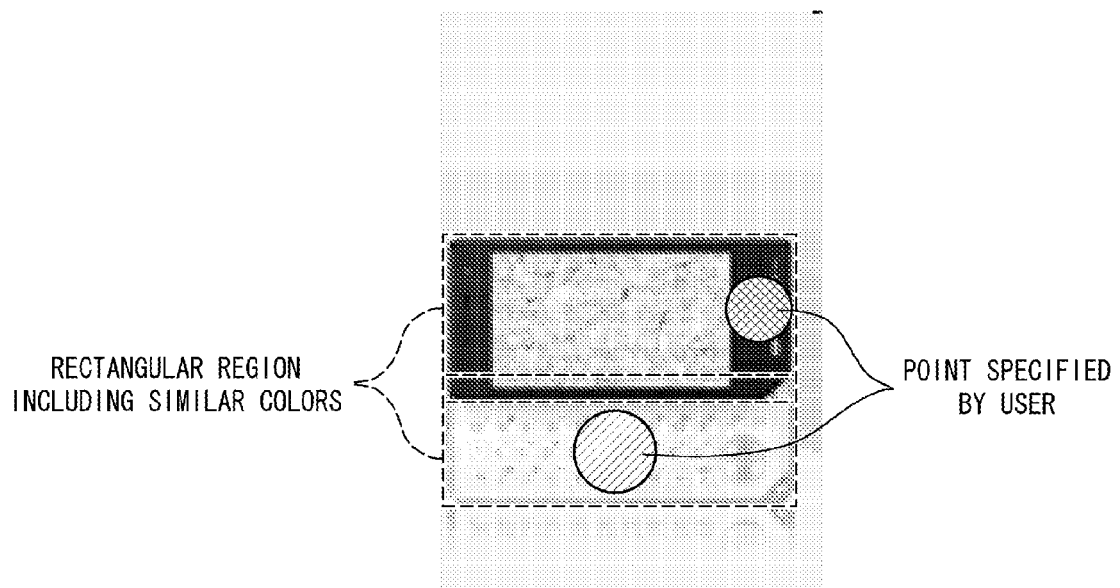
FIG. 24 illustrates another exemplary process of color extraction of an image.

In the above description, the extraction process in the color extraction mode is such that a circumscribed rectangular region (i) which includes a point indicated by the coordinate information and (ii) which has colors similar to a color of the point is determined as the extraction region. However, as illustrated in FIG. 24, there are some cases where the user wishes to extract a region including regions having different colors. In this case, it is difficult to specify, in the color extraction mode, the whole region that the user wishes to extract, by one typical color. Therefore, the whole region cannot be extracted.

In order to solve this problem, the user may be able to specify a plurality of points. In this case, a circumscribed rectangular region including regions having colors similar to respective typical colors of the plurality of points may be determined as the extraction region. More specifically, the color extraction process based on several typical colors as such is the same as the aforementioned color extraction process based on a single typical color. The color extraction process based on several typical colors may be such that a circumscribed rectangular region including regions extracted based on the respective typical colors is extracted as the extraction region.

Further, in the above description, the typical color is determined based on a position, in the captured image, indicated by the coordinate information. However, how to determine the typical color is not limited to this. For example, the user may specify a color in a color map image different from the captured image, and the specified color may be determined as the typical color. The color is specified, for example, in such a manner that an x-rite (Macbeth) color checker (http://www.nationalphoto.co.jp/2F/cms_chart.htm) is displayed to urge the user to select a color, and the user selects a color. In this case, the object extraction section 305 may determine, as the extraction region, a region (for example, a circumscribed rectangular region) including a region having colors similar to the typical color.

(10-4) Coordinate Information

In the above description, in the edge extraction mode, the specified-region extraction section 110 of the portable terminal apparatus 100 receives an instruction to specify a certain point and then generates coordinate information indicative of the specified point.

However, the specified-region extraction section 110 may receive an instruction to specify a plurality of points. The specified-region extraction section 110 then generates respective pieces of coordinate information for the plurality of points. Accordingly, the object extraction section 305 determines, as the extraction region, all extraction region candidates each including any of the coordinates indicated by the pieces of coordinate information, in the process described in (8-4-2). In a case where a plurality of extraction regions are extracted, the object extraction section 305 generates output target image data in which a region except for the plurality of extraction regions is a blank region. Alternatively, in the case where a plurality of extraction regions are extracted, the object extraction section 305 may generate pieces of output target image data for the plurality of extraction regions such that each output target image data includes only a corresponding extraction region. That is, a plurality of pieces of output target image data are to be outputted in this case.

(10-5) Generation of Edge Information and Coordinate Information

In the above description, the portable terminal apparatus 100 generates the edge information. However, the image output apparatus 200 may include an edge information generation section for detecting, in the captured image data, a group of edge pixels connected to each other in the form of a line segment, and for generating edge information indicative of where the group of edge pixels is positioned in the captured image data. In this case, the object extraction section 305 may carry out the extraction process in the automatic extraction mode by use of the edge information generated by the edge information generation section. This allows the portable terminal apparatus 100 to transmit just the captured image data to the image output apparatus 200.

Further, in the above description, the portable terminal apparatus 100 generates the coordinate information. However, the image output apparatus 200 may include a specification information generation section for generating coordinate information based on a position specified by the user. In this case, the display section 205 of the image output apparatus 200 may be caused to display a captured image so that the user specifies the position in the captured image. The object extraction section 305 can then execute the extraction process in the edge extraction mode or the color extraction mode by use of the coordinate information generated by the specification information generation section.

(10-6) Processing Items in the Image Output Apparatus

The above description discusses the case where the image processing section 202 of the image output apparatus 200 carries out the corrections of color balance, contrast, and brightness, the geometric distortion correction, the lens distortion correction, and the high resolution correction with respect to the plurality of pieces of captured image data received from the portable terminal apparatus 100. However, the processing carried out by the image processing section 202 is not limited to these corrections. The image processing section 202 can further carry out a skew correction, in addition to these corrections.

That is, the image processing section 202 can detect the skew of the image capture object by the method disclosed in (3-1) and carry out a process for rotating the captured image data so that the skew has an angle of 0 (zero) degree. Alternatively, the portable terminal apparatus 100 can transmit, to the image output apparatus 200, an angle of the skew which angle is detected in (3-1), together with the captured image data. Then, the image processing section 202 can carry out the process for rotating the captured image data in accordance with the angle of the skew which angle is received from the portable terminal apparatus 100 so that the skew of the image capture object has the angle of 0 (zero) degree.

(10-7) Image Capture Section

The above description discusses an arrangement employing the fact that a camera shake, occurring when the image capture section 101 consecutively carries out image capture a plurality of times, causes offset of the plurality of captured images. However, the embodiment is not limited to this. Instead, the image capture section 101 can slightly displace an image capture device (CCD/CMOS) or a lens when consecutively carrying out the image capture the plurality of times. This securely causes offset of the plurality of captured images.

(10-8) Another Example of High Resolution Correction

In the above description, high-resolution reconstructed image data is prepared based on a plurality of pieces of captured image data. However, the high resolution correction may be carried out based on a single piece of image data, not based on a plurality of pieces of image data. Alternatively, there may be provided (i) a continuous capture mode in which the high resolution correction is carried out based on a plurality of pieces of image data and (ii) a normal mode in which the high resolution correction is carried out based on a single piece of image data, so that the user may select either one of them as appropriate.

As for a method for forming a high-resolution image in accordance with a single piece of image data, several methods are disclosed in the Journal of the Institute of Image Information and Television Engineers Vol. 62, No. 2, pp. 181 through 189 (published in 2008).

Generally, it is possible to carry out the high resolution correction by (i) detecting a direction of an edge of an image pattern so as to carry out an interpolation in accordance with the direction of the edge and (ii) carrying out a de-noising process so as to remove at least (a) a distortion due to the interpolation and (b) an influence of a noise component existing in an inputted image. This is described below in detail.

FIG. 19 is a flow chart illustrating a processing flow of the high resolution correction carried out in the present embodiment.

Note that an example of a resolution conversion carried out at a magnification of ×2 in each of transverse and longitudinal directions is described here. In a case where (i) the resolution conversion is carried out at the magnification of ×2 and (ii) the number of pixels included in the captured image data which is to be subjected to the high resolution correction is n×m, the number of pixels included in the captured image data which has been subjected to the high resolution correction is 2n×2m. Such a high resolution correction (the resolution conversion carried out at the magnification of ×2) is carried out by preparing, as high resolution image data, image data including both reference pixels and interpolated pixels. The reference pixels are the respective pixels included in the captured image data and the interpolated pixels are newly prepared in the middle of the respective reference pixels. FIG. 20 shows a relationship between a reference pixel and an interpolated pixel. In FIG. 20, a pixel a and a pixel b indicate the reference pixel and the interpolated pixel, respectively.

First, the super-resolution processing section 304 carries out an edge extraction with respect to the captured image data received by the first communication section 207. For example, the super-resolution processing section 304 carries out the edge extraction by use of a first order differential filter as shown in FIG. 10. Then, the super-resolution processing section 304 carries out a binarization process so as to prepare binary image data (S1). Note that a pixel which has a pixel value of 1 in the binary image data shows that the pixel is highly likely to be an edge.

Next, the super-resolution processing section 304 determines, in accordance with the binary image data prepared in S1, whether or not a target pixel included in the captured image data is an edge (S2). Specifically, the super-resolution processing section 304 determines that the target pixel is an edge when a pixel, which corresponds to the target pixel in the binary image data, has a pixel value of 1.

Note that the target pixel intends a pixel which is currently targeted in a case where the pixels in the captured image data are targeted in any order.

In a case where the target pixel is an edge (Yes in S2), the super-resolution processing section 304 detects an edge direction by use of a partial image corresponding to (N×N) pixels (N>1) which includes the target pixel (S3). In detail, the super-resolution processing section 304 determines whether or not each of the reference pixels in the partial image corresponding to (N×N) pixels is an edge pixel.

Then, in a case where a reference pixel on the upper left of the target pixel and a reference pixel on the lower right of the target pixel are respective edge pixels, the super-resolution processing section 304 determines that the edge direction of the partial image is an upper left-lower right direction. Similarly, in a case where a reference pixel on the left of the target pixel and a reference pixel on the right of the target pixel are respective edge pixels, the super-resolution processing section 304 determines that the edge direction is a left-right direction. In a case where a reference pixel on the upper side of the target pixel and a reference pixel on the lower side of the target pixel are respective edge pixels, the super-resolution processing section 304 determines that the edge direction of the partial image is an upper-lower direction. In a case where a reference pixel on the upper right of the target pixel and a reference pixel on the lower left of the target pixel are respective edge pixels, the super-resolution processing section 304 determines that the edge direction of the partial image is an upper right-lower left direction.

In FIG. 20, a dotted line indicates a detected edge direction. Note, in FIG. 20, that pixels (1) through (9) are respective reference pixels and the pixel (5) is a target pixel. Note also that pixels A, B, and C are (i) an interpolated pixel between the reference pixels (1) and (5), (ii) an interpolated pixel between the reference pixels (2) and (5), and (iii) an interpolated pixel between the reference pixels (4) and (5), respectively.

Next, the super-resolution processing section 304 calculates by interpolation, in accordance with the edge direction detected in S3, pixel values of the respective interpolated pixels A, B, and C which are located (i) on the upper left, (ii) on the upper side, and (iii) on the left, respectively, of the target pixel. Note here that the pixel values of the respective interpolated pixels are calculated by use of the reference pixels located in the edge direction.

In a case where the edge direction is the upper left-lower right direction, the reference pixels (1), (5), and (9) are respective edge pixels and a straight line connecting these pixels serves as an edge line (see FIG. 20(*a*)). Then, a pixel value VA (Note that a written expression of "V" is omitted in FIG. 20(*a*) and this is applied to the other pixel values.) of the interpolated pixel A located on the edge line is calculated based on the equation of VA=(V(1)+V(5))/2, by use of respective pixel values (a pixel value V(1) and a pixel value V(5)) of the reference pixel (1) and the reference pixel (5) each being adjacent to the interpolated pixel A located on the edge line.

Meanwhile, with respect to each of the interpolated pixels B and C located on no edge line, the interpolation is carried out by use of the reference pixels located on straight lines (i) which include the reference pixels which are different from those located on the edge line and the closest to the respective interpolated pixels B and C (hereinafter such a reference pixel is referred to as a closest reference pixel) and (ii) which are parallel to the edge direction. For example, as for the interpolated pixel B, the straight line (i) which includes the reference pixel (2) which is the closest reference pixel and (ii) which is parallel to the edge line is a straight line connecting the reference pixels (2) and (6) (see FIG. 20(*a*)). Then, a point that is perpendicularly drawn from the interpolated pixel B to the straight line causes an edge defined by the reference pixels (2) and (6) to be internally divided. Therefore, a pixel value VB of the interpolated pixel B is calculated by use of the following equation: VB=(9×V(2)+4×V(6))/13.

Similarly, a pixel value VC of the interpolated pixel C is calculated based on the equation of VC=(9×V(4)+4×V(8))/13, by use of (i) a pixel value of the reference pixel (4) which is the closest reference pixel value and (ii) a pixel value of the reference pixel (8) which is located on a straight line which includes the reference pixel (4) and is parallel to the edge direction.

In a case where the edge direction is the left-right direction, the reference pixels (4), (5), and (6) are edge pixels and a straight line connecting these pixels serves as the edge line (see FIG. 20(*b*)). Then, the pixel value VC of the interpolated pixel C located on the edge line is calculated based on the equation of VC=(V(4)+V(5))/2, by use of respective pixel values (pixel values V(4) and V(5)) of the reference pixel (4) and the reference pixel (5) each being adjacent to the interpolated pixel C located on the edge line.

Meanwhile, with respect to each of the interpolated pixels A and B located on no edge line, the interpolation is carried out by use of the reference pixels located on straight lines (i) which include the reference pixels which are different from those located on the edge line and the closest to the respective interpolated pixels A and B (the closest reference pixels) and (ii) which are parallel to the edge direction. For example, as for the interpolated pixel A, the straight line (i) which includes the reference pixel (1) or the reference pixel (2) which is the closest reference pixel and (ii) which is parallel to the edge line is a straight line connecting the reference pixels (1) and (2) (see FIG. 20(*b*)). Then, a point that is perpendicularly drawn from the interpolated pixel A to the straight line exists in the middle of the reference pixels (1) and (2). Therefore, the pixel value VA of the interpolated pixel A is calculated by use of the following equation: VA=(V(1)+V(2))/2.

As for the interpolated pixel B, the straight line (i) which includes the reference pixel (2) which is the closest reference pixel and (ii) which is parallel to the edge line is a straight line connecting the reference pixels (1), (2), and (3). Then, a point that is perpendicularly drawn from the interpolated pixel B to the straight line coincides with the reference pixel (2). Therefore, the interpolated pixel B is set to have the pixel value VB which is identical to the pixel value V(2) of the reference pixel (2).

In a case where the edge direction is the upper right-lower left direction, the reference pixels (3), (5), and (7) are edge pixels and a straight line connecting these pixels serves as the edge line (see FIG. 20(*c*)). Then, none of the interpolated pixels A, B, and C exists on the edge line.

As for the interpolated pixel A, the reference pixels (1), (2), and (4) are the closest reference pixels. Note here that the reference pixels (2) and (4) are located on a single straight line which is parallel to the edge direction, whereas the reference pixel (1) is not located on the single straight line. In view of this, the pixel value VA of the interpolated pixel A is calculated based on the equation of VA=(V(1)+V(2))+V(4)/3, by use of the pixel values of the respective reference pixels (1), (2), and (4), which are the closest reference pixels.

Meanwhile, with respect to each of the interpolated pixels B and C, the interpolation is carried out by use of the reference pixels located on straight lines (i) which include the reference pixels which are different from those located on the edge line and the closest to the respective interpolated pixels B and C (the closest reference pixels) and (ii) which are parallel to the edge direction. For example, as for the interpolated pixel B, the straight line (i) which includes the reference pixel (2), which is the closest reference pixel, and (ii) which is parallel to the edge line is a straight line connecting the reference pixels (2) and (4) (see FIG. 20(*c*)). Then, a point that is perpendicularly drawn from the interpolated pixel B to the straight line causes an edge defined by the reference pixels (2) and (4) to be internally divided. Therefore, the pixel value VB of the interpolated pixel B is calculated by use of the following equation: VB=(9×V(2)+4×V(4))/13.

Similarly, the pixel value VC of the interpolated pixel C is calculated based on the equation of VC=(4×V(2)+9×V(4))/13, by use of (i) the pixel value of the reference pixel (4), which is the closest reference pixel value, and (ii) the pixel value of the reference pixel (2), which is located on the straight line which includes the reference pixel (4) and which is parallel to the edge direction.

In a case where the edge direction is the upper-lower direction, the reference pixels (2), (5), and (8) are edge pixels, and a straight line connecting these pixels serves as the edge line (see FIG. 20(*d*)). Then, the pixel value VB of the interpolated pixel B located on the edge line is calculated based on the equation of VC=(V(2)+V(5))/2, by use of the pixel values of the respective reference pixels (2) and (5) each being adjacent to the interpolated pixel B located on the edge line.

Meanwhile, with respect to each of the interpolated pixels A and C located on no edge line, the interpolation is carried out by use of the reference pixels located on straight lines (i) which include the reference pixels which are different from those located on the edge line and the closest to the respective interpolated pixels A and C (the closest reference pixels) and (ii) which are parallel to the edge direction. For example, as for the interpolated pixel A, the straight line (i) which includes the reference pixel (1) or the reference pixel (4), which is the closest reference pixel and (ii) which is parallel to the edge line is a straight line connecting the reference pixels (1) and (4) (see FIG. 20(*d*)). Then, a point that is perpendicularly drawn from the interpolated pixel A to the straight line exists in the middle of the reference pixels (1) and (4). Therefore, the pixel value VA of the interpolated pixel A is calculated by use of the following equation: VA=(V(1)+V(4))/2.

As for the interpolated pixel C, the straight line (i) which includes the reference pixel (4), which is the closest reference pixel, and (ii) which is parallel to the edge line is a straight line connecting the reference pixels (1), (4), and (7). Then, a point that is perpendicularly drawn from the interpolated pixel C to the straight line coincides with the reference pixel (4). Therefore, the interpolated pixel C is set to have the pixel value VC which is identical to the pixel value V(4) of the reference pixel (4).

Note that information in which (i) an edge direction and (ii) equations for calculating the pixel values of the respective interpolated pixels A, B, and C are associated with each other is preliminarily stored in the storage section 210. The super-resolution processing section 304 reads out, from the storage section 210, the equations associated with the edge direction detected in S3, and then can calculate the pixel values of the respective interpolated pixels A, B, and C in accordance with the equations thus read out.

Note that FIG. 20(a) through FIG. 20(b) illustrate only a case where the edges linearly extend. However, the edges can extend in a curved manner in the partial image corresponding to (N×N) pixels. Examples of the case include a case where the edge extends along the reference pixels (2)-(5)-(4) and a case where the edge extends along the reference pixels (1)-(5)-(7).

Even in each of such cases, information in which (i) edge directions and (ii) equations for calculating pixel values of respective interpolated pixels A, B, and C are associated with each other is preliminarily stored. For example, in the case where the edge extends along the reference pixels (2)-(5)-(4), equations similar to those in the cases of FIGS. 20(c), 20(b), and 20(d) are stored with respect to the interpolated pixels A, B, and C, respectively. Similarly, in the case where the edge extends along the reference pixels (1)-(5)-(7), equations similar to those in the cases of FIGS. 20(a), 20(a), and 20(d) are stored with respect to the interpolated pixels A, B, and C, respectively. Also in a case where the edge extends differently from the above, the foregoing information is similarly stored.

As described above, the super-resolution processing section 304 calculates the pixel values of the respective interpolated pixels located in the vicinities of the respective reference pixels which have been determined to be the edge pixels.

Meanwhile, in a case where the target pixel is not an edge (No in S2), the super-resolution processing section 304 calculates, by a general interpolation calculation method (e.g., a bilinear interpolation method or a bi-cubic interpolation method), the pixel values of the respective interpolated pixels A, B, and C which are located (i) on the upper left side, (ii) on the upper side, and (iii) on the left side, respectively, of the target pixel so as to be adjacent to the target pixel (S4).

The super-resolution processing section 304 carries out the processes S2 through S4 with respect to all the reference pixels included in the captured image data. This causes interpolated image data including both the reference pixels and the interpolated pixels to be prepared (S5).

Thereafter, the super-resolution processing section 304 carries out an image quality enhancement process with respect to the interpolated image data thus prepared. For example, the interpolated image data is subjected, by the super-resolution processing section 304, to a de-noising filter, a sharpening filter, and the like so that high resolution image data is prepared. Examples of the sharpening filter include a conventional unsharp mask and a filter in which a coefficient at the center of FIG. 10 is set to five (5). Note that a median filter is widely known as the de-noising filter. As for a more sophisticated method for the image quality enhancement, a Bilateral filter [Proceedings of the 1998 IEEE International Conference on Computer Vision] or the like can be used as a method having both an edge preserving property and an image quality enhancing property.

Note that a method for preparing high resolution image data is not limited to the methods described above, and the super-resolution processing section 304 can prepare the high resolution image data in accordance with a single piece of captured image data by use of a variety of methods as disclosed in the Journal of the Institute of Image Information and Television Engineers Vol. 62, No. 2, pp. 181 through 189 (published in 2008).

(10-9) Output Process Information

The above description discusses an arrangement in which the portable terminal apparatus 100 obtains and transmits the output process information to the image output apparatus 200. However, the embodiment is not limited to this. The image output apparatus 200 can obtain the output process information (the information indicative of the kind of the output process and the setting requirement for the output process) when obtaining the user information so as to carry out the user certification.

(10-10) Output Process

Before carrying out the filing process or the e-mail transmission process, the control section 212 of the image output apparatus 200 can convert, to a high-compression PDF, the captured image data processed by the image processing section 202. Note that the high-compression PDF refers to PDF data in which the image data is separated into a background part and a text part and optimum compression processes are carried out with respect to the respective parts. This allows favorable readability and a reduction in size of an image file.

Alternatively, before carrying out the filing process or the e-mail transmission process, the control section 212 can carry out an OCR (Optical Character Recognition) process with respect to the captured image data processed by the image processing section 202 so as to prepare text data. The control section 212 can convert the captured image data to a PDF, and then add the text data to the PDF as a transparent text. Note that the transparent text is data for superimposing (embedding) a recognized text on (in) the image data as text information so that the recognized text is apparently invisible. For example, an image file in which a transparent text is added to image data is generally used in a PDF file. Then, the control section 212 can cause PDF data, to which the prepared transparent text is added, to be outputted. This allows an output of an electronic document easy to utilize as if it were a file in which a text search can be carried out.

(10-11) Image Processing Section of Image Output Apparatus

The above description discusses an arrangement in which the image processing section 202 of the image output apparatus 200 carries out corrections including the high resolution correction. Instead, the image output apparatus 200 can cause a server including an image processing section 202 to carry out, with respect to the captured image data, the high resolution correction and the other image processing such as the geometric distortion correction, the lens distortion correction, the contrast correction, and the color balance correction. Note, in this case, that the server will serve as an image output apparatus for carrying out the high resolution correction with respect to the captured image data received from the portable terminal apparatus 100, and for outputting the captured image data which has been subjected to the high resolution correction.

(11) Program and Recording Medium

The present invention can be achieved by recording, on a computer-readable recording medium in which a program to be executed by a computer is recorded, a method in which the image captured by the portable terminal apparatus 100 is transmitted to and outputted by the image output apparatus 200.

This makes it possible to portably provide a recording medium in which program codes (an executable program, an intermediate code program, and a source program) for carrying out the above process are recorded.

Note, in the present embodiment, that the recording medium can be a memory (not illustrated) such as a ROM or the recording medium itself can be a program medium (not illustrated) because the process is carried out by a microcomputer. Alternatively, the recording medium can be a program medium from which the program codes can be read out by carrying out loading of a recording medium with respect to a program reading device provided as an external storage apparatus (not illustrated).

In any case, an arrangement can be employed in which a stored program is executed by access of a microprocessor. Alternatively, in any case, a system can be employed in which the program codes are read out and downloaded on a program storage area (not illustrated) of the microcomputer, and then the program is executed. The program for the downloading is stored in a main body in advance.

Note here that the program medium is a recording medium which is arranged to be detachable from the main body. The program media can also be a medium fixedly bearing a program code which medium includes (i) a tape such as a magnetic tape or a cassette tape, (ii) a disk including a magnetic disk such as a flexible disk or a hard disk and an optical disk such as a CD-ROM, an MO, an MD, or a DVD, (iii) a card, such as an IC card (including a memory card) or an optical card, or (iv) a semiconductor memory of a mask ROM, EPROM (Erasable Programmable Read Only Memory), EEPROM (Electrically Erasable Programmable Read Only Memory), or a flash ROM.

Further, the present embodiment has a system architecture which is connectable to a communication network including the Internet. As such, the recording medium can be a medium which to bears the program codes in a flexible manner so that the program code is downloaded from the communication network. Note that, in a case where the program is downloaded from the communication network as described above, the program for the downloading can be stored beforehand in the main body or can be installed from an alternative recording medium. Note that the present invention can also be realized in a form of a computer data signal in which the program code is embodied by an electronic transmission and which is embedded in carrier waves.

The recording medium is read by a program scanning device included in the portable terminal apparatus 100 or the image output apparatus 200, whereby the image processing method is carried out.

As described above, an image output apparatus of the present invention includes: a receiving section for receiving, from a portable terminal apparatus including an image capture section, captured image data that is captured by the image capture section; an edge information obtaining section for obtaining edge information indicative of where an edge pixel group, which is a group of edge pixels connected to each other in a form of a line segment and which is detected in a captured image of the captured image data, is positioned on the captured image; an edge extraction processing section (i) for determining as an extraction region either (a) a quadrangular region enclosed by a quadrangle in which all internal angles are less than 180° and sides are constituted by 4 edge pixel groups each in the form of a line segment, the 4 edge pixel groups being indicated by the edge information, or (b) a polygonal region enclosed by a polygon in which all internal angles are less than 180° and sides are constituted by at least one edge pixel group in the form of a line segment, which edge pixel group is indicated by the edge information, and at least one line segment located on an end portion of the captured image, and (ii) for cutting out, as output target image data, image data of the extraction region from the captured image data; and an output section for outputting the output target image data or an image of the output target image data.

Further, an image output method of the present invention includes the steps of: receiving, from a portable terminal apparatus including an image capture section, captured image data captured by the image capture section; obtaining edge information indicative of where an edge pixel group, which is a group of edge pixels connected to each other in a form of a line segment and which is detected in a captured image of the captured image data, is positioned on the captured image; carrying out an edge extraction process of (i) determining as an extraction region either (a) a quadrangular region enclosed by a quadrangle in which all internal angles are less than 180° and sides are constituted by 4 edge pixel groups each in the form of a line segment, the 4 edge pixel groups being indicated by the edge information, or (b) a polygonal region enclosed by a polygon in which all internal angles are less than 180° and sides are constituted by at least one edge pixel group in the form of a line segment, which edge pixel group is indicated by the edge information, and at least one line segment located on an end portion of the captured image, and then (ii) cutting out, as output target image data, image data of the extraction region from the captured image data; and outputting the output target image data or an image of the output target image data.

In the above arrangement, either (a) a quadrangular region enclosed by a quadrangle in which all internal angles are less than 180° and sides are constituted by 4 edge pixel groups each in the form of a line segment, the 4 edge pixel groups being indicated by the edge information, or (b) a polygonal region enclosed by a polygon in which all internal angles are less than 180° and sides are constituted by at least one edge pixel group in the form of a line segment, which edge pixel group is indicated by the edge information, and at least one line segment located on an end portion of the captured image is determines as an extraction region based on the edge information indicative of the edge pixel group, which is a group of edge pixels connected to each other in the form of a line segment. The extraction region is found in the captured image data received from the portable terminal apparatus.

In a case where image capture is carried out with respect to an image capture object having a rectangular shape (e.g., a document or a poster), a boundary between the image capture object and its background (i.e., a contour of the image capture object) in a captured image is constituted by edge pixel groups each in the form of a line segment. Therefore, an edge pixel group located at a position indicated by the edge information is highly possibly a boundary between the image capture object and its background.

Further, in a case where the entire image capture object having a rectangular shape is located within the captured image (i.e., a case where no part of the image capture object crosses over an end portion of the captured image), the boundary between the image capture object and the background forms a quadrangle. Furthermore, in a case where a part of the image capture object crosses over the end portion of the captured image, a polygon is formed by the boundary between the image capture object and the background, and a line segment positioned on the end portion of the captured image.

With the arrangement, it is possible to extract, as an extraction region, a region of the image capture object having a rectangular shape with high probability. This can realize an image output apparatus which can accurately and easily extract, from a captured image, a region of a rectangular image captured object that a user wants.

In other words, in a case where the user wants to extract, from the captured image, a region of the rectangular image capture object, for example, it is unnecessary for the user himself to extract the intended image capture object from the captured image. This can reduce user's work burden.

Furthermore, the image output apparatus of the present invention may further include a specification information obtaining section for obtaining specified-position information indicative of a position that a user specifies on the captured image, and the edge extraction processing section determines, as the extraction region, either a quadrangular region or polygonal region that includes a position indicated by the specified-position information.

There are some cases where a plurality of quadrangular regions and/or polygonal regions are detected, depending on the obtained edge information. However, in the above arrangement, the quadrangular region or a polygonal region that includes a position specified by the user is determined as the extraction region, among the plurality of quadrangular region and/or polygonal regions. This allows the user to output an image of an intended region to be extracted, by specifying any point within the intended region.

The image output apparatus of the present invention may further include a specification information obtaining section for obtaining a specified density value, which is a density value specified by the user; a density value extraction processing section for (i) specifying, in the captured image data, pixels having density values that fall within a given range including the specified density value, (ii) determining, as an extraction region, a rectangular region circumscribed to a connected component in which the specified pixels are connected, and (iii) cutting out, as output target image data, image data of the extraction region from the captured image data; and a selecting section for selecting between an edge extraction mode and a density value extraction mode, the edge extraction mode causing the edge extraction processing section to operate and the density value extraction processing section to be inoperative, and the density value extraction mode causing the edge extraction processing section to be inoperative and the density value extraction processing section to operate. In the image output apparatus of the present invention, the output section may output the output target image data prepared by the edge extraction processing section or the image of the output target image data in a case where the selecting section selects the edge extraction mode, while the output section may output the output target image data prepared by the density value extraction processing section or an image of the output target image data in a case where the selecting section selects the density value extraction mode.

In the above arrangement, pixels having density values that fall within a given range including the specified density value are specified in the captured image data, and a region including a connected component in which the specified pixels are connected is determined as the extraction region. This makes it possible to extract a region having colors similar to a color indicated by the specified density value. As a result, in a case where an object having a specific color is captured as an image capture object, it is possible to accurately extract the image capture object by selecting the density value extraction mode.

Further, with the above arrangement, it is possible to select between the density pixel extraction mode and the edge extraction mode as appropriate.

In the image output apparatus of the present invention, the specification information obtaining section may obtain specified-position information indicative of a position that the user specifies on the captured image, and then obtain the specified density value based on a density value of a pixel at a position indicated by the specified-position information, and the density value extraction processing section may determine, as the extraction region, a region which includes a connected component including the pixel at the position indicated by the specified-position information.

With the above arrangement, only by specifying a position having a typical color in a region that the user wants to extract, the user can easily output an image of a region that has colors similar to the typical color.

In a case where a plurality of pixels are located at the position indicated by the specified-position information, the specification information obtaining section may determine, as the specified density value, any one of the following values, for example: an average of density values of the plurality of pixels; a density value that appears most frequently among the density values of the plurality of pixels; and a density value having a frequency of not less than a given threshold among the density values of the plurality of pixels.

In the image output apparatus of the present invention, the edge information obtaining section may obtain edge information on only an edge pixel group in the form of a line segment having at least a given length.

Normally, the user captures an image capture object such that the image capture object takes up the most part of a captured image. On this account, with the above arrangement, the edge pixel group indicated by the edge information is highly possibly a boundary between the image capture object and its background. Consequently, it is possible to accurately extract a region of the image capture object.

A portable terminal apparatus of the present invention includes: an image capture section; a transmission section for transmitting captured image data captured by the image capture section, to the image output apparatus; an edge detection section for detecting, in a captured image of the captured image data, an edge pixel group, which is a group of edge pixels connected to each other in a form of a line segment; and an edge information generation section for generating edge information based on a position of the edge pixel group detected by the edge detection section. In the portable terminal apparatus of the present invention, the transmission section transmits, to the image output apparatus, the edge information generated by the edge information generation section.

A captured image processing system of the present invention includes the image output apparatus and a portable terminal apparatus including: an image capture section; a transmission section for transmitting, to the image output apparatus, captured image data captured by the image capture section; an edge detection section for detecting, from a captured image of the captured image data, an edge pixel group, which is a group of edge pixels connected to each other in a form of a line segment; and an edge information generation section for generating edge information based on a position of the edge pixel group detected by the edge detection section, and the edge information obtaining section of the image output apparatus obtains the edge information from the portable terminal apparatus.

With the above arrangement, since the portable terminal apparatus generates the edge information, the image output apparatus can easily obtain the edge information. Further, it is unnecessary for the image output apparatus to generate the edge information, thereby reducing work burden of the image output apparatus.

The portable terminal apparatus of the present invention may further include a notification section for notifying a user of need to capture an image again in a case where the edge detection section detects no edge pixel group.

In the captured image processing system of the present invention, the portable terminal apparatus may further include a notification section for notifying a user of need to capture an image again in a case where the edge detection section detects no edge pixel group.

With the above arrangement, the user can easily know, when needed, that the image capture should be carried out again so as to extract the image capture object from the captured image and obtain the extracted image capture object from the image output apparatus. This allows the user to capture the image again immediately.

A portable terminal apparatus of the present invention includes: an image capture section; a transmission section for transmitting, to the image output apparatus, captured image data captured by the image capture section; and a specified-position information generation section for urging a user to enter an instruction to specify a certain position in a region that the user desires to output in a captured image of the captured image data and for generating, as specified-position information, information indicative of the position specified by the user. In the portable terminal apparatus of the present invention, the transmission section transmits, to the image output apparatus, the specified-position information generated by the specified-position information generation section.

A captured image processing system of the present invention includes the image output apparatus and a portable terminal apparatus including: an image capture section; a transmission section for transmitting, to the image output apparatus, captured image data captured by the image capture section; a specified-position information generation section for urging a user to enter an instruction to specify a certain position in a region that the user desires to output in a captured image of the captured image data and for generating, as specified-position information, information indicative of the position specified by the user, the specification information obtaining section of the image output apparatus obtains the specified-position information from the portable terminal apparatus.

With the above arrangement, the use can enter, in the portable terminal apparatus, an instruction to specify a certain position in a region that the user desires to output in a captured image. With this input operation, it is possible to easily output, from the image output apparatus, an image of the region that the user desires.

The image output apparatus may be realized by a computer. In this case, (i) a program for causing a computer to realize the image output apparatus by causing the computer to operate as each section mentioned above and (ii) a computer-readable storage medium in which the program is recorded are both encompassed in the scope of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

The present invention can be applied to a captured image processing system in which data communication is carried out between a portable terminal apparatus and an image output apparatus.

Reference Signs List

100 Portable Terminal Apparatus
200 Image Output Apparatus
101 Image Capture Section
102 Captured Image Determination Section (Edge Detection Section, Edge Information Generation Section)
103 Image Processing Section
104 Communication Section (Transmission Section)
105 Display Section (Notification Section, Specified-Position Information Generation Section)
106 Input Section
109 Control Section (Transmission Section, Notification Section)
110 Specified-region Extraction Section (Position Information Generation Section)
202 Image Processing Section
204 Image Forming Section (Output Section)
205 Display Section
206 Input Section
207 First Communication Section (Receiving Section, Edge information Obtaining Section, Specification Information Obtaining Section)
208 Second Communication Section (Output Section)
212 Control Section (Output Section, Selecting Section)
305 Object Extraction Section (Edge Extraction Processing Section, Density Value Extraction Processing Section)

The invention claimed is:

1. An image output apparatus comprising:
a receiving section for receiving, from a portable terminal apparatus including an image capture section, captured image data that is captured by the image capture section;
an edge information obtaining section for obtaining edge information indicative of where an edge pixel group, which is a group of edge pixels connected to each other in a form of a line segment and which is detected in a captured image of the captured image data, is positioned on the captured image;
an edge extraction processing section (i) for determining as an extraction region either (a) a quadrangular region enclosed by a quadrangle in which all internal angles are less than 180° and sides are constituted by 4 edge pixel groups each in the form of a line segment, the 4 edge pixel groups being indicated by the edge information, or (b) a polygonal region enclosed by a polygon in which all internal angles are less than 180° and sides are constituted by at least one edge pixel group in the form of a line segment, which edge pixel group is indicated by the edge information, and at least one line segment located on an end portion of the captured image, and (ii) for cutting out, as output target image data, image data of the extraction region from the captured image data; and
an output section for outputting the output target image data or an image of the output target image data.

2. The image output apparatus as set forth in claim 1, further comprising:

a specification information obtaining section for obtaining specified-position information indicative of a position that a user specifies on the captured image, the edge extraction processing section determining, as the extraction region, either a quadrangular region or polygonal region that includes a position indicated by the specified-position information.

3. The image output apparatus as set forth in claim 1, further comprising:

a specification information obtaining section for obtaining a specified density value, which is a density value specified by the user;

a density value extraction processing section for (i) specifying, in the captured image data, pixels having density values that fall within a given range including the specified density value, (ii) determining, as an extraction region, a region including a connected component in which the specified pixels are connected, and (iii) cutting out, as output target image data, image data of the extraction region from the captured image data; and a selecting section for selecting between an edge extraction mode and a density value extraction mode, the edge extraction mode causing the edge extraction processing section to operate and the density value extraction processing section to be inoperative, and the density value extraction mode causing the edge extraction processing section to be inoperative and the density value extraction processing section to operate, the output section outputting the output target image data prepared by the edge extraction processing section or the image of the output target image data in a case where the selecting section selects the edge extraction mode, while the output section outputs the output target image data prepared by the density value extraction processing section or an image of the output target image data in a case where the selecting section selects the density value extraction mode.

4. The image output apparatus as set forth in claim 3, wherein:

the specification information obtaining section obtains specified-position information indicative of a position that the user specifies on the captured image, and then obtains the specified density value based on a density value of a pixel at a position indicated by the specified-position information; and the density value extraction processing section determines, as the extraction region, a region which includes a connected component including the pixel at the position indicated by the specified-position information.

5. The image output apparatus as set forth in claim 4, wherein:

in a case where a plurality of pixels are located at the position indicated by the specified-position information, the specification information obtaining section determines, as the specified density value, any one of the following values: an average of density values of the plurality of pixels; a density value that appears most frequently among the density values of the plurality of pixels; and a density value having a frequency of not less than a given threshold among the density values of the plurality of pixels.

6. The image output apparatus as set forth in claim 1, wherein the edge information obtaining section obtains edge information on only an edge pixel group in the form of a line segment having at least a given length.

7. A captured image processing system comprising:

an image output apparatus including:

a receiving section for receiving, from a portable terminal apparatus including an image capture section, captured image data that is captured by the image capture section;

an edge information obtaining section for obtaining edge information indicative of where an edge pixel group, which is a group of edge pixels connected to each other in a form of a line segment and which is detected in a captured image of the captured image data, is positioned on the captured image;

an edge extraction processing section (i) for determining as an extraction region either (a) a quadrangular region enclosed by a quadrangle in which all internal angles are less than 180° and sides are constituted by 4 edge pixel groups each in the form of a line segment, the 4 edge pixel groups being indicated by the edge information, or (b) a polygonal region enclosed by a polygon in which all internal angles are less than 180° and sides are constituted by at least one edge pixel group in the form of a line segment, which edge pixel group is indicated by the edge information, and at least one line segment located on an end portion of the captured image, and (ii) for cutting out, as output target image data, image data of the extraction region from the captured image data; and an output section for outputting the output target image data or an image of the output target image data; and a portable terminal apparatus including:

an image capture section;

a transmission section for transmitting, to the image output apparatus, captured image data captured by the image capture section;

an edge detection section for detecting, from a captured image of the captured image data, an edge pixel group, which is a group of edge pixels connected to each other in a form of a line segment; and an edge information generation section for generating edge information based on a position of the edge pixel group detected by the edge detection section, the edge information obtaining section of the image output apparatus obtaining the edge information from the portable terminal apparatus.

8. The captured image processing system as set forth in claim 7, wherein the portable terminal apparatus further includes a notification section for notifying a user of need to capture an image again in a case where the edge detection section detects no edge pixel group.

9. A non-transitory computer-readable recording medium in which a program is recorded for causing an image output apparatus to operate, the image output apparatus including:

a receiving section for receiving, from a portable terminal apparatus including an image capture section, captured image data that is captured by the image capture section;

an edge information obtaining section for obtaining edge information indicative of where an edge pixel group, which is a group of edge pixels connected to each other in a form of a line segment and which is detected in a captured image of the captured image data, is positioned on the captured image;

an edge extraction processing section (i) for determining as an extraction region either (a) a quadrangular region enclosed by a quadrangle in which all internal angles are less than 180° and sides are constituted by 4 edge pixel groups each in the form of a line segment, the 4 edge pixel groups being indicated by the edge information, or (b) a polygonal region enclosed by a polygon in which all internal angles are less than 180° and sides are constituted by at least one edge pixel group in the form of a line segment, which edge pixel group is indicated by the edge information, and at least one line segment located on an end portion of the captured image, and (ii) for cutting out, as output target image data, image data of the extraction region from the captured image data; and an output section for outputting the output target image data or an image of the output target image data, the program causing a computer to function as each section of the image output apparatus.

* * * * *